(12) United States Patent
Oxley

(10) Patent No.: US 7,216,579 B2
(45) Date of Patent: May 15, 2007

(54) VARIABLE FLOW CONTROL DEVICES, RELATED APPLICATIONS, AND RELATED METHODS

(75) Inventor: Lonnie R. Oxley, Versailles, KY (US)

(73) Assignee: Lonmore, L.C., Means, KY (US)

( * ) Notice: Subject to any disclaimer, the term of this patent is extended or adjusted under 35 U.S.C. 154(b) by 6 days.

(21) Appl. No.: 10/493,114

(22) PCT Filed: Oct. 17, 2002

(86) PCT No.: PCT/US02/33086

§ 371 (c)(1),
(2), (4) Date: Apr. 16, 2004

(87) PCT Pub. No.: WO03/033329

PCT Pub. Date: Apr. 24, 2003

(65) Prior Publication Data

US 2004/0211615 A1    Oct. 28, 2004

Related U.S. Application Data

(60) Provisional application No. 60/398,155, filed on Jul. 24, 2002, provisional application No. 60/390,266, filed on Jun. 20, 2002, provisional application No. 60/359,387, filed on Feb. 25, 2002, provisional application No. 60/329,542, filed on Oct. 17, 2001.

(51) Int. Cl.
*F01B 13/06* (2006.01)

(52) U.S. Cl. ........................................... 91/492; 91/491

(58) Field of Classification Search .................. 180/6.2, 180/6.3, 6.32, 6.48; 91/491, 492, 498
See application file for complete search history.

(56) References Cited

U.S. PATENT DOCUMENTS

| | | | |
|---|---|---|---|
| 1,984,399 A | 12/1934 | Davidson |
| 2,659,445 A | 11/1953 | Church |
| 2,766,834 A | 10/1956 | Boyer |
| 2,827,857 A | 3/1958 | Eserkaln |
| 2,866,150 A | 12/1958 | Lewis |
| 2,872,875 A | 2/1959 | Mergen et al. |
| 2,886,118 A | 5/1959 | Strunk |
| 3,199,376 A | 8/1965 | De Lalio |
| 3,205,660 A | 9/1965 | Croswhite |
| 3,237,398 A | 3/1966 | Croswhite |
| 3,305,116 A | 2/1967 | McKee |
| 3,362,493 A | 1/1968 | Davis et al. |
| 3,368,425 A | 2/1968 | Lewis |

(Continued)

FOREIGN PATENT DOCUMENTS

WO    WO 00/20760    * 4/2000

*Primary Examiner*—Lesley D. Morris
*Assistant Examiner*—L. Lum
(74) *Attorney, Agent, or Firm*—King & Schickli, PLLC

(57) ABSTRACT

Devices for adjustably controlling a flow of fluid through a common passage and through first and second auxiliary passages are disclosed. The flow control devices may be used for controlling the steering of a vehicle having independently controlled driven structures, such as wheels. Various other applications of these devices and related methods are also disclosed.

74 Claims, 41 Drawing Sheets

U.S. PATENT DOCUMENTS

| | | | |
|---|---|---|---|
| 3,384,194 A | 5/1968 | Newhouse | |
| 3,514,113 A | 5/1970 | Weiswurm | |
| 3,590,658 A | 7/1971 | Tuck | |
| 3,595,014 A * | 7/1971 | McMaster | 60/581 |
| 3,596,535 A | 8/1971 | Polak | |
| 3,650,129 A | 3/1972 | Scroop et al. | |
| 3,682,044 A | 8/1972 | Ankeny et al. | |
| 3,683,694 A | 8/1972 | Granberg | |
| 3,698,498 A | 10/1972 | Stanford | |
| 3,740,953 A | 6/1973 | Mori | |
| 3,796,525 A * | 3/1974 | Kilmer | 418/61.1 |
| 3,805,675 A * | 4/1974 | Eickmann | 91/492 |
| 3,815,698 A | 6/1974 | Reed | |
| 3,862,664 A | 1/1975 | Skelly | |
| 3,872,775 A | 3/1975 | Clerk | |
| 3,891,042 A | 6/1975 | Braun | |
| 3,916,767 A * | 11/1975 | Barton | 91/516 |
| 3,942,913 A | 3/1976 | Bokelman | |
| 3,964,323 A | 6/1976 | Seibert | |
| 3,977,302 A * | 8/1976 | Eickmann | 91/492 |
| 3,986,483 A * | 10/1976 | Larson | 418/186 |
| 4,011,796 A | 3/1977 | Erickson | |
| 4,091,717 A | 5/1978 | Bojas et al. | |
| 4,126,994 A | 11/1978 | Rockwell | |
| 4,131,056 A * | 12/1978 | Rockwell | 91/492 |
| 4,151,314 A | 4/1979 | Debenham | |
| 4,154,314 A | 5/1979 | Tsuji et al. | |
| 4,175,638 A | 11/1979 | Christensen | |
| 4,183,264 A | 1/1980 | Reed | |
| 4,258,585 A | 3/1981 | Orshansky, Jr. et al. | |
| 4,328,876 A | 5/1982 | Horsch | |
| 4,331,208 A | 5/1982 | Kolthoff et al. | |
| 4,334,822 A | 6/1982 | Rossmann | |
| 4,345,488 A | 8/1982 | Reed | |
| 4,353,284 A | 10/1982 | Billottet et al. | |
| 4,371,002 A | 2/1983 | Tischer | |
| 4,395,865 A | 8/1983 | Davis, Jr. et al. | |
| 4,405,030 A * | 9/1983 | Wittren | 180/433 |
| 4,434,680 A | 3/1984 | Riediger et al. | |
| 4,446,941 A | 5/1984 | Laurich-Trost | |
| 4,485,691 A | 12/1984 | Reed | |
| 4,497,223 A | 2/1985 | Maruyama et al. | |
| 4,519,274 A | 5/1985 | Maruyama et al. | |
| 4,519,275 A | 5/1985 | Maruyama et al. | |
| 4,531,893 A | 7/1985 | Okoh et al. | |
| 4,570,730 A * | 2/1986 | Kline et al. | 180/6.48 |
| 4,572,310 A | 2/1986 | Peter | |
| 4,574,931 A | 3/1986 | Kowalczyk | |
| 4,594,939 A | 6/1986 | van Os | |
| 4,620,575 A | 11/1986 | Cuba et al. | |
| 4,642,032 A | 2/1987 | McBeth | |
| 4,682,515 A | 7/1987 | Reed | |
| 4,718,299 A | 1/1988 | Greenwood | |
| 4,787,195 A | 11/1988 | Wenzel | |
| 4,790,399 A | 12/1988 | Middlesworth | |
| 4,799,401 A | 1/1989 | Reed | |
| 4,809,796 A | 3/1989 | Yamaoka et al. | |
| 4,817,460 A | 4/1989 | Reed | |
| 4,818,200 A | 4/1989 | White, Jr. | |
| 4,835,949 A | 6/1989 | Seyerle | |
| 4,848,186 A | 7/1989 | Dorgan et al. | |
| 4,878,339 A | 11/1989 | Marier et al. | |
| 4,914,592 A | 4/1990 | Callahan et al. | |
| 4,920,733 A | 5/1990 | Berrios | |
| 4,920,734 A | 5/1990 | Wenzel | |
| 4,941,863 A | 7/1990 | Sampei et al. | |
| 4,968,227 A | 11/1990 | Szulczewski et al. | |
| 4,997,412 A | 3/1991 | Reed | |
| 5,020,308 A | 6/1991 | Braun et al. | |
| 5,030,177 A | 7/1991 | Reed | |
| 5,076,377 A | 12/1991 | Frazer | |
| 5,077,959 A | 1/1992 | Wenzel | |
| 5,080,209 A | 1/1992 | Yurko | |
| 5,090,512 A | 2/1992 | Mullet et al. | |
| 5,131,483 A | 7/1992 | Parkes | |
| RE34,057 E | 9/1992 | Middlesworth | |
| 5,174,595 A | 12/1992 | Snipes | |
| 5,181,579 A | 1/1993 | Gilliem | |
| 5,195,600 A | 3/1993 | Dorgan | |
| 5,199,619 A | 4/1993 | Mostashari | |
| 5,243,321 A | 9/1993 | Iwata | |
| 5,279,206 A | 1/1994 | Krantz et al. | |
| 5,388,850 A | 2/1995 | Simone | |
| 5,397,279 A | 3/1995 | McCotter, Jr. | |
| 5,400,594 A * | 3/1995 | Hayens | 60/487 |
| 5,518,380 A | 5/1996 | Fujii et al. | |
| 5,529,135 A | 6/1996 | Wenzel et al. | |
| 5,545,014 A | 8/1996 | Sundberg et al. | |
| 5,644,903 A | 7/1997 | Davis, Jr. | |
| 5,649,606 A | 7/1997 | Bebernes et al. | |
| 5,653,466 A | 8/1997 | Berrios | |
| 5,676,034 A | 10/1997 | Krantz | |
| 5,685,215 A | 11/1997 | Jepsen et al. | |
| 5,706,907 A | 1/1998 | Unruh | |
| 5,722,501 A | 3/1998 | Finch et al. | |
| 5,809,755 A | 9/1998 | Velke et al. | |
| 5,809,756 A | 9/1998 | Scag et al. | |
| 5,809,781 A | 9/1998 | Krantz | |
| 5,822,961 A | 10/1998 | Busboom | |
| 5,836,415 A | 11/1998 | Barrowman | |
| 5,842,378 A | 12/1998 | Zellmer | |
| 5,848,520 A | 12/1998 | Arfstrom et al. | |
| 5,865,087 A | 2/1999 | Olson | |
| 5,887,671 A | 3/1999 | Yuki et al. | |
| 5,897,450 A | 4/1999 | May | |
| 5,913,802 A | 6/1999 | Mullet et al. | |
| 5,956,953 A | 9/1999 | Folsom et al. | |
| 5,957,229 A * | 9/1999 | Ishii | 180/6.48 |
| 5,964,313 A | 10/1999 | Guy | |
| 5,983,614 A | 11/1999 | Hancock et al. | |
| 6,092,617 A | 7/2000 | White, III et al. | |
| 6,129,164 A | 10/2000 | Teal et al. | |
| 6,131,689 A | 10/2000 | Nodorft et al. | |
| 6,170,584 B1 | 1/2001 | Mistry et al. | |
| 6,185,920 B1 | 2/2001 | Oxley | |
| 6,189,305 B1 | 2/2001 | Wright et al. | |
| 6,196,342 B1 | 3/2001 | Teal et al. | |
| 6,227,816 B1 | 5/2001 | Breuer et al. | |
| 6,257,357 B1 | 7/2001 | Teal et al. | |
| 6,260,641 B1 | 7/2001 | Hidaka | |
| 6,276,486 B1 | 8/2001 | Velke et al. | |
| 6,283,236 B1 | 9/2001 | Teal et al. | |
| 6,325,166 B1 * | 12/2001 | Shimada et al. | 180/6.48 |
| 6,327,839 B1 | 12/2001 | Velke et al. | |
| 6,361,457 B1 | 3/2002 | May et al. | |
| 6,378,300 B1 | 4/2002 | Johnson et al. | |
| 6,464,025 B1 | 10/2002 | Koeper et al. | |
| 6,601,663 B2 * | 8/2003 | Hauser | 180/6.3 |
| 6,637,313 B1 * | 10/2003 | Kerr | 92/72 |
| 6,755,264 B2 * | 6/2004 | Hasegawa et al. | 180/6.2 |

* cited by examiner

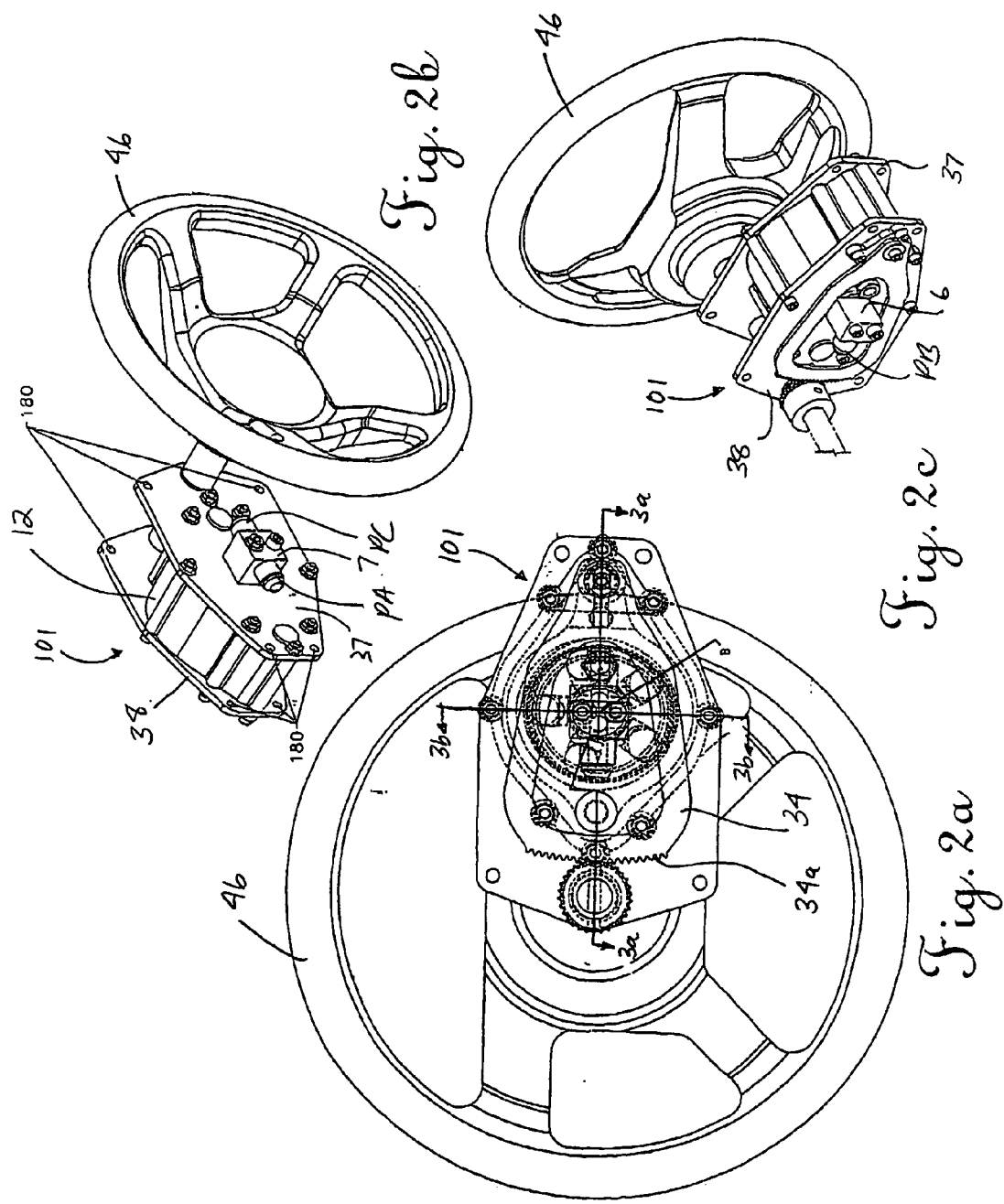

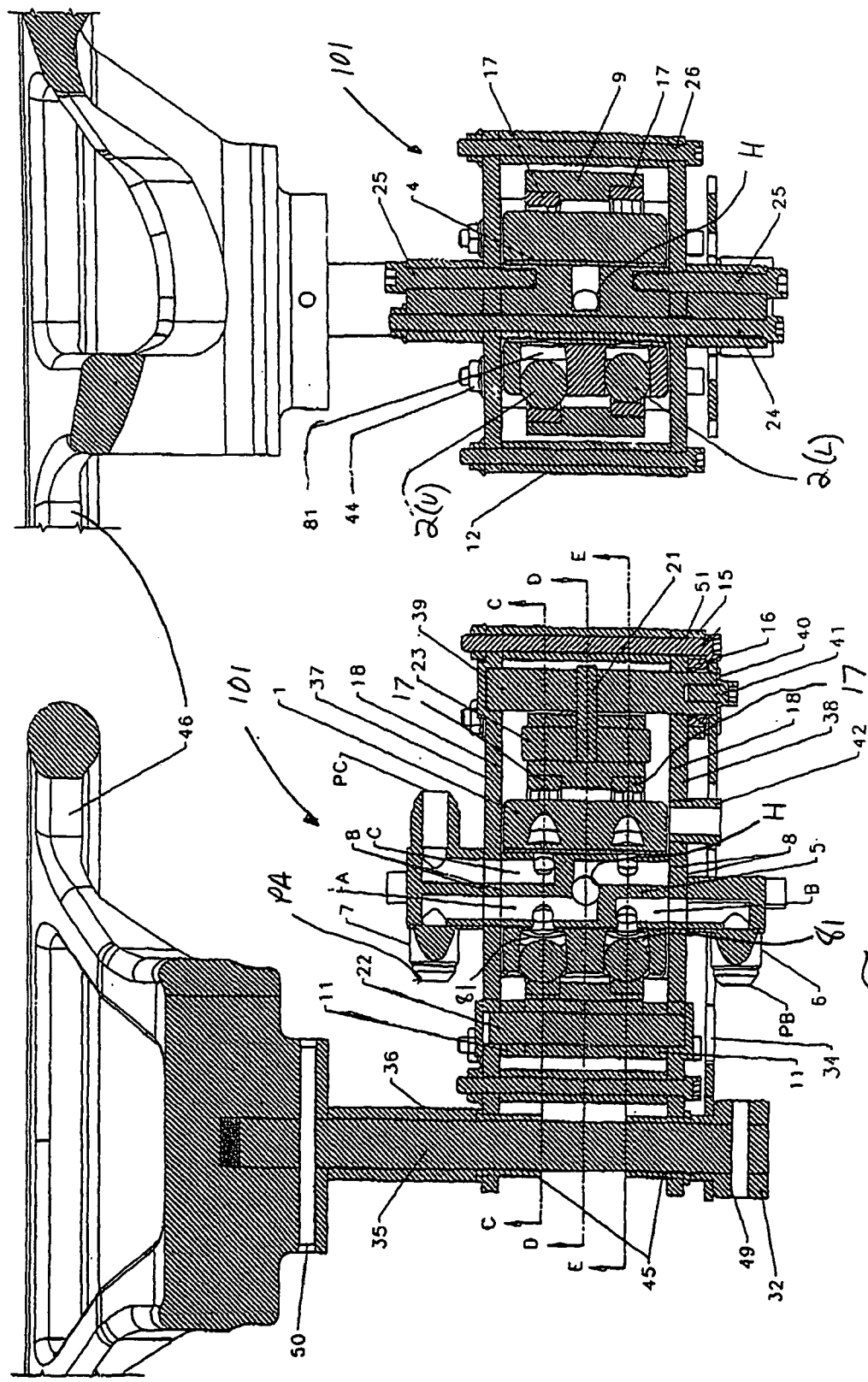

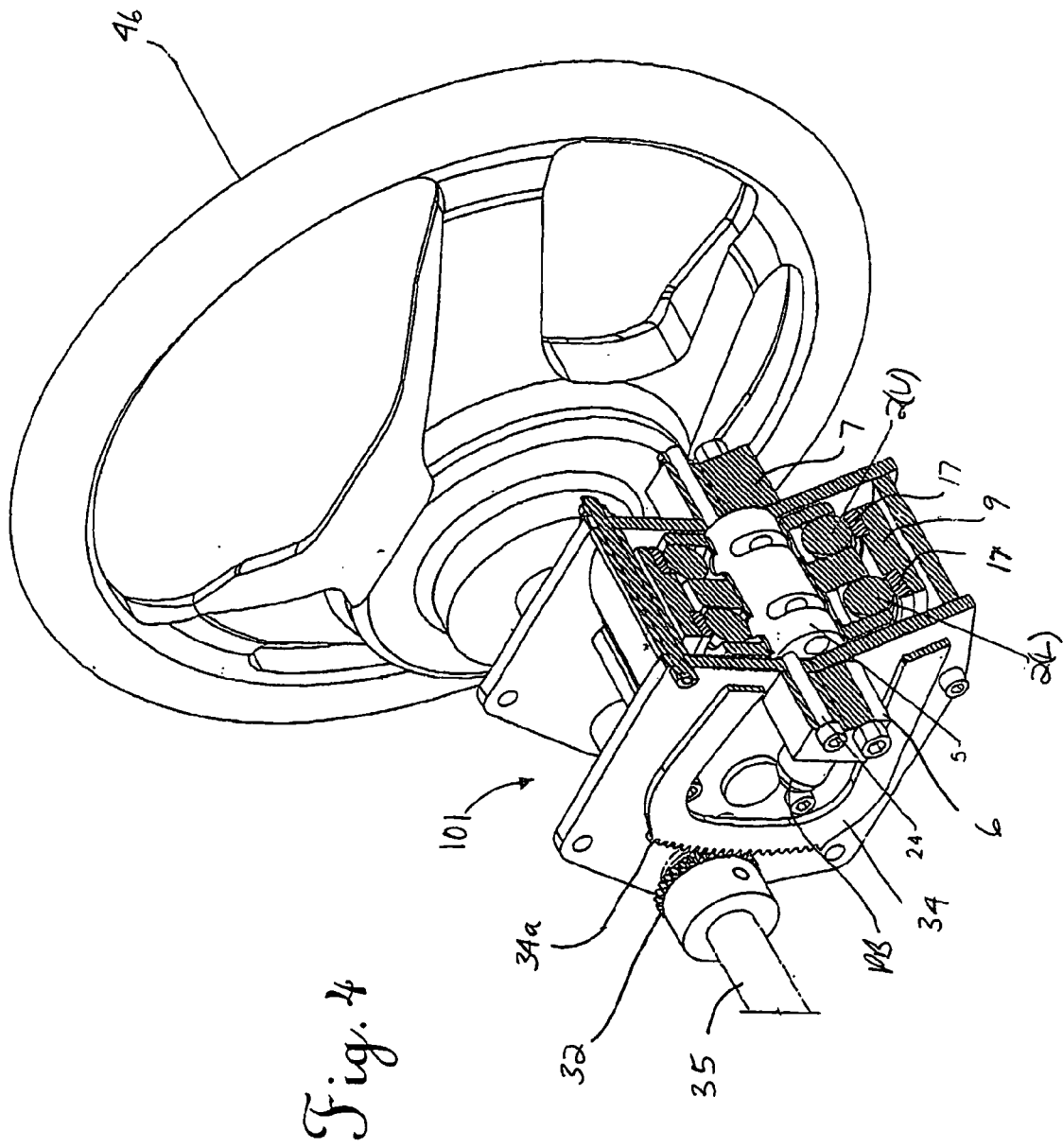

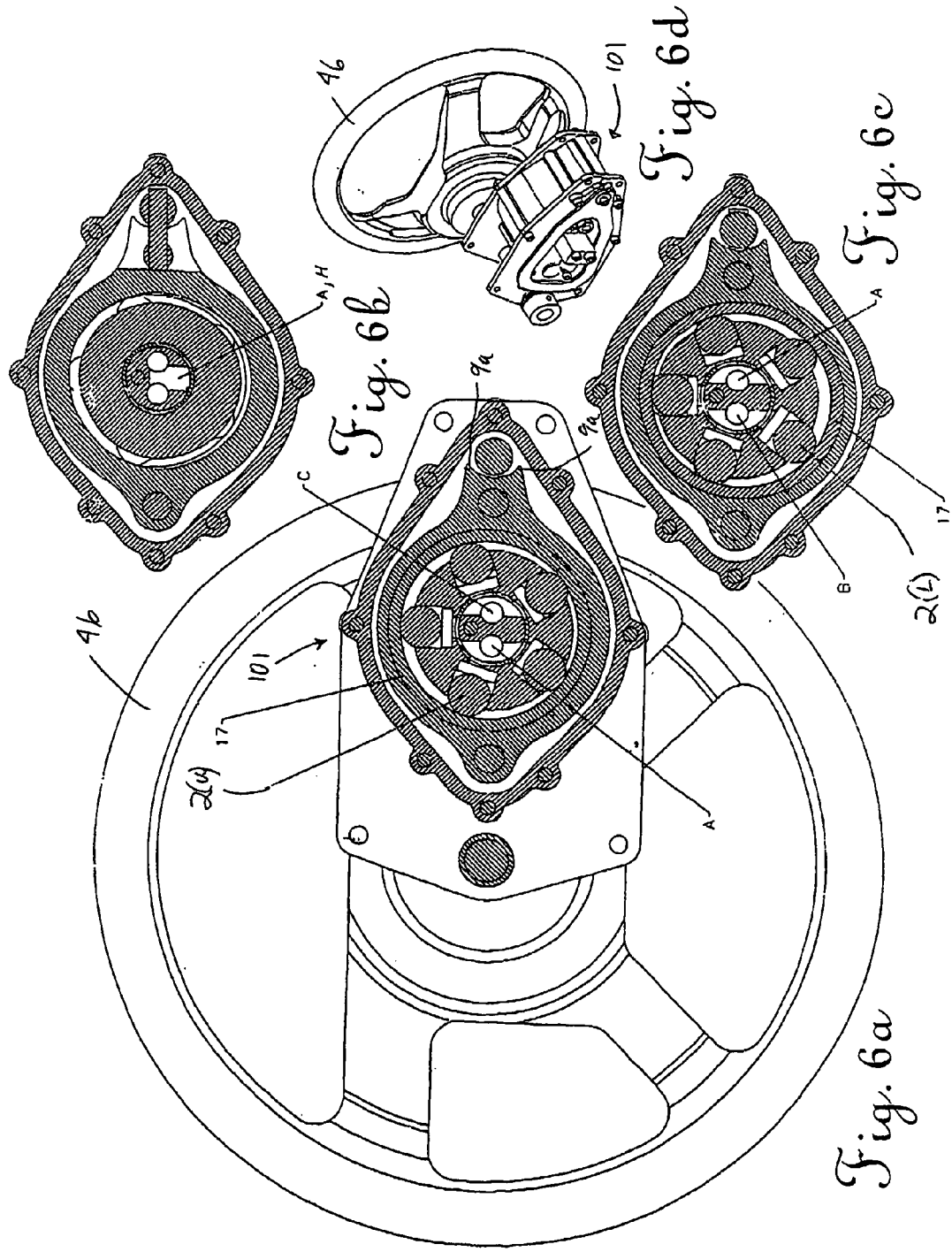

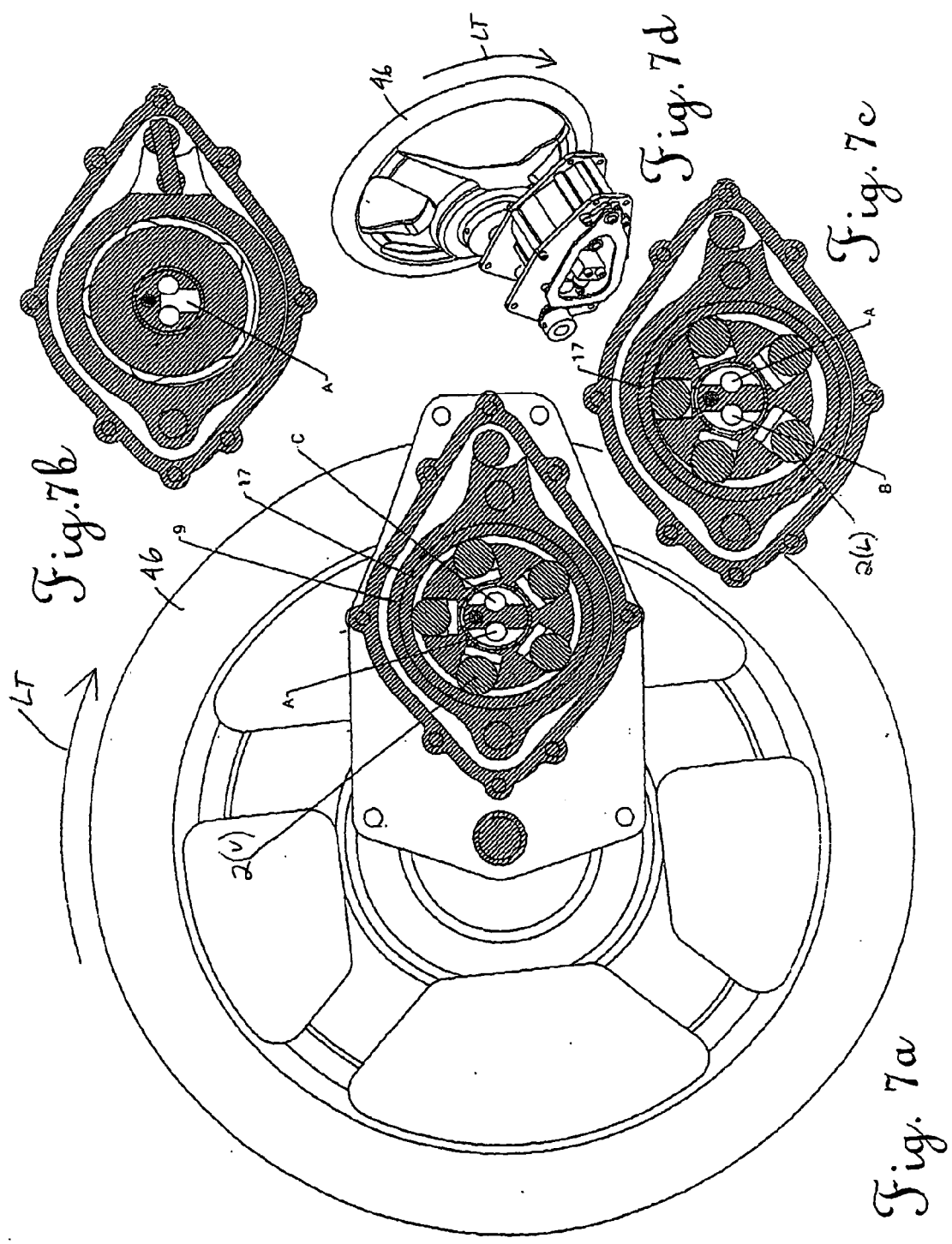

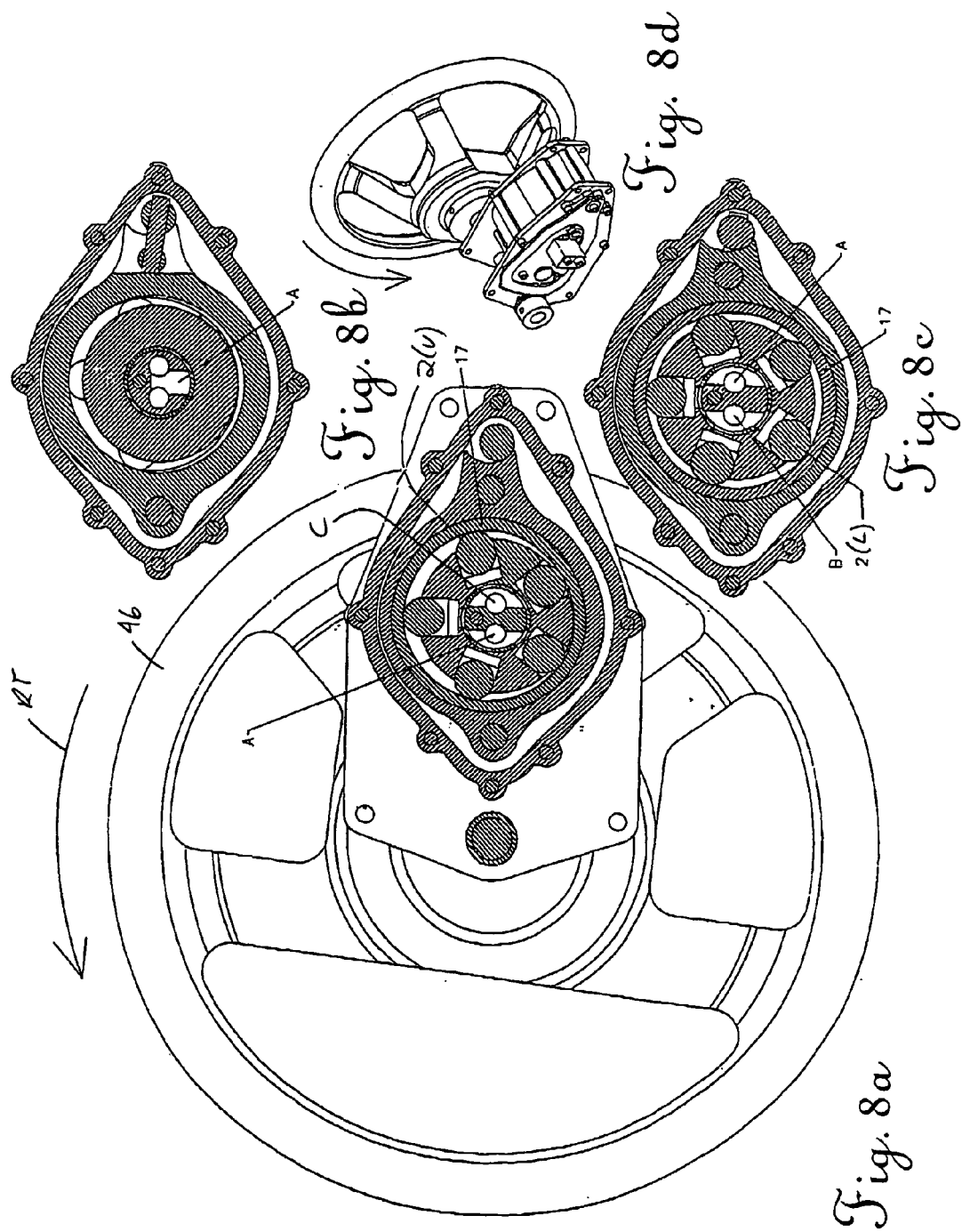

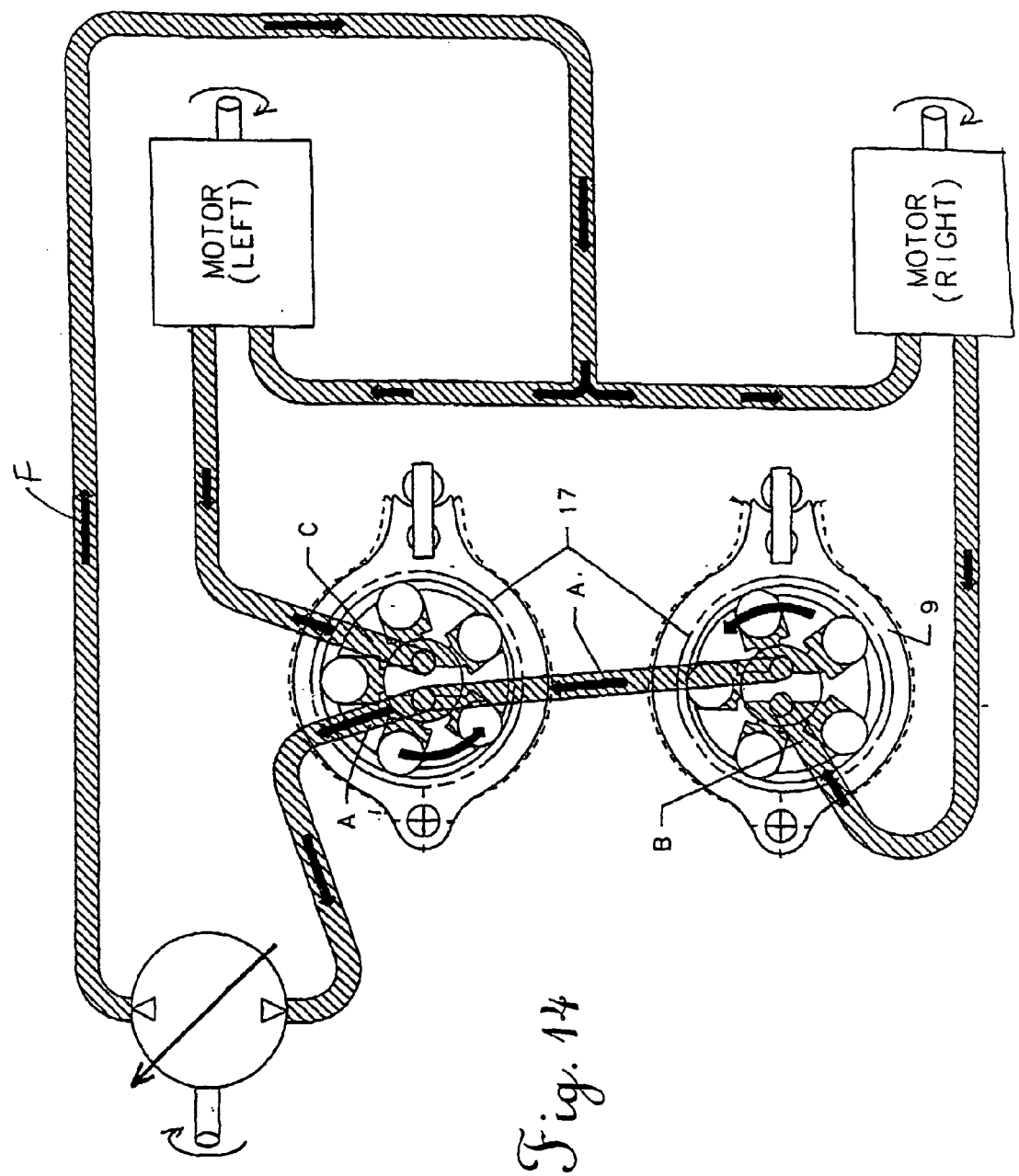

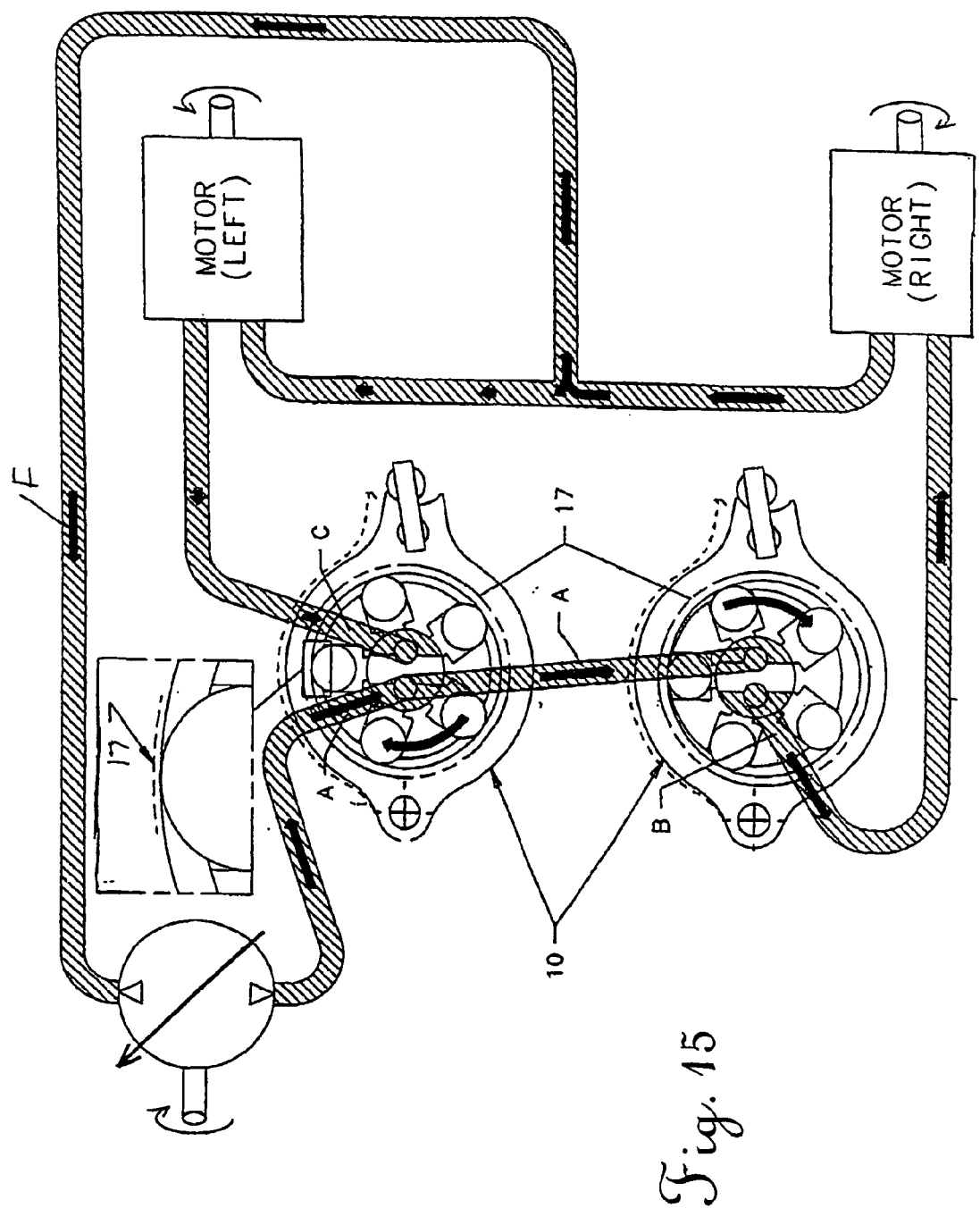

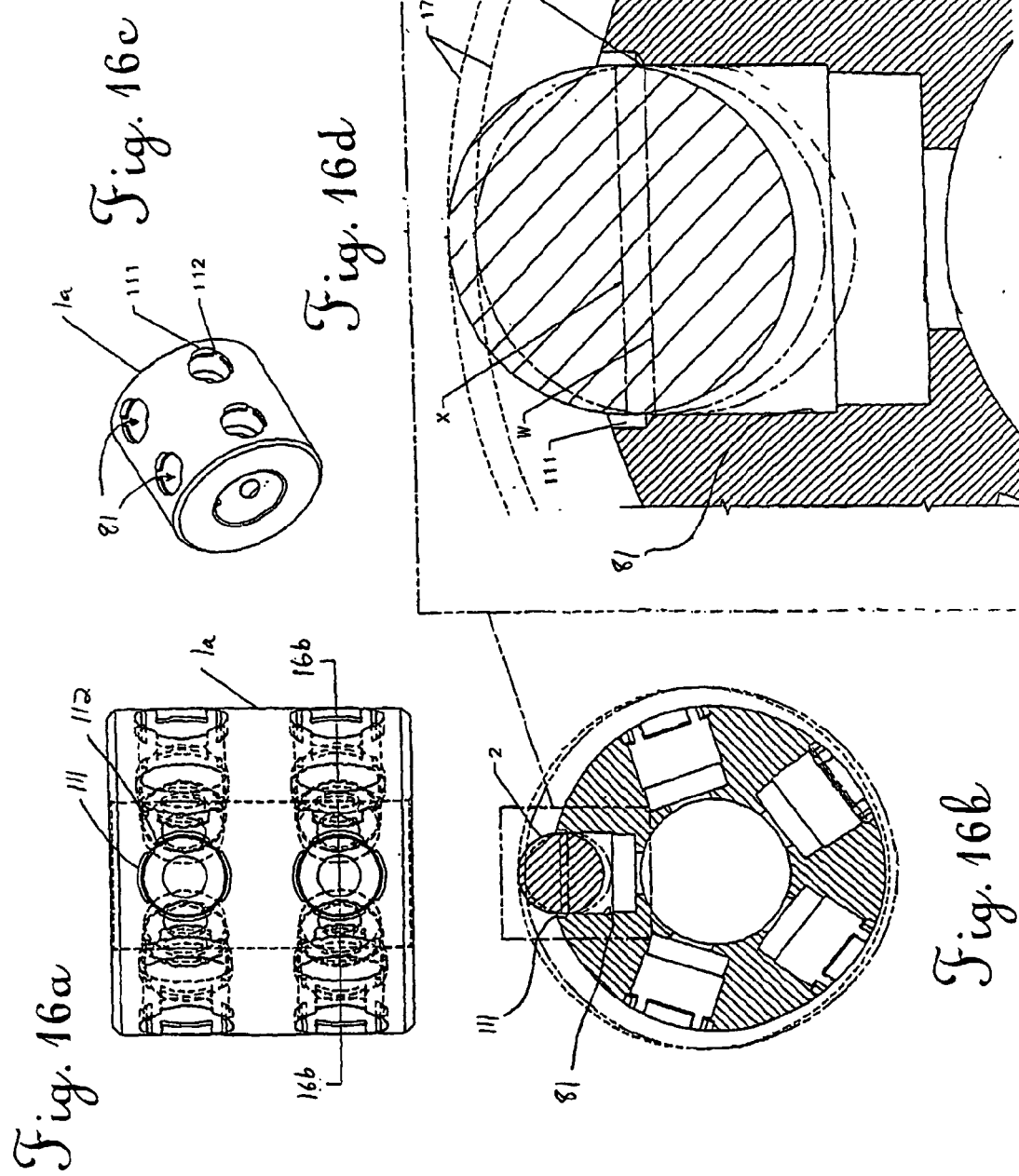

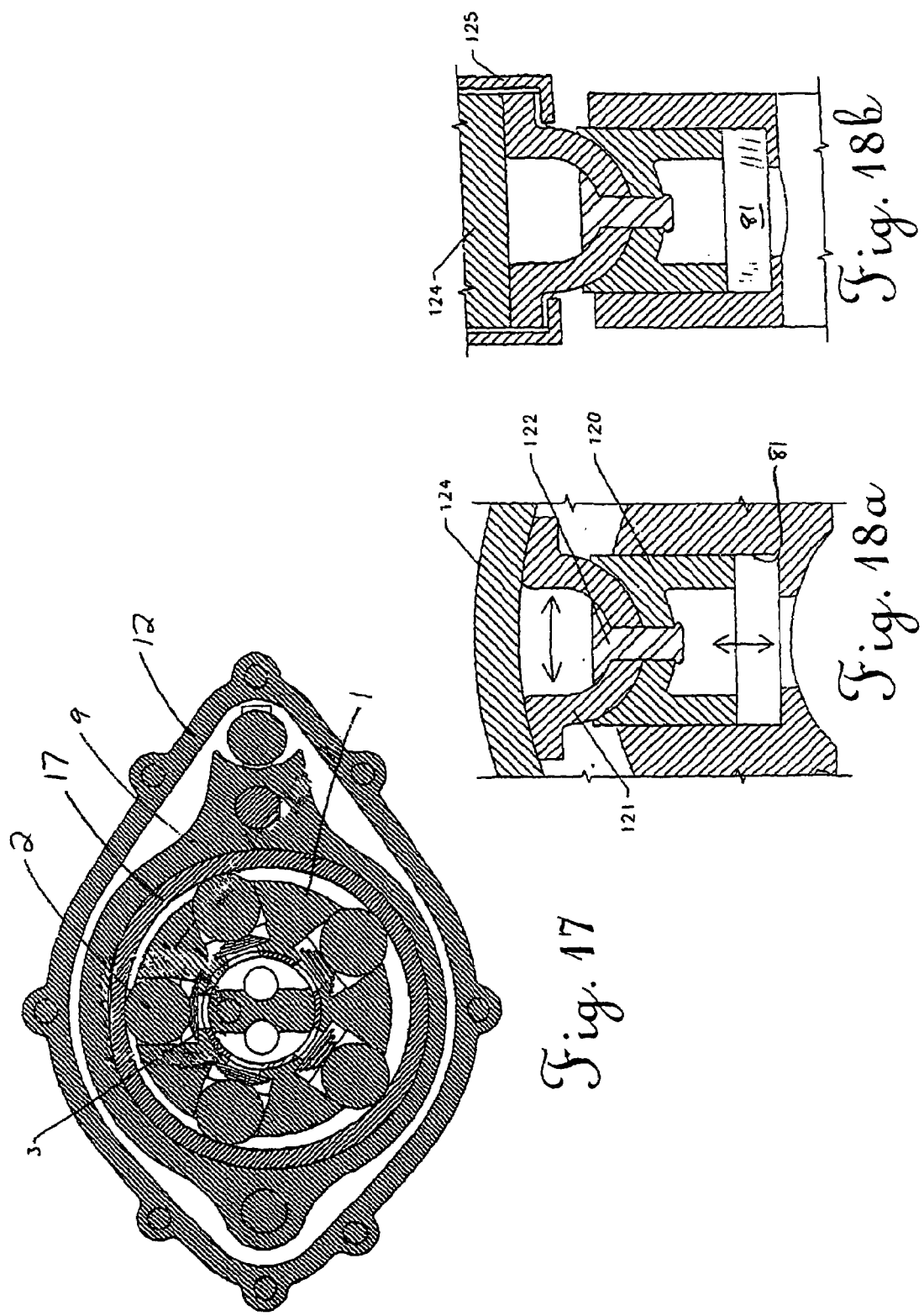

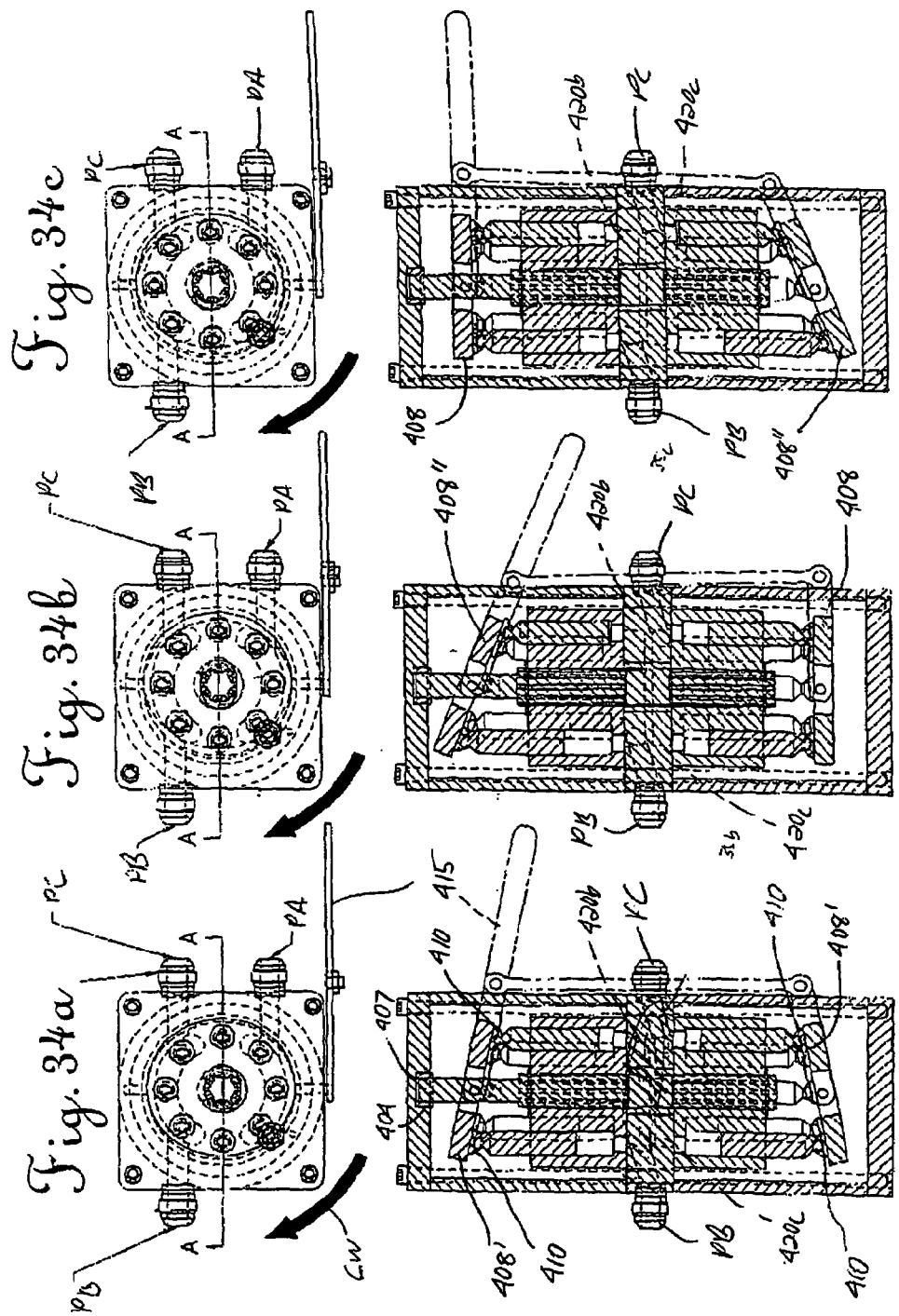

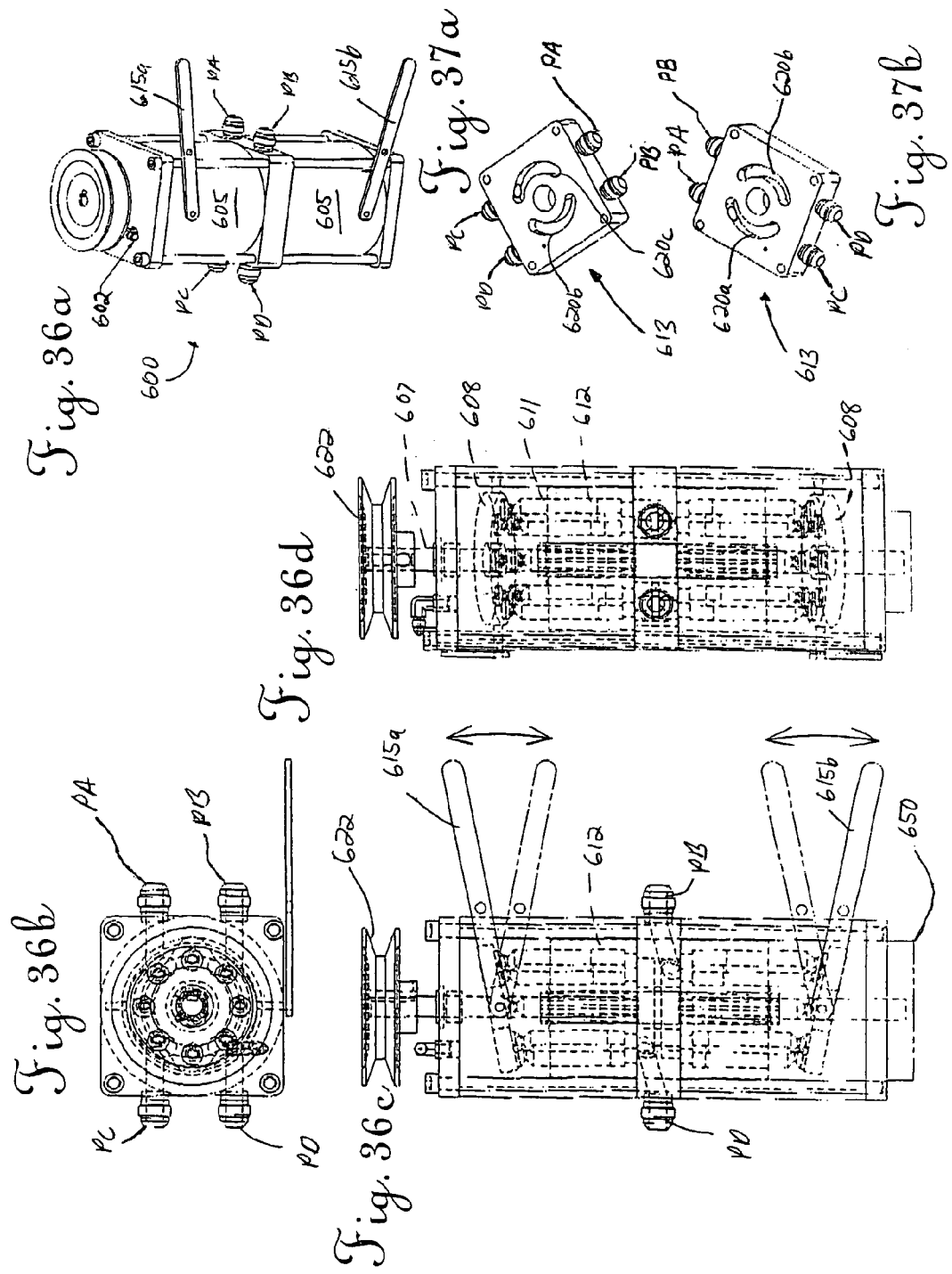

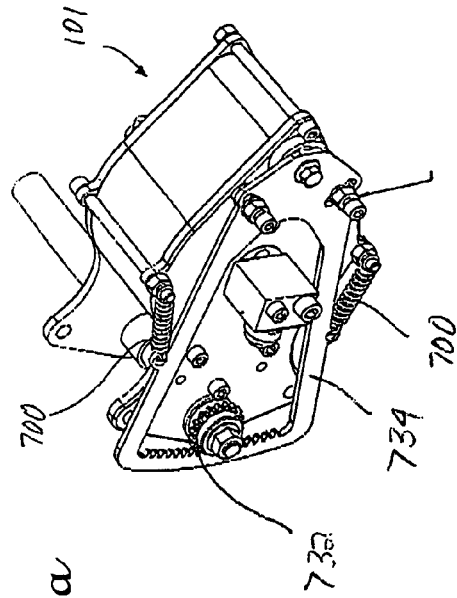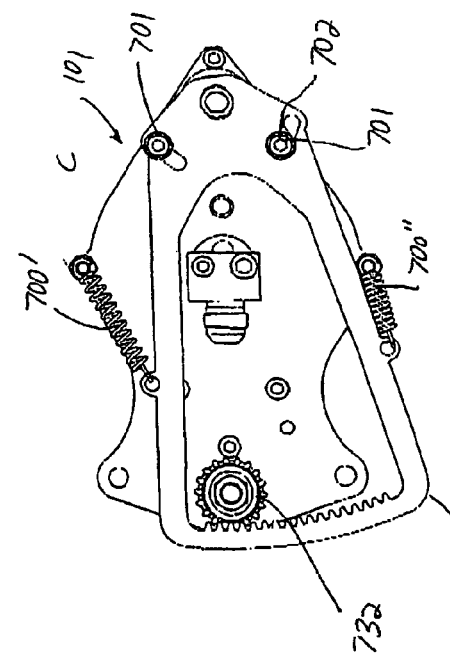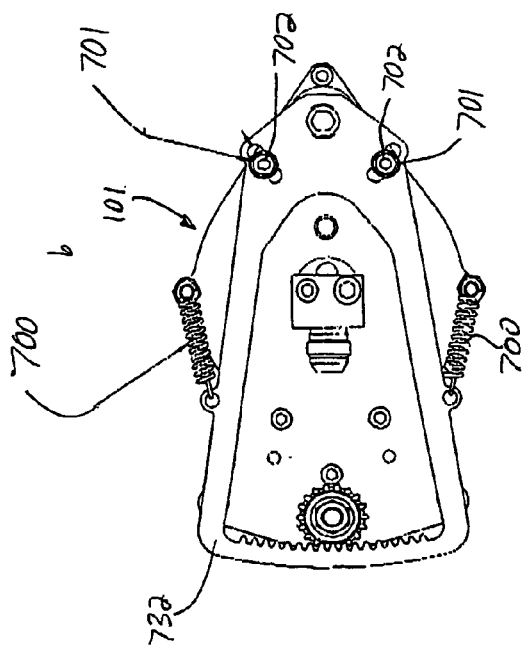
Fig. 42a
Fig. 42b
Fig. 42c

VARIABLE FLOW CONTROL DEVICES, RELATED APPLICATIONS, AND RELATED METHODS

This application claims the benefit of U.S. Provisional Patent Application Ser. No. 60/329,542, filed Oct. 17, 2001, U.S. Provisional Patent Application Ser. No. 60/359,387, filed Feb. 25, 2002, U.S. Provisional Patent Application Ser. No. 60/390,266, filed Jun. 20, 2002, and U.S. Provisional Patent Application Ser. No. 60/398,155, filed Jul. 24, 2002 the disclosures of which are each incorporated herein by reference.

TECHNICAL FIELD

The present invention relates generally to the field of fluid flow and, more particularly, to devices for selectively controlling or adjustably metering a flow of fluid through a common passage and through first and second auxiliary passages. The devices maybe used for controlling the steering of a vehicle having independent driven structures, such as wheels, or in various other applications, such as in pumps for pumping fluids.

BACKGROUND OF THE INVENTION

Vehicles, such as a riding lawn mowers, with "zero turning radius" (ZTR) capability are well-known in the art. Many existing ZTR riding lawn mower designs use two individually controlled pumps, each for independently controlling a drive wheel motor to achieve extreme ZTR maneuverability characteristics. This is referred to as "drive-wheel-steering" because the steering is controlled by the rotational ratio of the left and right drive tires, with the tires at the other end of the chassis being mounted for free rotation, such as on casters. Navigating this type of vehicle generally requires a skilled operator, since the controls are usually in the form of a non-intuitive joystick or twin steering levers associated with the separate pumps. The same problem exists in bulldozers and many other types of vehicles where crawler tracks provide not only the motive force for the vehicle, but also control the direction in which the vehicle travels.

Another ZTR control arrangement requires two different pumps mounted in the same transmission, as recently introduced by John Deere in the form of a SPIN-STEER mower and described in U.S. Pat. No. 6,257,357B1. In this arrangement, one pump is dedicated to chassis propulsion while the other is dedicated to steering the chassis. Although this design is capable of utilizing a more convenient steering wheel instead of steering levers, it deleteriously requires complicated linkages. Additionally, the vehicle using this control arrangement has a noticeably variable turn rate that depends upon chassis speed. It also has drive line packaging limitations due to the provision of the dual pumps in an all-in-one integral transmission. Since many commercial mowers utilize drive trains with individually mounted components such as wheel motors, pumps, etc., use of this control arrangement is generally unsuitable, absent substantial design modifications.

Accordingly, a need exists for eliminating the complexity associated with this and similar prior art proposals, while at the same time improving the overall operation of the vehicle having ZTR capability.

SUMMARY OF THE INVENTION

In accordance with a first aspect of the invention, an apparatus intended for use in selectively controlling or adjustably metering a flow of fluid through a common passage and through first and second passages is disclosed. The apparatus comprises a rotatable body having first and second axially spaced openings in selective fluid communication with the common passage and the first and second passages as the body rotates; a piston associated with each opening and capable of moving therein between a first position and a second, displaced position; and first and second non-concentric engagement structures for engaging and selectively moving the piston associated with each of the first and second openings between the first and second positions as the body rotates for directing the fluid flow through only the first passage, only the second passage, or proportionally through both the first and second passages.

In one embodiment, a pivotally mounted cradle supports the first and second engagement structures. The cradle is movable in a first direction such that the first engagement structure moves the piston in the first opening as the body rotates and in a second, generally opposite direction such that the second engagement structure moves the piston in the second opening as the body rotates. The non-concentric engagement structures are axially spaced, circular races formed along or supported by an inner surface of the cradle. The rotatable body is generally cylindrical in shape and includes a center opening and first and second sets of axially spaced openings, each associated with a single piston. Each piston may be a ball capable of moving radially inwardly and outwardly between the first and second positions in a reciprocal fashion when selectively moved by the corresponding non-concentric engagement structure. The pistons are urged outwardly in a radial direction toward the corresponding engagement structure by fluid entering the first and second openings through the center opening.

A post may be provided about which the body rotates. The post may include at least a portion of the common passage and at least a portion of the first and second passages. A housing may be provided for supporting the post. A pin may be supported by the housing for pivotally supporting the cradle.

In operation, fluid flows through the common passage and through the first and second passages in substantially equal proportions when the cradle is in a first (home) or centered position. At least a portion of the fluid flow may be directed through the common passage and through the first passage by positioning the cradle such that the first engagement structure selectively engages and moves the piston in the first opening between the first and second positions as the body rotates. Likewise, at least a portion of the fluid flow may be directed through the common passage and through the second passage by positioning the cradle such that the second engagement structure selectively engages and moves the piston in the second opening between the first and second positions as the body rotates. Optionally, at least a portion of the fluid flow may be directed through the common passage and through one of the first or second passages in a first flow direction by positioning the cradle in a first or second direction such that the first or second engagement structure engages the corresponding first or second piston, with a degree of eccentricity of the other engagement structure being such that fluid is proportionally directed through the other passage in a second flow direction generally opposite the first flow direction.

The housing may support a gear engagement structure connected to the cradle for mating with at least one gear associated with a rotatable steering device. Consequently, the gear engagement structure and hence the cradle is selectively moved from a home or centered position in a first direction or in a second direction to selectively control or adjustably meter the flow through the first or second passages as the steering device is rotated. Means for dampening vibrations acting on the gear engagement structure may also be provided.

In an alternate embodiment, the piston comprises a shoe for engaging the corresponding engagement structure, a body positioned in the corresponding opening, and a connector connecting the shoe to the body. Each opening for the piston may also include an oversized portion defining a gap. This gap allows fluid to pass the corresponding piston when in the first or non-displaced position in the opening.

In accordance with a second aspect of the invention, a system for intended use in selectively controlling or adjustably metering a flow of fluid is provided. The system comprises a housing; an elongated, rotatable body having a center opening defining an axis and first and second axially spaced openings; a piston associated with each opening and capable of moving therein between a first position and a second position for displacing any fluid in the opening; and a cradle pivotally supported by the housing. The cradle includes first and second non-concentric engagement structures. The first engagement structure is capable of engaging and selectively moving the piston associated with the first opening between the first and second positions. The second engagement structure is capable of engaging and selectively moving the piston associated with the second opening between the first and second positions. A post is supported by the housing for positioning in the center opening of the body. The post includes a common passage in selective fluid communication with the first and second openings in the body, a first passage in selective fluid communication with the first opening, and a second passage in selective fluid communication with the second opening. Accordingly, fluid flow through the common passage may be selectively controlled or adjustably metered through only the first passage, through only the second passage, or proportionally through both the first and second passages by selectively positioning the cradle in the first direction or the second direction to cause the first or second engagement structures to selectively move or stroke the corresponding piston between the first and second positions as the body rotates.

In one embodiment, the system includes first and second hydraulic motors in fluid communication with the first and second passages, respectively, whereby the selective control or adjustable metering of the fluid flow through the first and second passages controls the corresponding hydraulic motor. The system may further include a chassis supporting left and right driven structures operably associated with the first and second hydraulic motors and a main pump capable of bi-directionally pumping fluid to control the direction of rotation of the hydraulic motors and the corresponding driven structures.

With respect to flow control, the rotatable body may include first and second sets of axially spaced openings. Each opening may be associated with a piston in the form of a ball that is capable of moving radially between the first and second positions when engaged by the corresponding non-concentric engagement structure. Preferably, the first and second engagement structures are formed along an inner surface of the cradle. However, these structures may also take the form of races supported by the cradle. Preferably, the engagement structures are such that, when the cradle is at a centered position relative to the body, a stroke of the piston in each first opening as the body rotates is substantially equal to a stroke of the piston in each second opening. As the cradle moves from the centered position, the stroke of the piston in each first opening as the body rotates is reduced by the same amount the stroke of the piston in each second opening is increased.

The system may further include a steering device for engaging and causing the cradle to pivot in the first direction or the second direction from the home or centered position. In one embodiment, the steering device is a swing steer assembly including a rotatably mounted swing steer handle coupled to a first sprocket connected to a second sprocket by an endless chain. The second sprocket is in turn associated with a gear for mating with a gear engagement structure for causing the cradle to pivot when the swing steer handle is rotated.

In a second embodiment, the steering device includes a steering wheel and a steering wheel support shaft carrying a gear for mating with a gear engagement structure associated with the cradle for causing the cradle to pivot when the steering wheel is rotated. The system may further include a non-driven ground-engaging wheel, and the steering wheel support shaft may be connected to and control an orientation of the non-driven wheel. Another possibility is to provide first and second, non-driven ground-engaging wheels coupled to a steering linkage, with the steering wheel support shaft being connected to the steering linkage and controlling the orientation of the non-driven wheels.

The system may further include including an auxiliary pump and means for actuating the auxiliary pump to direct fluid flow through the first hydraulic motor to cause the left driven structure to rotate in a direction opposite the right driven structure when the steering wheel is rotated to at or near a full left hand turn position and to direct fluid through the second hydraulic motor to cause the right driven structure to rotate in a direction opposite the left driven structure when the steering wheel is rotated to at or near a full right hand turn position. In one embodiment, the actuating means includes first and second outwardly directed levers associated with the steering wheel for engaging a linkage associated with a switch for selectively controlling operation of the auxiliary pump. In another embodiment, the actuating means includes first and second outwardly directed levers associated with the steering wheel for selectively engaging means for activating a pump motor associated with the auxiliary pump. Means for disabling the pump motor when the direction of fluid flow from the main pump is reversed may also be provided. Alternatively, means for reversing the pump motor when the direction of fluid flow from the main pump is reversed may be provided. In yet another embodiment, the actuating means includes first and second switches for engaging the gear engagement structure when the steering structure (wheel or handle) is at or near the full right hand and full left hand turn positions.

In accordance with a third aspect of the invention, an apparatus intended for selectively controlling or adjustably metering a flow of fluid is disclosed. The apparatus comprises a rotatable body including a plurality of openings; a vane at least partially received in each opening; a cradle having an eccentric inner surface for selectively engaging and causing the vanes to move to and fro in the openings as the body rotates; and a structure including a common passage and first and second passages in fluid communication with at least the common passage. In operation, the vanes are selectively engaged and moved in the slots to selectively control the proportion of the fluid flowing through the first and second passages.

In one embodiment, the openings are radially extending slots, with each vane being slidably received in the corresponding slot. The structure including the common passage and the first and second passages is the sidewall of a housing containing the body. The common passage includes first and second recesses formed in the sidewall, the recesses being interconnected by an auxiliary passage also formed in the sidewall. Preferably, the slots include an oversized portion in fluid communication with a groove or channel formed in the sidewall, whereby the pressurized fluid is communicated through the groove or channel to the oversized portion of the opening to assist in forcing the corresponding vane radially outwardly and into engagement with the eccentric inner surface. A vent port and a common port may also be formed in the first sidewall.

Preferably, the cradle is mounted for pivoting movement within a housing and a lever is provided for pivoting the cradle in the first or second direction from a centered or home position. Additionally, the apparatus may be incorporated into a system comprising a pump and first and second hydraulic motors in fluid communication with the first and second passages, respectively. Accordingly, selectively controlling or adjustably metering the fluid flow through the passages serves to control the corresponding hydraulic motor in proportion to the movement of the cradle. The system may further include first and second driven structures operably associated with the first and second hydraulic motors.

In accordance with a fourth aspect of the invention, an apparatus intended for use in selectively controlling or adjustably metering a flow of fluid is disclosed. The apparatus comprises first and second rotatable bodies having an axis of rotation, each including at least one axially aligned opening; a piston positioned at least partially in each opening, and first and second engagement structures for engaging a first end of each piston. The engagement structures are selectively movable for controlling the stroke of each piston in the axial direction (and may result in a piston not being stroked at all). A valve structure including a common passage in selective fluid communication with a first passage by way of the opening in the first body and a second passage by way of the opening in the second body is provided. Using this apparatus, the fluid flow through the first and second passages may be selectively controlled or adjustably metered as the bodies rotate depending on the position of the engagement structures for controlling the stroke of each piston in the axial direction.

In one embodiment, each rotatable body includes a plurality of axially aligned openings and the first and second engagement structures are mounted for pivoting movement relative to the axis of rotation. A linkage may also be provided for coupling a first lever associated with the first engagement structure to a second lever associated with the second engagement structure. A nominal position of the first lever moves the first and second engagement structures such that equal fluid flow through the first and second passages results; a first position of the first lever results in full fluid flow through the first passage; and a second position of the first lever results in full fluid flow through the second passage. The flow is proportional to the lever position at all points between the first and second positions.

A connector may also be provided for interconnecting the first and second bodies via splined interface. A motive device may also be coupled to the connector for rotating the first and second bodies, such that the apparatus forms a pump for pumping fluid from the common passage to the first and second passages, or vice-versa, depending on the stroke of the pistons associated with each rotatable body. The valve structure is preferably positioned between the first and second bodies.

In accordance with a fifth aspect of the invention, an apparatus intended for use in pumping a fluid is disclosed. The apparatus comprises first and second rotatable bodies having an axis of rotation, each including at least one axially aligned opening; a piston positioned at least partially in each opening, and first and second engagement structures for engaging a first end of each piston. The engagement structures are selectively movable for controlling the stroke of each piston in the axial direction as the corresponding body rotates. A valve structure including a first passage in fluid communication with a second passage by way of the opening in the first body and a third passage in fluid communication with a fourth passage by way of the opening in the second body is also provided. A motive device for synchronizing the rotation of the first and second bodies also forms a part of the apparatus. In use, fluid is pumped from the first and third passages to the second and fourth passages, respectively, or vice-versa, depending on the fluid flow direction and the position of the engagement structures for controlling the stroke of each piston in the axial direction as the bodies rotate.

In one embodiment, each rotatable body includes a plurality of axially aligned openings. The first and second engagement structures may be pivotally mounted in a housing. Each structure may be coupled to an external lever used to selectively move the corresponding engagement structure for controlling the stroke of each piston (and a linkage may also be provided for linking the two levers). A single charge pump in fluid communication with the housing may also be provided for assisting in urging each piston axially outwardly.

In accordance with a sixth aspect of the invention, a system for intended use in steering a vehicle having left and right driven structures associated with first and second fluid-actuated motive devices for moving the vehicle to and fro is disclosed. The system comprises a steering device including a single rotatable steering structure having a full right hand turn and a full left hand turn position; a main pump for supplying a flow of fluid under pressure to the first and second motive devices; and a variable flow control device for directing substantially all of the fluid flow through the first motive device associated with the left driven structure when the steering structure is at the full right hand turn position, directing substantially all of the fluid flow through the second motive device associated with the right driven structure when the steering structure is at the full left hand turn position, and proportional flow at all points between the full right hand and left hand turn positions.

In one embodiment, the variable flow control device comprises a housing; an elongated, generally cylindrical rotatable body having a center opening defining an axis of rotation and first and second sets of axially spaced openings defining piston chambers; a piston positioned in each piston chamber and capable of moving therein between a first position and a second, displaced position; a pivotally mounted cradle associated with the steering device, the cradle including first and second non-concentric engagement structures for sequentially displacing the pistons associated with the first set of openings as the body rotates when the cradle is moved in a first direction and for sequentially displacing the pistons associated with the second set of openings as the body rotates when the cradle is moved in a second direction; and a generally cylindrical post supported by the housing and received in the center opening of the body. The post includes a common passage in fluid communication with the main pump and in selective fluid communication with both the first and second sets of piston chambers as the body rotates, a first passage in fluid communication with the first motive device and in selective fluid communication with each of the first set of openings as the body rotates; and a second passage in fluid communication with the second motive device and in selective fluid communication with each of the second set of openings as the body rotates. Accordingly, substantially all of the flow of fluid through the common passage is directed through the first passage by positioning the cradle in the first direction when the steering structure is at the full right hand turn position and is directed through the second passage by positioning the cradle in the second direction when the steering structure is at the full left hand turn position.

The steering structure may comprise a steering wheel, in which case the steering device includes a steering wheel support shaft carrying a gear for mating with a gear engagement structure coupled to the cradle. The first and second driven structures may be wheels, and the system may further include one or more non-driven, ground-engaging wheels. The steering wheel support shaft may be connected to and control an orientation of a single non-driven wheel. Instead, the system may include first and second non-driven, ground-engaging wheels coupled to a steering linkage for controlling the orientation of the non-driven wheels, in which case the steering wheel support shaft is connected to the steering linkage.

Alternatively, the steering device may be a swing steer assembly and the steering structure may be a rotatably mounted swing steer handle coupled to a first sprocket connected to a second sprocket by an endless chain. The second sprocket may be associated with a gear for mating with a gear engagement structure for causing the cradle to pivot in a first direction or a second direction when the swing steer handle is rotated in a corresponding direction.

The system may further include a bi-directional auxiliary pump for directing fluid flow through at least one of the first or second motive devices to cause the corresponding driven structure to rotate in a direction opposite the other driven structure, as well as means for actuating this auxiliary pump when the steering structure is at the full right hand or full left hand turn positions In one embodiment, the actuating means includes first and second outwardly directed levers associated with the steering wheel for engaging a linkage associated with a switch for selectively controlling operation of the auxiliary pump. In another embodiment, the actuating means includes first and second outwardly directed levers associated with the steering structure for selectively engaging means for activating a pump motor associated with the auxiliary pump. Means for disabling the pump motor when the direction of fluid flow from the main pump is reversed may also be provided. Alternatively, means for reversing the pump motor when the direction of fluid flow from the main pump is reversed may be provided. In yet another embodiment, the actuating means includes first and second switches for engaging the gear engagement structure when the steering structure (wheel or handle) is at or near the full right hand and full left hand turn positions.

In accordance with a seventh aspect of the invention, a system for intended use in steering a vehicle having left and right driven structures for moving the vehicle to and fro is disclosed. The system comprises a steering device including a single rotatable steering structure having turning range extending between a full right hand turn and a full left hand turn position; first and second fluid-actuated motive devices for moving the left and right driven structures; a main pump for supplying a flow of fluid to first and second motive devices; a variable flow control device for directing substantially all of the fluid flow through the first motive device associated with the left driven structure when the steering structure is at the full right hand turn position and directing substantially all of the fluid flow through the second motive device associated with the right driven structure when the steering structure is at the full left hand turn position; and a bi-directional auxiliary pump for directing fluid flow through the second motive device for moving the left driven structure in a reverse direction only when the steering structure is at or near the full left hand turn position and for directing fluid flow through the first motive device for moving the right driven structure in a reverse direction only when the steering structure is at or near the full right hand turn position.

In accordance with an eighth aspect of the invention, a system for intended use in steering a vehicle having left and right driven structures associated with first and second fluid-actuated motive devices for driving the left and right driven structures for moving the vehicle to and fro is disclosed. The system comprises a steering device including a single rotatable steering wheel supported by a support structure movable between a forward drive, a reverse drive, and a neutral position and a linkage associated with the support structure for causing the first and second motive devices to move the left and right driven structures in a forward direction when the steering wheel support structure is moved to a forward drive position and to move the left and right driven structures in a reverse direction when the steering wheel support structure is moved to a reverse drive position. The system may further include a main pump for bi-directionally directing fluid through the first and second motive devices, as well as a variable flow control device for directing substantially all of the fluid flow from the main pump through the first motive device associated with the left driven structure when the steering wheel is at a full right hand turn position, directing substantially all of the fluid flow through the second motive device associated with the right driven structure when the steering wheel is at a full left hand turn position, and proportionally dividing fluid flow between the first and second motive devices when the steering wheel is between the full right hand and full left hand turn positions. The system may further include a bi-directional auxiliary pump for directing fluid flow through the second motive device for moving the left driven structure in a reverse direction only when the steering wheel is at or near the full left hand turn position and for directing fluid flow through the first motive device for moving the right driven structure in a reverse direction only when the steering wheel is at or near the full right hand turn position.

In accordance with a ninth aspect of the invention, a steering device for intended use in steering a vehicle, such as a ride on or walk-behind lawn mower, having a direction and speed of travel, is disclosed. The steering device comprises an upstanding, pivotally and rotatably mounted swing steer handle for controlling the direction of travel and means associated with the swing steer handle for controlling the speed of travel. The device may further include a damper for dampening the pivoting movement of the swing steer handle. The control means may include a rotatable grip supported by the swing steer handle. The swing steer handle may pivot between a first, generally upstanding position for use in an application where an operator is riding on the vehicle and a second, pivoted position for use in an application where an operator is walking behind the vehicle.

In accordance with a tenth aspect of the invention, a method of adjustably metering a flow of fluid through a common passage and through first and second passages is disclosed. The method comprises: (1) rotating a body carrying a piston in each of first and second sets of axially spaced openings in selective fluid communication with the common passage and the first and second passages as the body rotates; and (2) positioning first and second non-concentric engagement structures adjacent to the body for sequentially displacing the pistons as the body rotates for selectively directing fluid through the common passage and through the first and second passages. The rotating step may further comprise rotating the body in a first direction to direct fluid from the common passage to one or both of the first and second passages, or rotating the body in a second direction to direct fluid from the first and second passages to the common passage. The first and second non-concentric engagement structures may be associated with a pivoting cradle and the method may further include the step of pivoting the cradle in a first direction such that only the pistons in the first set of openings are sequentially displaced for directing fluid through only the first passage. The method step may further comprise pivoting the cradle in a second direction such that only the pistons in the second set of openings are sequentially displaced for directing fluid through only the second passage.

In accordance with an eleventh aspect of the invention, a method of adjustably metering a flow of fluid through a common passage and through first and second passages is disclosed. The method comprises rotating a body carrying a piston in each of first and second sets of axially spaced openings in selective fluid communication with the common passage and the first and second passages as the body rotates; engaging and sequentially displacing the pistons in the first set of openings for directing fluid from the common passage to the first passage, or vice-versa; and engaging and sequentially displacing the pistons in the second set of openings for directing fluid from the common passage to the second passage, or vice-versa. The method may further include the step of: (1) engaging and sequentially displacing the only the pistons in the first set of openings for directing fluid from the common passage to only the first passage, or vice-versa; or (2) engaging and sequentially displacing the only the pistons in the second set of openings for directing fluid from the common passage to only the second passage, or vice-versa.

In accordance with a twelfth aspect of the invention, a method of adjustably metering a flow of fluid through a common passage and through first and second passages is disclosed. The method comprises: (1) rotating a body including a plurality of openings in which vanes are slidably received in a cradle including an eccentric inner surface for engaging a distal end of each vane; and (2) providing a cradle for engaging and sequentially displacing the vanes for directing fluid through the common passage and the first and second passages in equal proportions. The method may further comprise the step of positioning the cradle at a first position for sequentially displacing the vanes in the first set of openings for directing more fluid through the first passage, as well as the step of positioning the cradle at a second position for sequentially displacing the vanes in the second set of openings for directing more fluid through the second passage.

In accordance with a thirteenth aspect of the invention, a method of adjustably metering a flow of fluid through a common passage and through first and second passages is disclosed. The method comprises rotating first and second bodies about an axis of rotation, each body including at least one axially aligned opening having a first end in which a piston is at least partially received; placing the common passage in fluid communication with a second end of the opening in both bodies during rotation, the first passage in fluid communication with the opening of the first body during rotation, and the second passage in fluid communication with the opening of the second body during rotation; and displacing one or both of the pistons as the bodies rotate to direct fluid flow through the common passage and through one or both of the first and second passages. The method may further include the step of providing an external motive device for rotating the first and second bodies, whereby the fluid is pumped through the passages by the pistons.

In accordance with a fourteenth aspect of the invention, a method of pumping a fluid is disclosed. The method comprises rotating first and second bodies about an axis of rotation, each body including at least one axially aligned opening having a first end in which a piston is at least partially received; selectively placing a first passage and a second passage in fluid communication with the opening in the first body during rotation and selectively placing a third passage and a fourth passage in fluid communication with the opening in the second body during rotation; and displacing at least one of the pistons as the bodies rotate to direct fluid through the corresponding first and second or third and fourth passages.

BRIEF DESCRIPTION OF THE DRAWINGS

FIG. 2a is a bottom plan view of a steering system including the variable flow control device;

FIG. 2b is a front perspective view of the arrangement in FIG. 2a;

FIG. 2c is a rear perspective view of the arrangement in FIG. 2b;

FIG. 3a is across-sectional view taken along line 3a–3a of FIG. 2a;

FIG. 3b is a cross-sectional view taken along line 3b–3b of FIG. 2a;

FIG. 4 is a partially enlarged, partially cross-sectional, partially cutaway view of the variable flow control device and the steering system;

FIG. 6a is an enlarged, partially cross-sectional view of the variable flow control device when in a straight travel position taken along line C—C of FIG. 3a;

FIG. 6b is an enlarged, partially cross-sectional view of the variable flow control device when in a straight travel position taken along line D—D of FIG. 3a;

FIG. 6c is an enlarged, partially cross-sectional view of the variable flow control device when in a straight travel position taken along line E—E of FIG. 3a;

FIG. 6d is a perspective view of the steering system including the variable flow control device in a straight travel position;

FIG. 7a is an enlarged, partially cross-sectional view of the variable flow control device when in a full left hand turn position taken along line C—C of FIG. 3a;

FIG. 7b is an enlarged, partially cross-sectional view of the variable flow control device when in a full left hand turn position taken along line D—D of FIG. 3a;

FIG. 7c is an enlarged, partially cross-sectional view of the variable flow control device when in a full left hand turn position taken along line E—E of FIG. 3a;

FIG. 7d is a perspective view of the steering system including the variable flow control device in a full left hand turn position;

FIG. 8a is an enlarged, partially cross-sectional view of the variable flow control device when in a full right hand turn position taken along line C—C of FIG. 3a;

FIG. 8b is an enlarged, partially cross-sectional view of the variable flow control device when in a full right hand turn position taken along line D—D of FIG. 3a;

FIG. 8c is an enlarged, partially cross-sectional view of the variable flow control device when in a full right hand turn position taken along line E—E of FIG. 3a;

FIG. 8d is a perspective view of the steering system including the variable flow control device in a full right hand turn position;

FIG. 9b is a side view of the cradle of FIG. 9a;

FIG. 9c is a perspective view of the cradle of FIG. 9a;

FIG. 14 is a schematic flow diagram showing reverse flow when the variable flow control device is in the straight ahead travel position;

FIG. 15 is a schematic flow diagram showing a partial reverse flow situation;

FIGS. 16a–16d are various views of an alternate embodiment of a piston body for use in the variable flow control device of FIG. 3a;

FIG. 17 is a cross-sectional view illustrating the use of springs for biasing the pistons outwardly in the variable flow control device of FIG. 3a;

FIGS. 18a and 18b are cross-sectional views showing an alternate embodiment of a piston for use in the variable flow control device of FIG. 3a;

FIGS. 27a and 27b are front and rear perspective views of an alternate embodiment of a variable flow control device shown in FIG. 27;

FIGS. 33a and 33b are perspective top and bottom views of the valve structure used in the variable flow control device of FIGS. 31a–31d;

FIGS. 34a–34c and 35a–35c are corresponding views showing three different modes of operation of the variable flow control device of FIGS. 31a–31d;

FIGS. 36a–36d are various views of an embodiment of a variable flow control device for use in pumping applications;

FIGS. 37a and 37b are top and bottom views of a valve structure for use in the embodiment of FIGS. 36a–36d;

FIGS. 42a–42c are different views of the variable flow control device of FIG. 3a including means for dampening vibrations; and FIG. 43 is an enlarged side view of an alternate embodiment of the gear engagement structure and lever for use with the variable flow control device of FIG. 3a.

DETAILED DESCRIPTION OF THE INVENTION

Figure 1A:
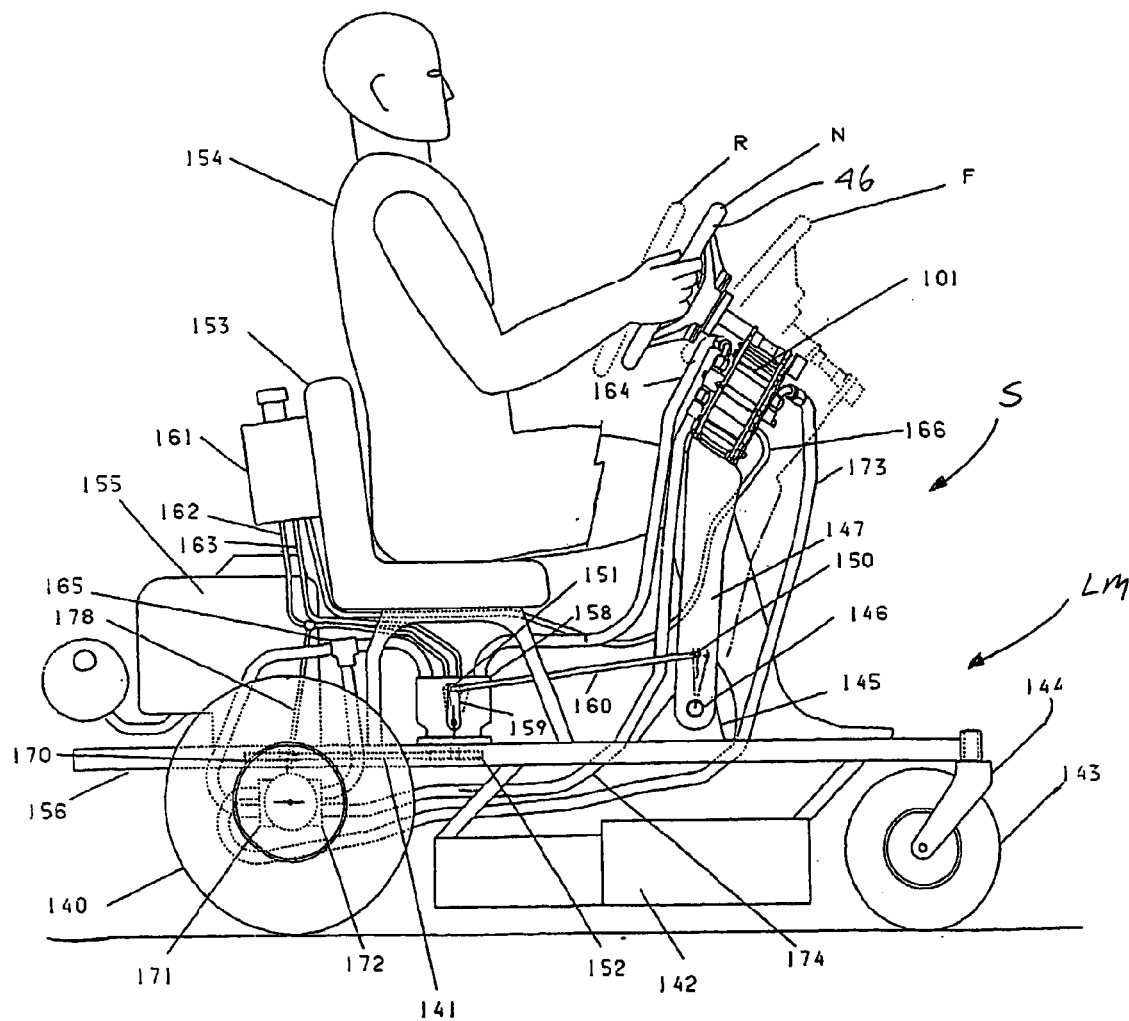
FIG. 1a is a side view showing a riding lawn mower in which the variable flow control device forming one aspect of the invention.

Reference is now made to FIG. 1a, which shows one possible use of a variable flow control device 101 in a steering system S on a lawn mower LM. The system S includes first and second motive devices in the form of fluid-actuated, hydraulic motors 171 and 172 mounted respectively on the left and right sides of the frame or chassis 156. Left and right drive structures in the form of wheels including ground-engaging tires 140 are associated with and driven by each motor 171, 172. In this exemplary embodiment, two caster yokes 144 carrying wheels 143 are attached at the end of the chassis 156 opposite the driven wheels (although an arrangement where all four wheels are driven is possible, as is an arrangement where one or more non-driven wheels are independently steered). Also attached to the chassis 156 is an implement, such as a mower deck 142, and seat 153 for operator 154 (with the right leg cutaway to provide a full view of the steering system S).

Figure 1B:
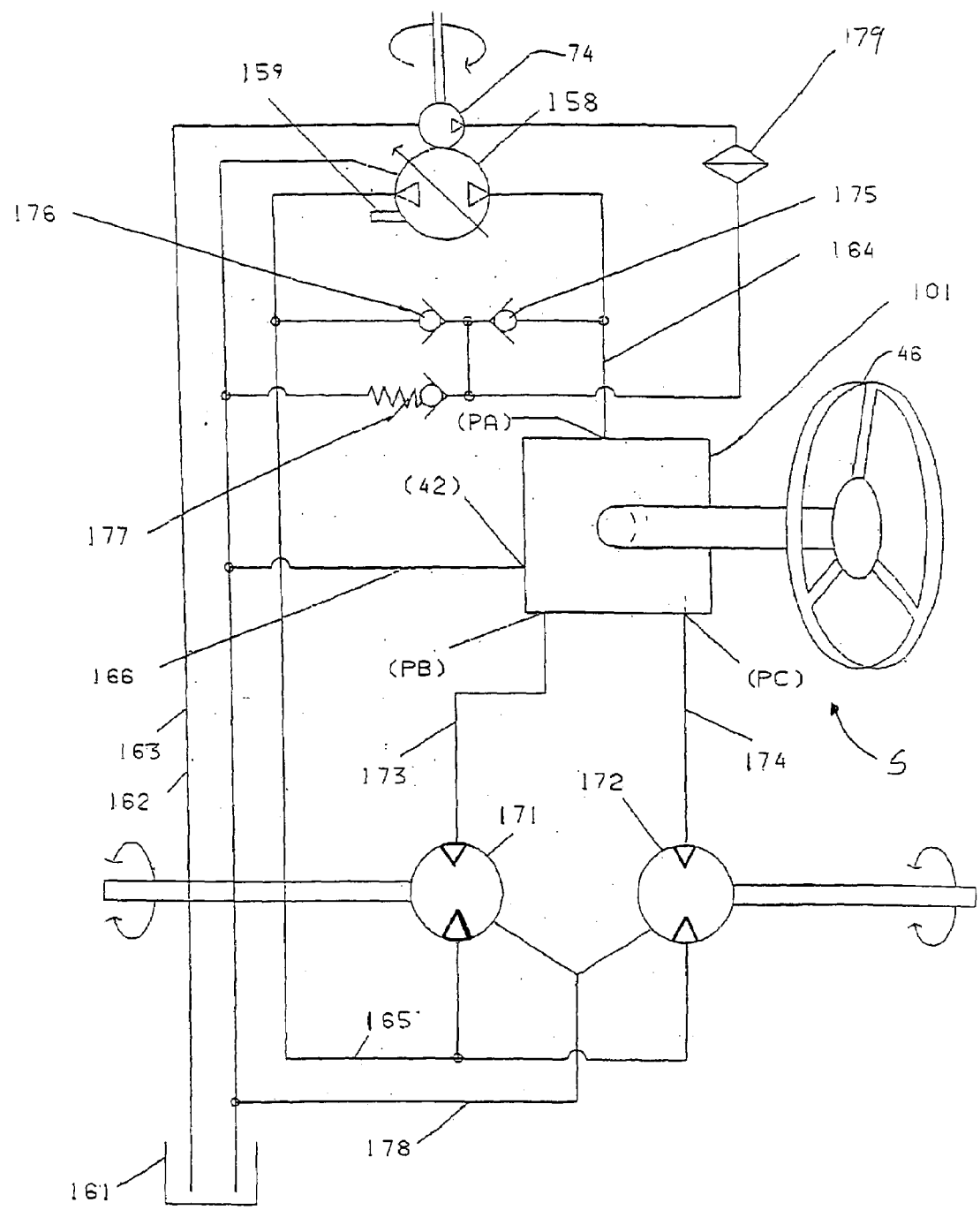
FIG. 1b is a schematic diagram showing an example of a hydraulic circuit used in the lawn mower of FIG. 1 (see also FIG. 38)
Figure 5:
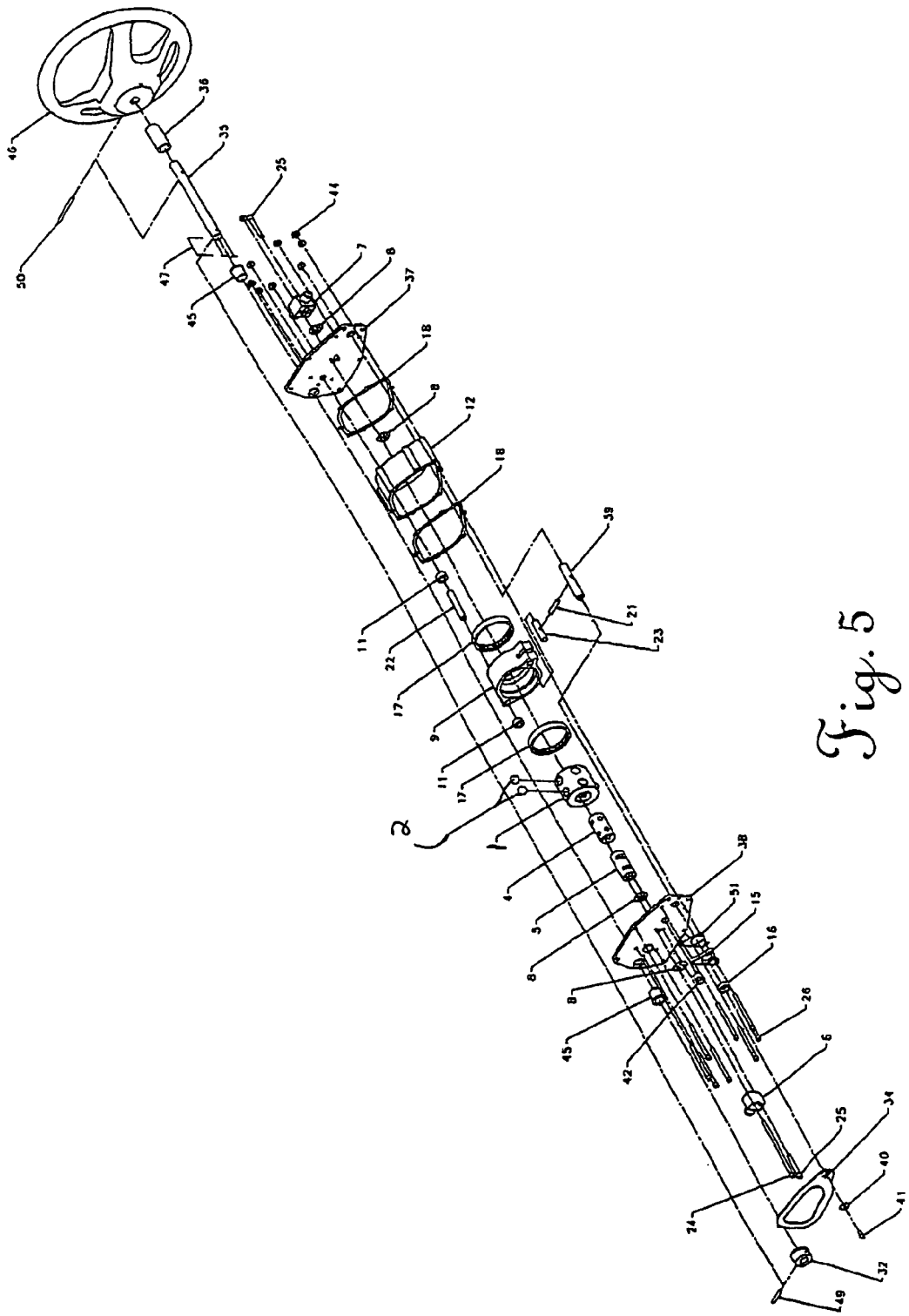
FIG. 5 is an exploded view of the arrangement shown in FIG. 4.
Figure 9A:
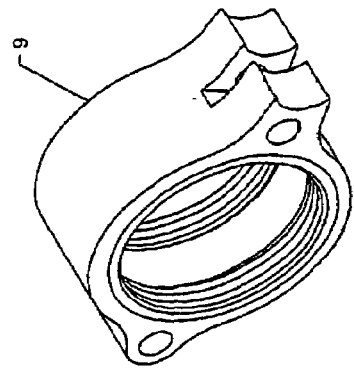
FIG. 9a is a top view of the cradle used in one embodiment of the variable flow control device.
Figure 9C:
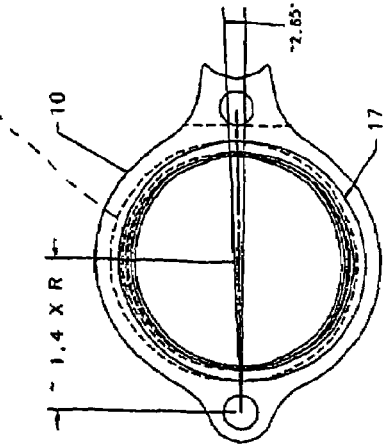
Figure 9D:
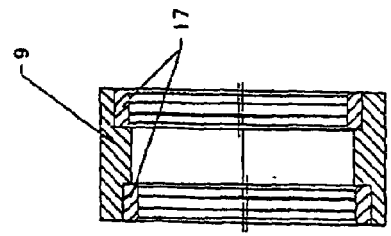
FIG. 9d is a cross-sectional view taken along line 9d–9d in FIG. 9b.
Figure 9B:
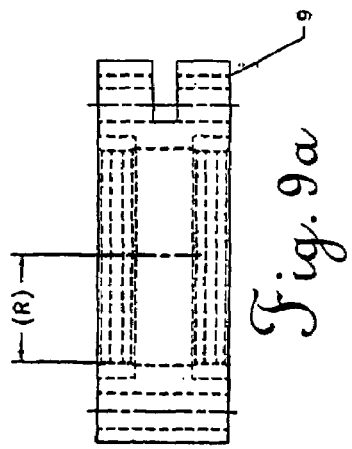
Figure 38:
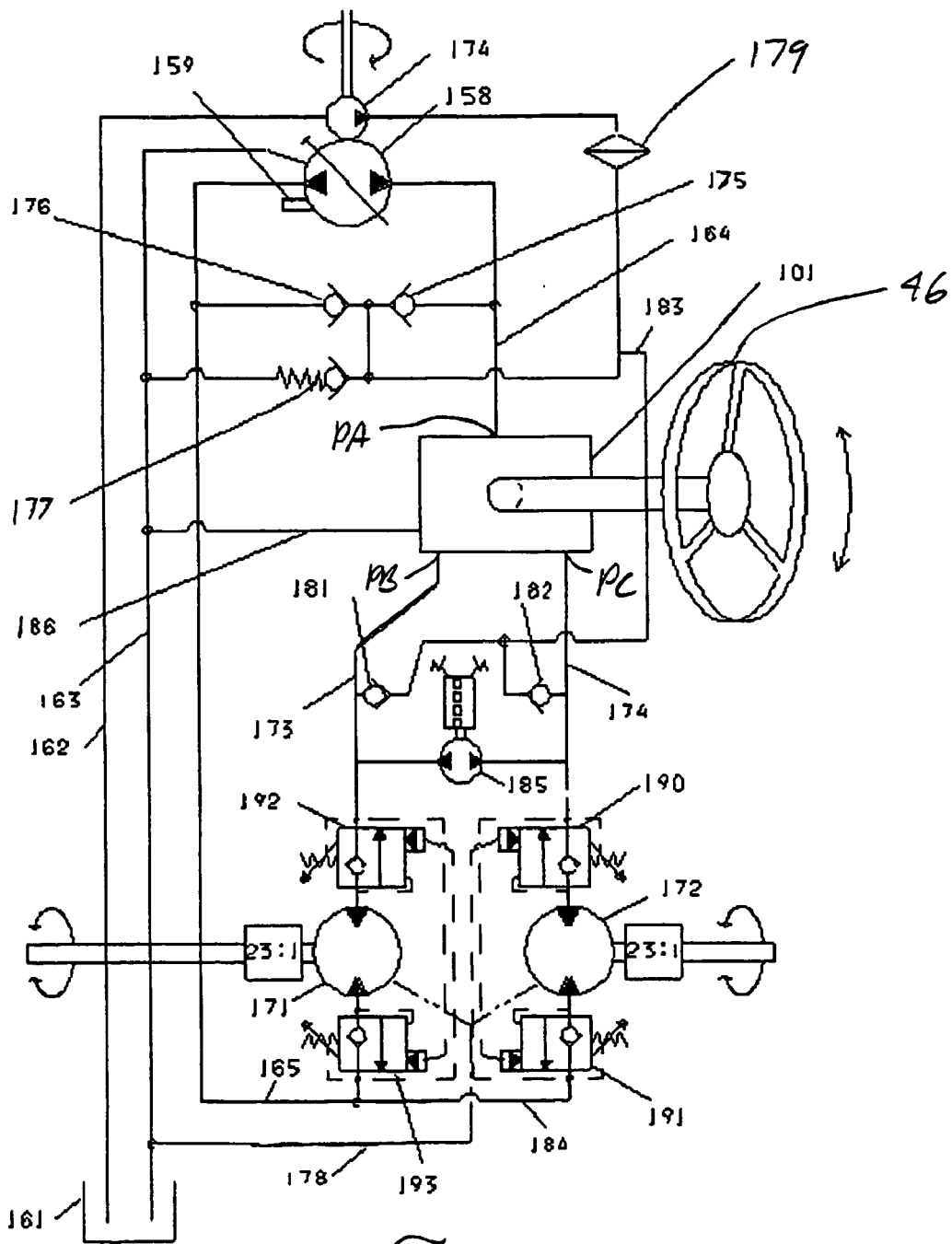
FIG. 38 is a schematic diagram of the hydraulic circuit of FIG. 1b including counterbalance valves.

In this embodiment, an onboard engine 155 powers a main variable displacement pump 158 by way of an engine pulley 170, belt 141 and pump pulley 152. As shown in FIG. 1b, this pump 158 is connected to a sump 161 by way of hoses 162 and 163. The primary pump ports PA, PB, PC (see FIG. 1b) are connected to the flow control device 101 by a hose 164 and to the motors 171 and 172, such as using a "T" hose assembly 165. A sump port 42 provided in the flow control device 101 is connected to the sump 161 by a hose 166. A drain hose 178 connects the motors 171 and 172 to the sump 161. Hoses 173 and 174 also connect the variable flow control device 101 to the left and right motors 171 and 172. The control device 101 is rigidly mounted to a steering assembly support structure 147, which also carries a rotatable steering wheel 46. As shown in FIG. 38 and outlined in the description that follows, it is also desirable to include a check circuit including a branch line 183 with check valves 181, 182 to prevent any cavitation in the device 101. As also shown in FIG. 38, counterbalance valves 190, 191, 192, 193 and an auxiliary pump 185 may also be incorporated into the circuit of FIG. 1b, which may improve the performance of the vehicle under certain operating conditions.

In this embodiment, when forward or reverse motion is applied to the steering wheel 46 (note R and F positions in FIG. 1a), both variable flow control device 101 and steer assembly support structure 147 rotate about frame pivot pin 146, which is attached to frame gusset 145. As a result, the flow control lever 159 of the variable displacement pump 158 is actuated proportionally by a linkage 160. Specifically, this linkage 160 is connected to lever 159 at mounting point 151 and is connected to steer assembly support structure 147 at mounting point 150. Consequently, the position of the support structure 147 within the stroke range determines proportional travel speed and direction control from neutral (as shown by full line neutral position N in FIG. 1a), to full forward speed (as shown by phantom depiction F), to full reverse (as shown by phantom position R).

Means such as a self-centering gas dampener spring (not shown) may also be provided between the frame 156 and support structure 147 to allow smooth motion control during forward/reverse actuation and provide a return-to-neutral provision for the transmission when the operator 154 releases the steering wheel 46. Also, an optional internal charge pump 74, check valves 175 and 176 and pressure regulator 177 may be provided to charge the primary pump 158 with fluid to compensate for internal system leakage. An optional oil filter 179 is also included in the circuit shown in FIGS. 1b and 38.

In this application, steering is accomplished by rotating the steering wheel 46 associated with flow control device 101. As explained in substantial detail in the description that follows, the position of the steering wheel 46 ultimately determines the proportion of the hydraulic flow, or the flow ratio, provided to the left and right drive motors 171 and 172. The non-driven caster wheels 144 allow the vehicle to turn freely according to the left/right drive wheel speed, which is proportional to the flow ratio created by the variable flow control device 101. Consequently, during a full turn, the system S results in a "near zero turning radius" turn, where one wheel is stationary while the other rotates, causing the associated vehicle to pivot around the stationary wheel. This configuration is highly desirable for pattern mowing, trimming and other tight maneuvers (e.g., turning around a bush or pole).

The embodiment shown in FIG. 1a utilizes separate drive line components (such as individual hydraulic motors 171, 172, pump 158, sump 161, etc.). This non-integrated configuration makes the proposed design relatively simple to adapt to conventional ZTR commercial mower designs as compared to those in the prior art having a unitary transmission. Another proposed flow control device (shown in FIG. 20 and outlined further in the description that follows) utilizes an integrated transmission including integral left and right motors, pump, sump, etc., all in one housing. In this configuration, a transmission, such as for example a modified Eaton Model 851, may be connected to the variable flow control device 101. In this situation, the transaxle modifications may include providing individual circuits for the left and right motors 171, 172 and counterbalance valves 190, 191, 192, 193, as well as connecting remote supply hoses to the flow control device 101. This integral transmission design is generally more applicable to residential mower configurations, but may be adapted for use with a walk behind/ride-on mower like the one shown in FIG. 20 as well.

Variations are also possible of the all-in-one control configuration shown in FIG. 1a, particularly with regard to the means of forward/reverse actuation such as linear forward/reverse motion of the steering wheel 46 versus angular motion about a pin. Forward/reverse/travel speed actuation via the steering wheel 46 may also be adapted to conventional style riding mowers or other mobile vehicles that commonly have foot pedal or hand lever transmission speed/direction control (although the steering wheel configuration is preferred for the reasons explained above). Additionally, a foot pedal or hand lever transmission speed/direction control could be configured to work with a rigidly mounted version of flow control device 101.

One embodiment of the variable flow control device 101 forming an important part of the steering control system S and shown schematically in FIGS. 1a and 1b is now described in detail. Referring to FIGS. 2a, 2b, 2c, 3a, 3b, 4, and 5, the flow control device 101 includes first and second covers 37 and 38 fixed to a body or housing 12 by fasteners 26 and 44. As perhaps best illustrated in FIGS. 2b and 2c, the covers 37 and 38 may also include assembly mounts 180 for mounting the device 101 to a stable support structure (not shown). Gaskets 18 are secured between each of the covers 37 and 38 and housing 12 to prevent leakage. With specific reference FIG. 3a (which is a sectional view taken along line 3a—3a of FIG. 2a), as well as FIG. 3b and FIG. 4, a center post 5 is fixedly supported within the housing 12 by the covers 37 and 38 and held in place using a suitable arrangement of fasteners 24, 25. Post 5 includes a first or common passage A that connects to hose port PA (which in the arrangement shown in FIGS. 1a and 1b communicates with the onboard variable displacement pump 158 via hose 164). To connect the upper and lower portions of passage A, a hole H is formed in the center post 5. In this embodiment, the exposed opening of this hole H is effectively sealed off by a tight clearance between center post 5 and an adjacent bushing 4 (but can also be capped off). Independent second and third auxiliary flow passages B and C in post 5 are in fluid communication with hose ports PC and PB. Gaskets 8 are located between covers 37 and 38 and post 5 to prevent leakage, as well as between hose fittings 6, 7 or adaptors and covers 37, 38.

A rotatable piston body 1 is positioned within the housing 12. This body 1 preferably carries the bushing 4 and is positioned such that both rotate in unison about the post 5. As perhaps best shown in FIG. 3*a* and in the exploded view of FIG. 5, the bushing 4 is ported to communicate fluid to and from a plurality of axially spaced openings formed in the rotatable body 1. Specifically, these openings form piston chambers 81 for allowing fluid in the center opening to reach pistons 2 at least partially positioned and held therein. As the result of the combined rotation of the body 1 and the selective movement of the pistons 2 between first and second, displaced positions, as described further below, the fluid flow through the corresponding passage A, B and C in center post 5 is selectively controlled or adjustably metered. Of course, the direction of fluid flow through the passages A, B, and C depends on the direction of fluid flowing from the corresponding pump, such as the main variable displacement pump 158.

Turning now to the pistons 2, first and second axially spaced sets (referred to as an upper set U and a lower set L in the drawings) positioned in the chambers 81 engage the inside surface of two corresponding races 17 supported by an adjacent cradle bracket or cradle 9 contained within the housing 12. The cradle 9 pivots about pin 22, the opposite ends of which are supported by the covers 37 and 38. Spacers 11 provide journals for the pin 22 and separate the cradle 9 from the covers 37, 38. The range of pivoting motion of cradle 9 in both a first direction and in a second direction generally opposite the first direction is limited by stops 9*a* that engage the periphery of a shaft control pin 39 (see FIG. 6*a*).

Movement of the cradle 9 is effected using a guide pin 23 received therein. This guide pin 23 is connected to a transverse support pin 21, which is in turn connected to the shaft control pin 39. This shaft control pin 39 is rotatably supported by the covers 37 and 38 and is connected to the support pin 21. The control pin 39 protrudes through cover 38, and is indexed and secured to a gear engagement structure in the form of a lever 34 including a plurality of teeth 34*a* (see FIG. 2*a*) by fasteners 40 and 41. A seal 16 secured to a carrier 15 also helps to prevent fluid from leaking at the control pin 39 interface. Likewise, a gasket 51 may be provided to prevent leakage at the interface between the carrier 15 and cover 38. A vent fitting or port 42 is provided to communicate internally leaked fluid from the housing 12 to a hose (not shown) that goes back to a sump, such as sump 161.

In an exemplary embodiment, the variable flow control device 101 is shown in conjunction with a steering wheel 46 (see FIGS. 2*a*, 2*b*, and 2*c*). As perhaps best shown in FIG. 3*a*, the steering wheel 46 may be secured to a corresponding steering shaft 35 by transverse pin 50. This steering shaft 35 rotates in bushings 45 supported by the covers 37, 38. The shaft 35 carries a spacer 36 at one end and a gear structure 32 or sprocket is secured to the other end by a transverse pin 49. Gear structure 32 is mechanically interfaced with the gear teeth 34*a* on the lever 34 that is associated with cradle 9 via pins 21, 23, and 39, as described above. Consequently, the lever 34 at least partially rotates or pivots about the axis of the support pin 39 when the steering wheel 46 is rotated. This causes the cradle 9 to pivot in either the first direction or the second direction, depending on the direction of rotation, which in turn changes the position and degree of non-concentricity of races 17 supported by or formed in the cradle 9 relative to an axis defined by the post 5. As described in detail below, these changes in position and the non-concentricity of the races 17 together determine the resulting split flow ratio or proportion of fluid directed through the passages B and C, which in the system shown in FIG. 1*a*, ultimately controls the operation of the associated drive wheels and the direction of travel of the vehicle/mower.

Reference is now made to FIGS. 6–9 and 11–15. FIGS. 6–9 are partially cross-sectional views of the flow control device assembly 101 taken along lines C—C, D—D, and E—E in FIG. 3*a* and illustrate the various modes of operation of this embodiment of the variable flow control device 101. FIGS. 11–15 are corresponding schematic flow diagrams showing manner in which the flow rates and flow direction in different areas of the exemplary circuit of FIG. 1*b* are proportionally changed using the variable flow control device 101 of the invention. The flow direction and amount is indicated based on the direction and size of the flow arrows F. In other words, if the arrow is long and points to the right, full fluid flow is moving to the right in that particular area of the circuit. If, for example, a flow indicator arrow in the split circuit is shorter than an arrow indicating full flow, the shorter arrow represents lesser flow An overall functional description of the operation of a system shown in FIGS. 6–9 and 11–15 is now provided. As previously, mentioned, the variable flow control device 101 includes axially spaced, upper and lower U, L sets of piston elements 2. The piston elements 2 are partially received in openings or chambers 81 formed in a piston body 1 and are capable of reciprocate radially therein (i.e., toward and away from the adjacent wall of the cradle 9). The reciprocation is caused by the engagement with the non-concentric races 17, the positions of which relative to a center axis are changed by pivoting the cradle 9. This engagement varies the radial displacement or movement of the piston elements 2 and the resulting fluid displacement during each revolution of the piston body 1 (which rotates as the result of fluid flow). Specifically, as the body 1 rotates, the piston elements 2 sequentially move radially within the corresponding chambers 81 in a reciprocating fashion when the corresponding race 17 is non-concentric with the axis of the post 5. The displaced fluid is directed to and from the piston chambers 81 via the passages A, B, and C in center post 5, which of course are in selective fluid communication during the rotation of the body 1. The particular flow ratio created is determined by the amount of eccentricity each of the races 17 have with the piston body 1. Specifically, the more non-concentric the race 17 relative to the rotational axis of the body 1, the larger the amount of fluid displaced and flowing through the passage B or C corresponding to that side of the circuit. Likewise, the closer the race 17 is to being concentric with center post 5 (and hence the rotational axis of the body 1), the lesser the amount of fluid displaced. A concentric race 17 results in no flow for its corresponding set of pistons 2, which simply remain in a first position as the body 1 rotates.

In the present embodiment, the cradle 9 is designed such that the concentricity of each race 17 is mutually opposed. In other words, as one race becomes more concentric, the other becomes equally less concentric. Consequently, flow always passes through the device 101 and the piston body 1 always rotates, even if one of the races 17 is concentric and has no corresponding through-flow for the corresponding passage B, C or part of the circuit. Instead of races 17, the structures for engaging the pistons 2 may simply be grooves or channels formed along the inner surface of the cradle 9.

FIGS. 6*a*, 6*b*, 6*c*, and 6*d* show the centered or non-pivoted position of the cradle 9, which when in use in a vehicle such as the lawn mower of FIG. 1, causes the chassis 156 to travel in a generally straight direction. This is because, when the cradle 9 is in the centered or non-pivoted position, both the upper and lower sets U, L of pistons 2 produce the same flow rate through the corresponding passages B and C (that is, each is displaced to the same degree as the body 1 rotates, which creates equal flow through the passages B and C). This even split in the flow ratio is shown in the corresponding flow diagram of FIG. 11.

In FIGS. 7*a*, 7*b*, 7*c*, and 7*d*, the cradle 9 is pivoted or moved in a first direction (e.g., downwardly) away from the centered position, such as when the steering wheel 46 is rotated to the left (see action arrow LT). This causes the lower set L of pistons 2 to reciprocate in the corresponding chambers 81 in a radial direction, as shown in FIG. 7*c* (which is taken along line E—E of FIG. 3*a*) as a result of the engagement with the corresponding non-concentric race 17. Specifically, as the body 1 rotates clockwise, each piston 2 of the lower set L (which is urged outwardly as a result of the fluid pressure and centrifugal force) sequentially engages the race 17 corresponding to the lower set of pistons and selectively moves from a fully inward position (12 o'clock), to a partially outward position (2 o'clock) where fluid from passage A in port 5 partially enters the chamber 81, and to a fully outward position (5 o'clock). As the rotation continues, the pistons 2 in the lower set L sequentially move from the outward position (7 o'clock) to a more radially inward position (10 o'clock) where the fluid drawn from passage A is forced or directed to passage B in the post 5. Each piston 2 then returns to the full inward position (12 o'clock). As long as the cradle 9 is pivoted in this direction, the sequence continuously repeats itself, with fluid flow resulting from the selective displacement of the entire set of lower set L of pistons 2 being directed through the common passage A and through passage B.

However, as shown in FIG. 7*a* (which is taken along line C—C of FIG. 3*a*), since the race 17 corresponding to the upper set U of pistons 2 is concentric to body 1 but non-concentric with the other race, the pistons 2 in the upper set U do not reciprocate as the body 1 rotates. Consequently, no fluid is displaced by the upper set U of pistons 2. The result is that no fluid is directed through passage C. This is represented in the corresponding flow diagram, which is FIG. 12. As indicated in this figure, where the variable flow control device 101 is used on a vehicle in which the hydraulic motor associated with the right wheel is in fluid communication with passage B, the result is a full left turn.

Figure 13:
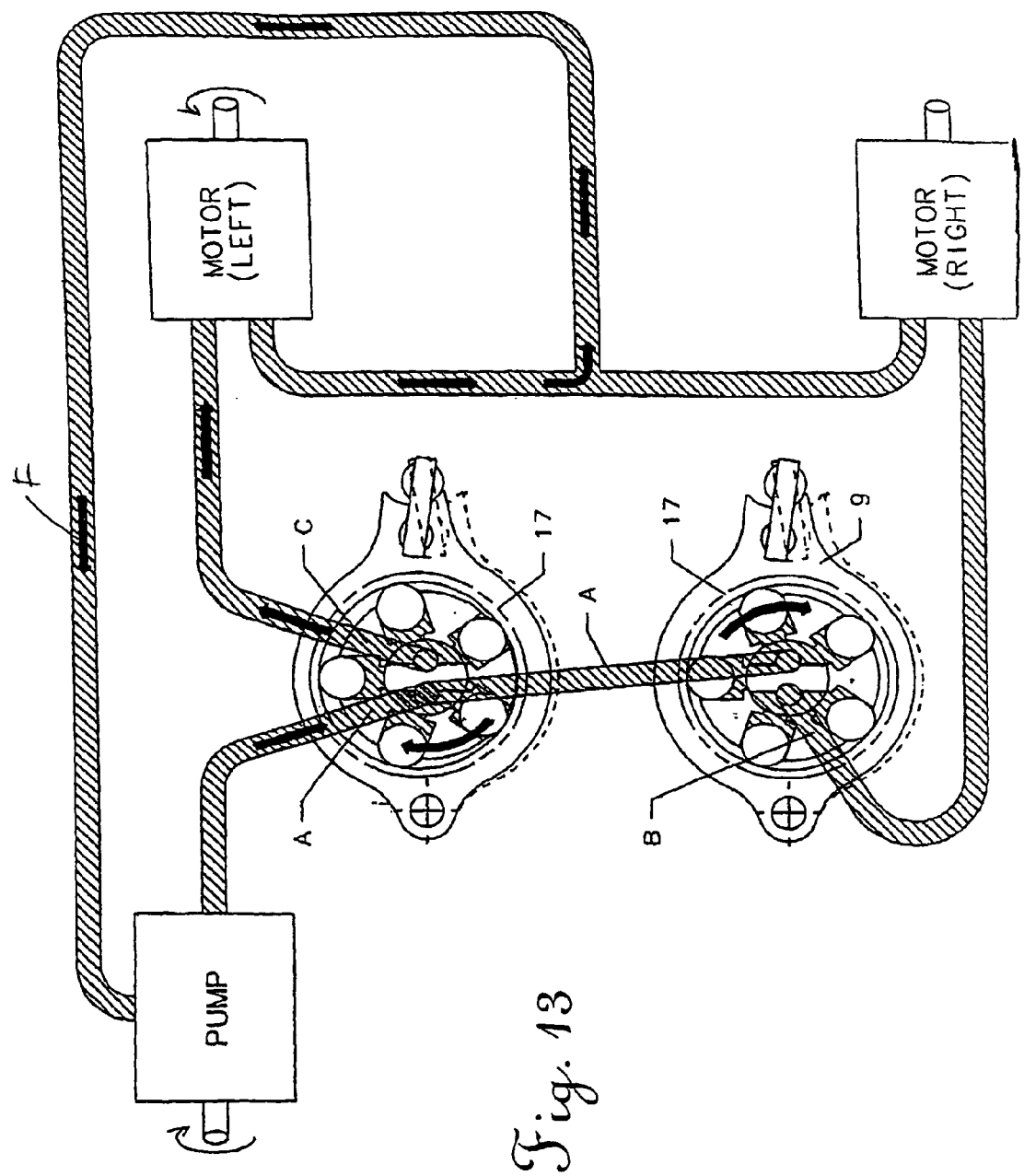
FIG. 13 is a schematic flow diagram corresponding to FIGS. 8a–8d.

FIGS. 8*a*, 8*b*, 8*c* and 8*d* show component positions when a full right turn is made (arrow RT), which coincides with the flow diagram in FIG. 13. Specifically, when the cradle 9 is pivoted or moved in a first direction (e.g., upwardly) away from the centered position, the corresponding race 17 causes the upper set U of pistons 2 to reciprocate in the corresponding chambers 81, as shown in FIG. 8*a* (which is taken along line C—C of FIG. 3*a*). As the body 1 rotates clockwise, each individual piston 2 in the upper set U sequentially moves from a completely inward or near completely inward position (5 to 7 o'clock), to a partially outward position (10 o'clock) where fluid from passage A in post 5 enters and partially fills the corresponding chamber 81, and ultimately to a fully outward position (12 o'clock). As the rotation continues, each piston 2 in the upper set U moves to a partially outward position (2 o'clock) where the fluid drawn through passage A is directed through passage C in the post 5. Each piston 2 in the upper set U then sequentially returns to the inward position (5 o'clock). As long as the cradle 9 is positioned in this direction, the sequence continuously repeats itself, with fluid flow being directed from the common passage A through passage C.

Again, however, because the race 17 corresponding to the lower set L of pistons 2 is concentric with body 1 (FIG. 8*c*), the pistons 2 in the lower set L do not reciprocate. Consequently, no fluid is displaced by the lower set L of pistons 2 when the cradle 9 is pivoted in the second direction. The result is that no fluid flow is directed from passage A to passage B. This is represented in the corresponding flow diagram, which is FIG. 13. As indicated in this figure, where the variable flow control device 101 is used on a vehicle wherein the hydraulic motor associated with the right wheel is in fluid communication with passage C, the result is a full right turn.

FIGS. 6*a*–6*d* also show the position of the cradle 9 for making a vehicle associated with the variable flow control device 101 travel straight in reverse. This coincides with the flow diagram in FIG. 14 (note reversed direction of flow arrows F, as compared to FIG. 11). The description is essentially the same, except the rotation of the body 1 is counter-clockwise (as shown in FIG. 14) as the result of the reversal in fluid flow. Also, the fluid flows from passages B and C to passage A, rather than from passage A to passages B and C. Likewise, the orientations used while turning in reverse are indicated by FIGS. 7*a*–7*d* and 8*a*–8*d*. The corresponding flow diagrams are essentially the same as those shown in FIGS. 12 and 13, with the exception that the directions of the flow arrows F would be reversed.

While the extreme cases where the fluid flow is fully controlled or metered to either passage B or passage C are described above, it should be appreciated that only an increased proportion of the fluid flow may be directed to the passages by only partially pivoting the cradle 9 in either direction (or by further adjusting the non-concentricity of the races 17 associated with the upper and lower sets U, L of pistons 2). This may result in turning modes between the extreme full-turn and straight ahead travel positions, and results in proportional flow through the two motors 171, 172 to achieve the desired turn ratio, regardless of flow rate and travel direction.

FIGS. 9*a*, 9*b*, 9*c*, and 9*d* show more details of cradle 9 depicted in FIGS. 6–9 and in the flow diagrams from FIGS. 11–14. As should be appreciated from the foregoing description, the cradle 9 is preferably designed such that, when pivoted to the maximum extent in the first or second direction during a full turn, it causes full fluid flow to one side of the circuit. In one embodiment, the cradle 9 includes an offset angle of about 3.127 degrees and the pivot point (which in the embodiment of FIG. 3*a* is defined by the pin 22) is located at about 1.4 times the radius R of each race 17.

Figure 10:
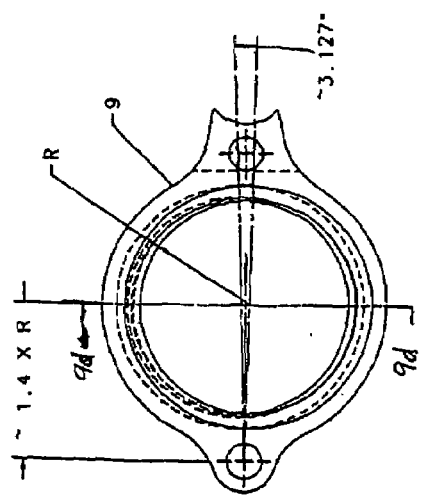
FIG. 10 shows an alternate embodiment of a cradle for use in the variable flow control device.
Figure 11:
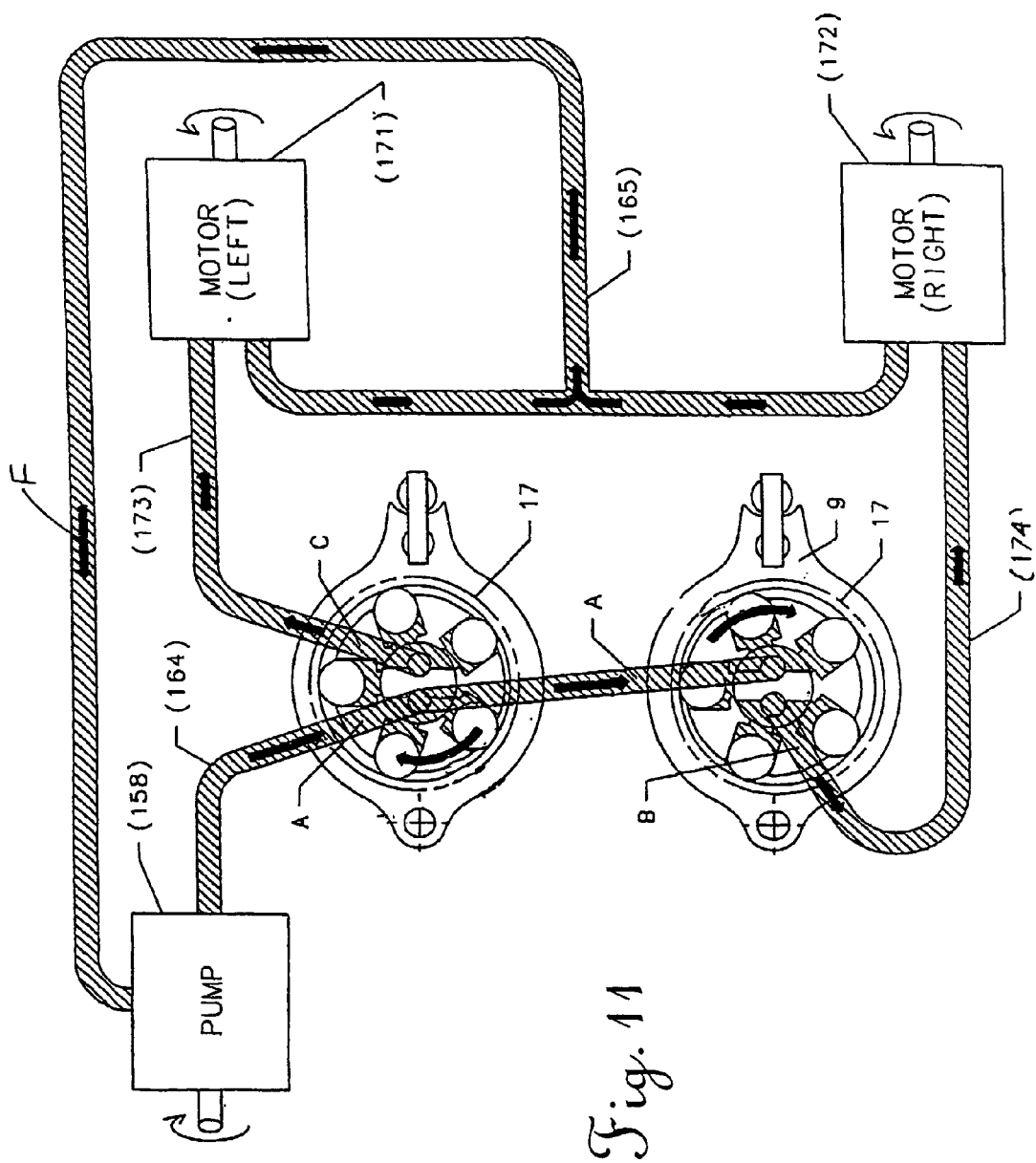
FIG. 11 is a schematic flow diagram corresponding to FIGS. 6a–6d.
Figure 12:
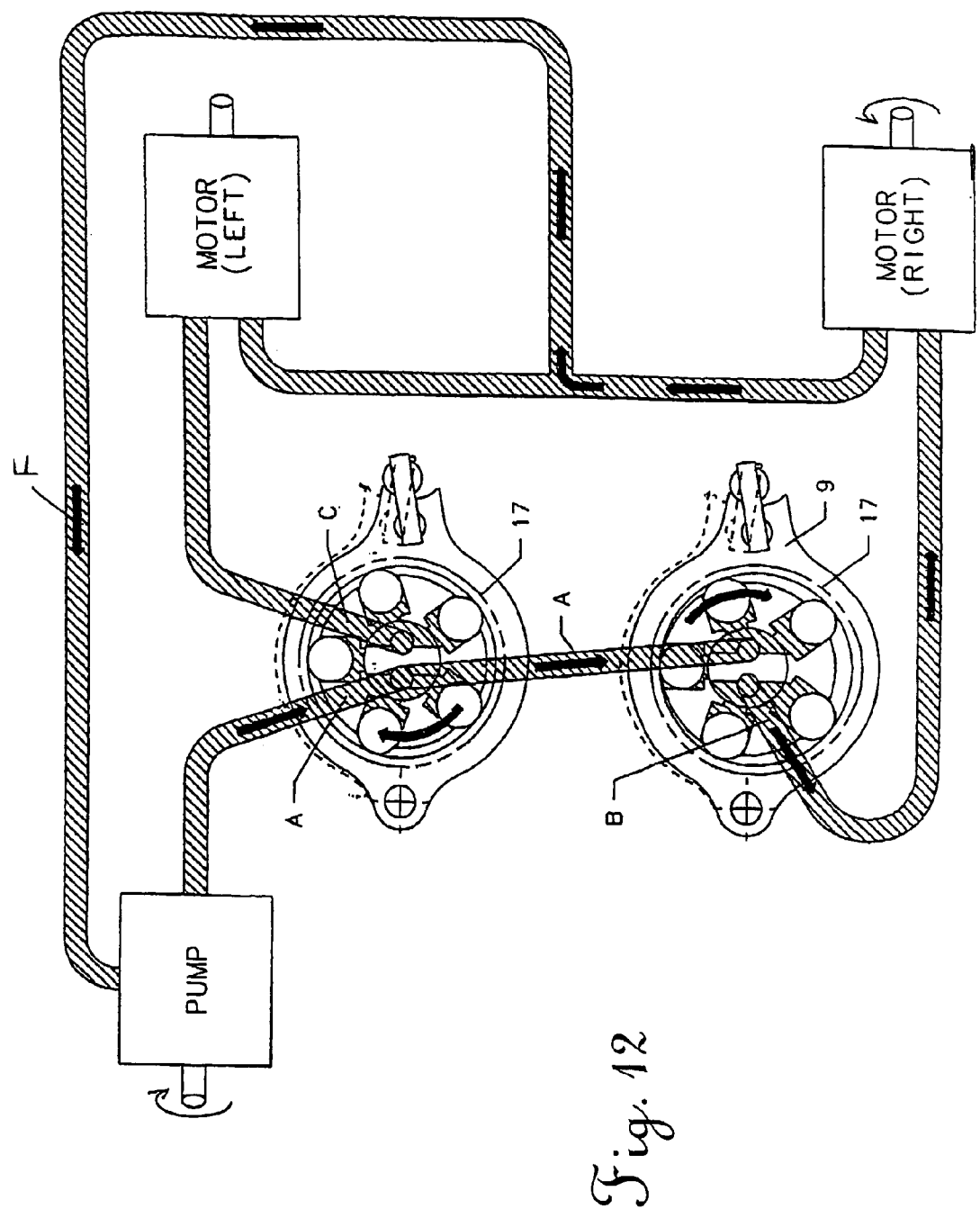
FIG. 12 is a schematic flow diagram corresponding to FIGS. 7a–7d.

FIG. 10 shows details of a "partial reverse" cradle 10. This cradle 10 may replace cradle 9 to produce a flow ratio that, during a full turn, may cause one wheel to turn at nearly full speed forward, while the other turns backward at a very slow rate to achieve a tighter turn. This is accomplished by slightly adjusting the concentricity of one of the races 17 (note phantom depiction of the race 17 associated with the upper set U of pistons 2 in FIG. 10) and using a lesser offset angle of about 2.65 degrees and a distance from the center of each race 17 to the cradle pivot point (pin 22) about 1.4 times the radius of the race. The flow diagram during a left turn using this arrangement is shown in FIG. 15. The corresponding positions of the races 17 are essentially represented by FIGS. 7*a*–7*d* with the exception of component 9 being replaced by partial reverse cradle 10.

FIGS. 16a, 16b, 16c, and 16d illustrate an alternative configuration that results in slower travel speeds during tight turns by reducing flow through the motors. FIG. 16d shows the stroke range of piston 2 between straight ahead travel position W and full turn position X along with a sectional view of piston body 1a. Piston body 1a is a modified version of piston body 1 that includes means to effect a speed reduction by bleeding off fluid flow during the tight turn modes as indicated in FIGS. 16c and 16d. The means includes a relief area 111 defining a gap 113 between the piston 2 and piston body 1a during a sharp turn mode through which fluid may escape. This relief area 111 also includes optional piston guides 112 to guide the pistons 2 when adjacent thereto. Any fluid escaping through the gap 113 enters the cavity of housing 12 (see FIG. 3) and may be returned to the sump 161 via vent port 42 (also shown in FIG. 3). It is contemplated that a similar result may be achieved by providing a third plane of pistons (not shown) that dump fluid only during turn modes. The advantage of doing so is that the flow is metered instead of bled off.

FIG. 17 shows the optional feature of using springs 3 to mechanically bias the pistons 2 outwardly towards the corresponding race 17. As should be appreciated, this helps to ensure that the pistons 2 stroke fully during all situations. The springs 3 are preferably conical springs wound so as to have a generally triangular cross-section. The use of other types of springs is of course possible to achieve the same result.

FIGS. 18a and 18b show an alternative arrangement including cylindrical pistons 120 and guide shoes 121. The cylindrical pistons 120 are coupled to the guide shoes 121 by a connector 122. The shoes 121 compliment and slide along a circular guide 124 in the cradle 9, instead of a race 17. As shown in FIG. 18b, keeper rings 125 may also be used to keep the shoes 121 on the circular guide 124, to secure the shoes 121 in place for assembly purposes, and to assist with maximizing piston stroke during some operational modes. The advantage of using cylindrical pistons 120 is the potential efficiency enhancement, since less leakage results due to the more substantial piston/housing seal established between a cylindrical chamber and piston in combination versus the seal afforded between such a chamber and a spherical piston.

Figure 19A:
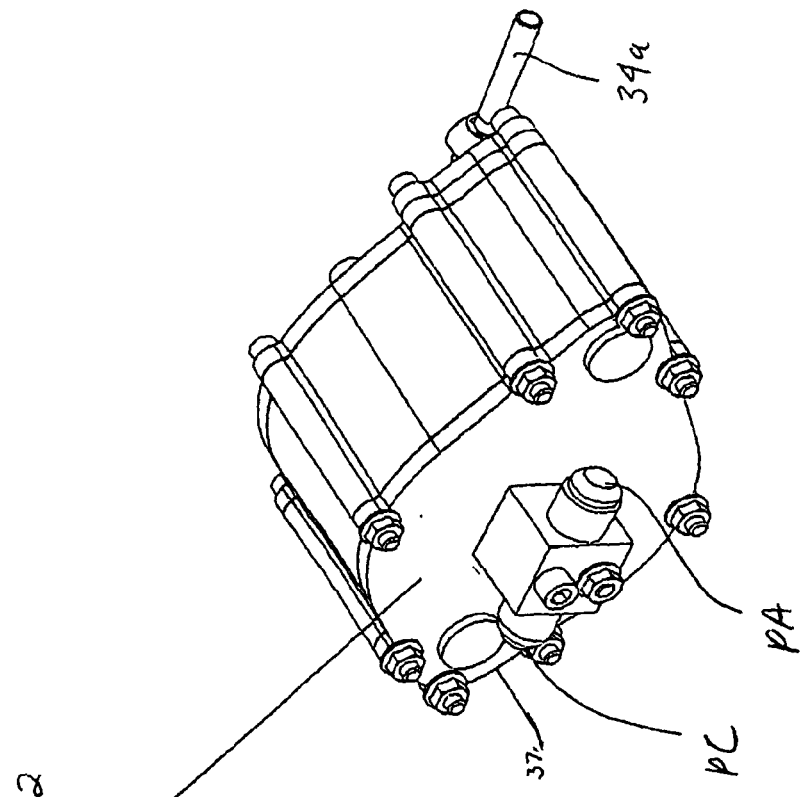
FIGS. 19a and 19b are perspective views of an alternate embodiment of the variable flow control device.
Figure 19B:
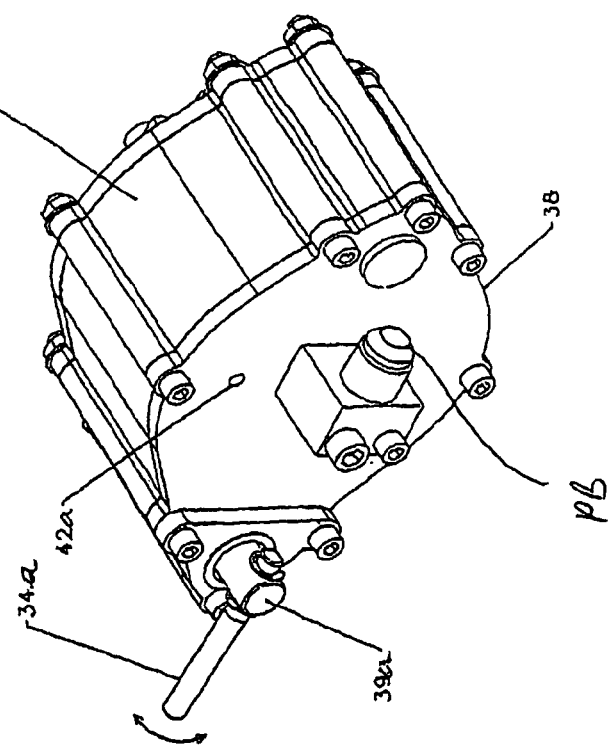

FIGS. 19a and 19b illustrate an alternative basic flow control device 102 similar to flow control device 101. However, one difference is that covers 37 and 38 do not include structures for receiving the bushings that support the steering shaft 35, nor do these covers include structures 180 for mounting the flow control device 101 to a stable support structure. Likewise, the external linkage components (such as toothed lever 34) are not included. Instead, a simple lever 34a and pin 39a are provided for pivoting the cradle 9 within the housing 12 to adjustably meter or selectively control the flow of fluid through ports PA, PB, and PC. Likewise, vent port 42a is a simple tapped hole instead of a fitting. Internally, the function of flow control device 102 may be identical to basic flow control device 101. This less complex, more economical flow ratio control configuration may be practical in industrial applications.

Figure 20:
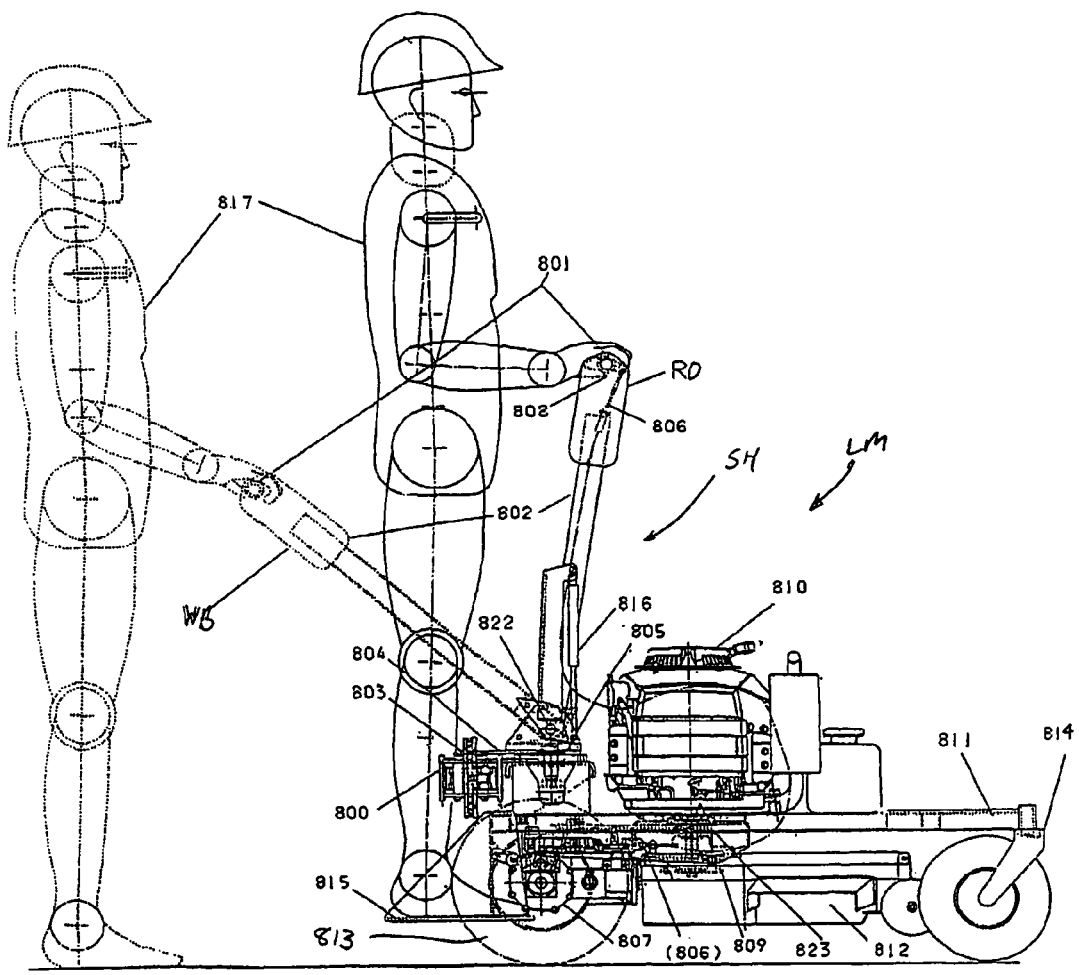
FIG. 20 is a side schematic view of a swing steer system incorporating the variable flow control device of the present invention.

FIG. 20 is a side view illustration of an application of the aforementioned variable flow control devices to a swing handle steering system SH, such as may be provided on a walk behind and/or stand-on lawn mower LM. The proposed design controls pump flow (speed/direction) via a linkage means between the pump and a rotating hand grip 801. Steering is provided by swinging the handle 802 from side-to-side to actuate the flow control device 800 (see FIG. 21), which is a modified version of the flow control device 101 described above and shown in FIG. 2a. The flow control device 800 in this application is associated with a first chain sprocket 803. This first sprocket 803 is in turn connected by a chain 804 to a second sprocket 805 mounted to the swing handle 802. Consequently, when the handle 802 turns, the flow control device 800 is proportionally actuated. The hoses are not shown in FIGS. 20 and 21 for clarity reasons, but the schematic diagram in either FIG. 1b or in FIG. 38 may be considered to depict the hydraulic circuit used in FIG. 20.

The embodiment shown in FIG. 20 also includes a linkage system 806 for detecting the presence of an operator on the mower. This linkage system 806 is spring biased to return the transmission 807 to neutral when the rotating hand grips 801 are released. A separate system for the power takeoff (PTO) is accommodated via an electrical switch 808 that must also be activated and held by the operator to keep the PTO activated. The electric PTO clutch 809 is disengaged when switch 808 is released.

Figure 21:
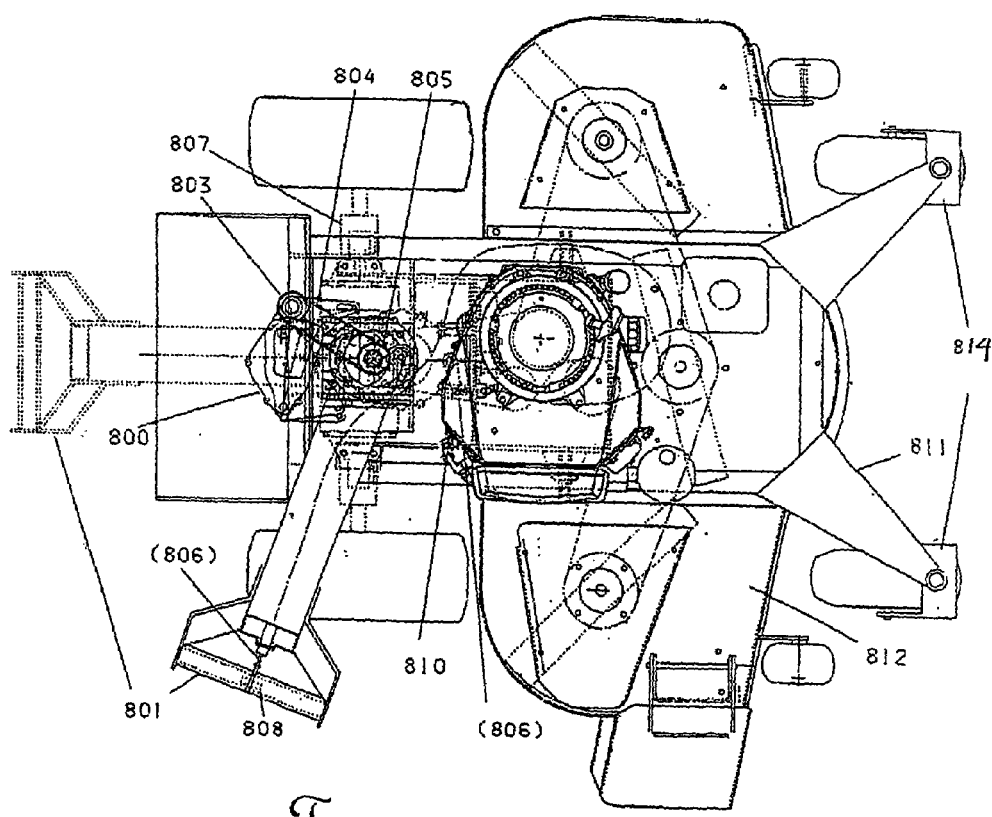
FIG. 21 is a top schematic view of the swing steer system of FIG. 20.

With reference to both FIGS. 20 and 21, the chassis or frame includes an engine 810 for powering an integrated transmission 807 (e.g., an Eaton model 851 modified to have individual circuits for the left and right motors and counterbalance valves 190, 191, 192, 193, as shown in FIG. 38) mounted to frame 811 which may also include an implement such as a mower deck 812. Drive wheels 813 are mounted to the transmission and caster wheel assemblies 814 are mounted to the opposite end of the frame or chassis resulting in a drive-wheel-steer configuration. In the embodiment depicted, the frame or chassis includes an optional stand-on platform 815 behind the drive axle.

As perhaps best shown in FIG. 20, the handle 802 is selectively movable relative to the vertical axis to accommodate a walk behind arrangement WB (down handle position) or ride-on arrangement RO (up handle position). A change could be made from WB to RO or vice-versa while the lawn mower LM is moving. A gas spring/dampener 816 may be incorporated to return or hold the handle in the up position when not in use. It may also be used to help offset the weight of the handle when operating in the WB position and dampen the up and down motion of the handle for a smooth transition between the RO and WB positions. The spring 816 may also enhance stability of the operator 817 when operating in the ride-on RO, up-handle position. The gas spring 816 may force the handle 802 up against a stop which gives the operator a rigid brace in the forward direction and creates partial, dampened resistance in the rearward direction to provide an additional means of providing operator stability when riding on platform 815.

Figure 22:
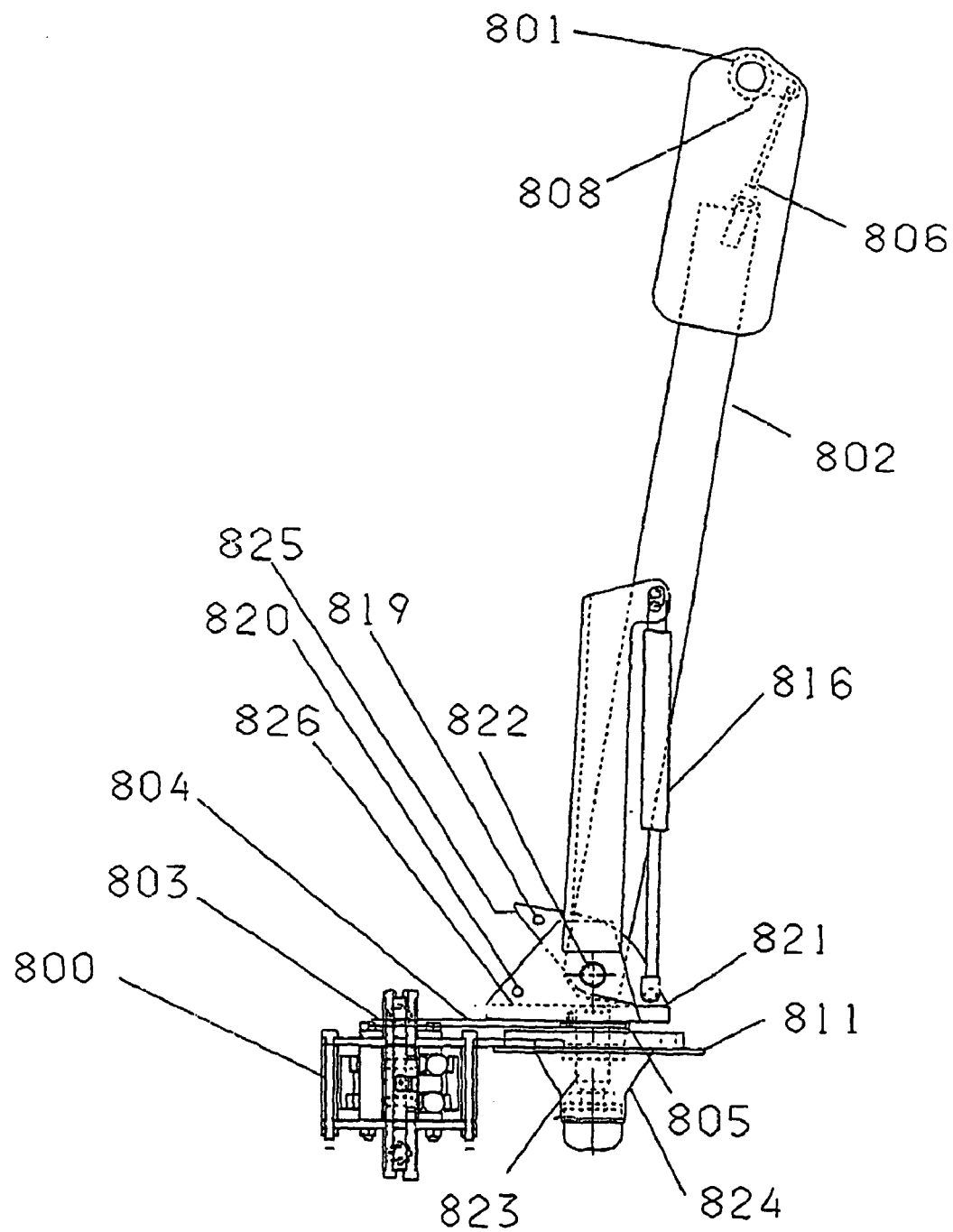
FIG. 22 is an isolated side view of the swing steer handle and variable flow control device in the system of FIG. 20.

With reference to FIG. 22, the arrangement is such that the swing handle 802 may be selectively held in the up or down position by installing a pin (not shown) through handle stop hole 819 and carrier bracket holes 820 or 821, respectively. When in the floating, walk-behind WB mode, the handle 802 is free to rotate about the carrier bracket pivot pin 822 thus eliminating some of the vibration and jerkiness exerted on the operator. The lower limit position of the handle 802 is defined by a stop 825 and a carrier flange plate 826. Carrier bracket 818 includes a shaft 823 that rotates within hub housing 824 to permit the swing steer motion. Instead of using a swing steer arrangement, the variable flow control device and single pump concept could also be adapted to conventional rigid type handle equipped walk behind mowers (not shown). For example, the conventional hand grips could be connected to the flow control device and pump for effecting both speed and steering control.

As should be appreciated, use of the swing steer arrangement described above eliminates the problems created when a conventional walk behind mower is made to turn away from a wall, fence or other obstacle. Using the present arrangement, the hand grips are moved away from the obstacle when turning away from it. The handle control also makes it easier for the operator to follow the mower when making a 90°–180° turn, since the handle no longer swings out during the turn. Instance, the handle is moved towards to turning or pivot point of the mower. This means that the operator has less distance to travel during a turn and he does not have to speed his pace during a turn. Another feature is that there is only one input control for steering, which is the rotation or swinging of the handle.

Figure 23:
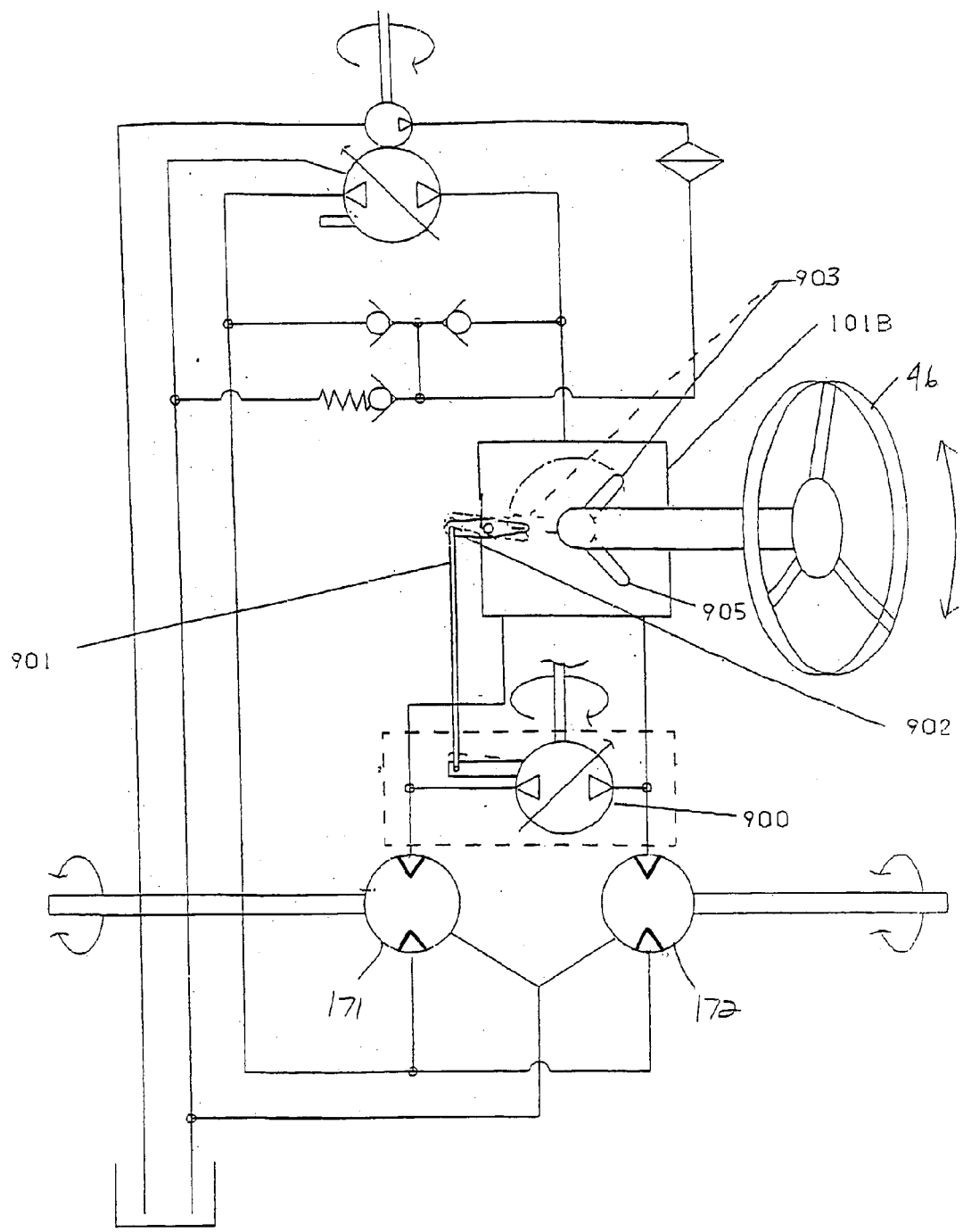
FIG. 23 is a schematic diagram of a hydraulic circuit including a variable flow control device in combination with an auxiliary pump for effecting zero turn radius steering.

FIG. 23 is a schematic diagram showing a steering wheel activated, drive wheel steer arrangement including a mechanically activated, auxiliary pump 900 for biasing one of the hydraulic motors 171, 172 to rotate in opposite directions when the steering wheel 46 is turned to a maximum right or left hand position to assist in providing a "zero radius" turn. The ZTR pump 900 may be powered by the engine (not shown) by a belt drive train or other means. A linkage 901 couples the pump 900 with a pivoting lever mechanism 902 connected to the linkage 901. The lever mechanism 902 in turn is actuated by outwardly directed lever arms 903 or 905, which are shown as being attached to the steering shaft 35 associated with the variable flow control device 101b (and could also be secure to a swing steer handle). When using this actuator means, pump 900 is selectively actuated to produce forward or reverse loop flow through the left and right drive motors resulting in opposite rotation of the corresponding drive structure or wheel for effecting a left or right ZTR turn when the steering wheel 46 is at or near the maximum left or right position. An alternative actuation function may be accomplished using first and second switches (not shown) for activating the pump 900 that are engaged by the gear engagement structure or lever 34 when the corresponding steering device, such as wheel 46, is rotated to either the full left hand or full right hand turn position. As should be appreciated, this ZTR mode occurs only when the main pump 158 produces no flow to one of the motors, such as when the steering wheel 46 is turned to the full, or "extreme" right hand or left hand turn position.

Figure 24:
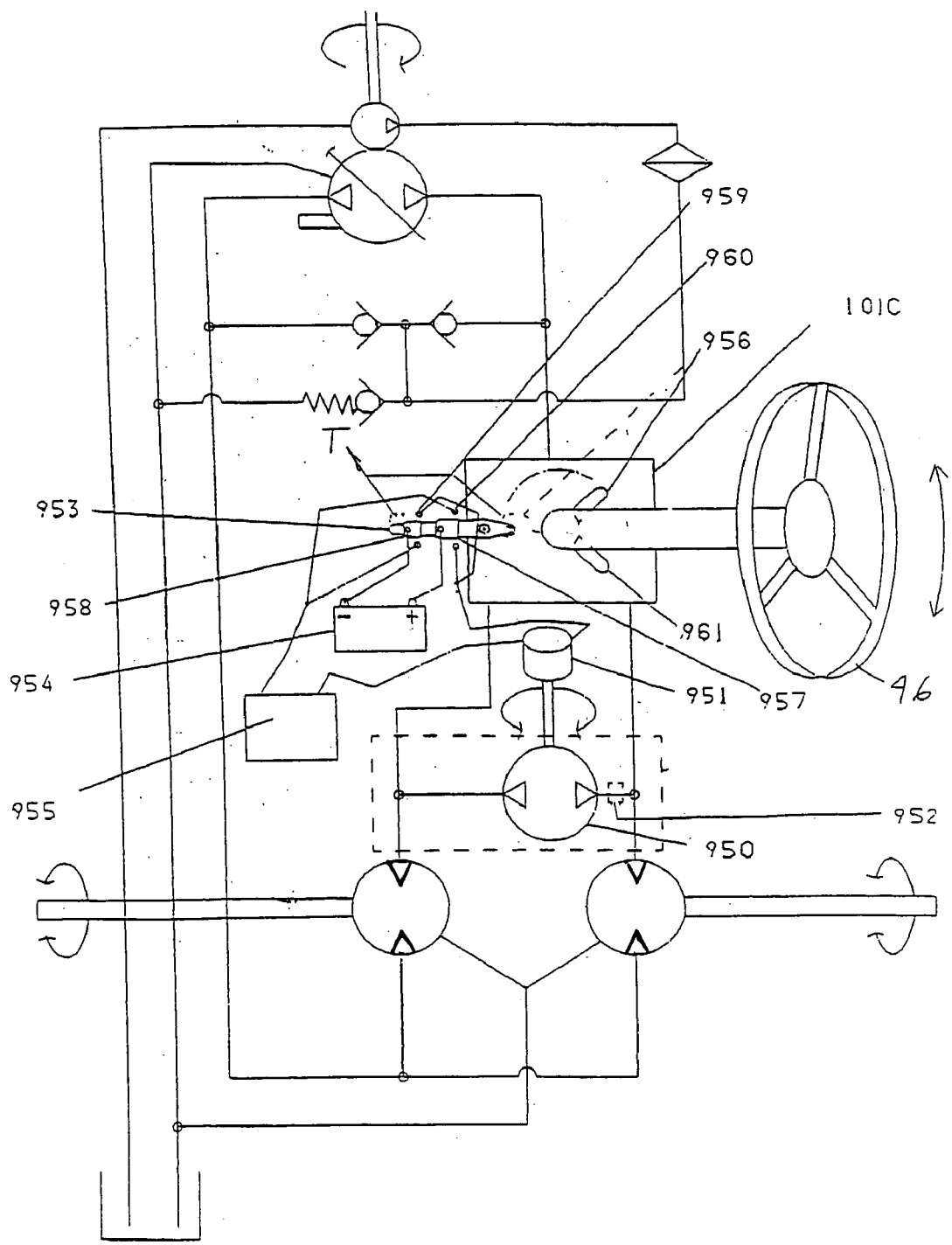
FIG. 24 is a schematic diagram of an alternate embodiment of a system combining a variable flow control device with an auxiliary pump for effecting zero turn radius steering.

FIG. 24 schematically illustrates a steering wheel activated drive wheel steer arrangement with an electrically powered ZTR pump 950 as the means for effecting the counter-rotation of one driven structure or wheel. The advantage of this arrangement over the mechanical one shown in FIG. 23 is the flexibility for packaging, since the electrical design does not need to be powered by a driveline associated with an engine. The electric design also has a simple means of reversing flow by reversing the polarity of a supply of electrical current to a dedicated drive motor 951 that reverses the rotation and flow direction of the ZTR pump 950 (which may be a more economical, gear-type pump). A flow shut off solenoid 952 or pilot-type check valves (not shown) may be provided to ensure that no fluid leaks through the pump 950 when it is in an inactive mode. The means for activating the ZTR pump 950 may include an electromechanical lever mechanism 953 mounted to the flow control device 101c. When the steering wheel 46 it is near the end of the turning stroke in the counter-clockwise direction (a left turn), lever 956 connected to the steering wheel shaft 35 actuates lever 953 and lever 961 actuates the lever mechanism 953 during a right ZTR turn. The pump motor 951 is powered by battery 954, which of course may be charged using the engine alternator. An operator presence interlock switching system 955 may also form part of the electrical circuit.

The reference letter T indicates the component position of lever 953 and lever arm 956 during a left turn that establishes a positive contact and electrical current to the bi-directional ZTR pump motor 951. During this turn mode position, the electrical contacts 957 and 958 on lever 953, which are connected to the battery 954, connect with contacts 959 and 960 to cause motor 951 to rotate in a predefined rotation direction that produces a biased left ZTR turn. In an alternative design configuration, the ZTR pump 950 may also be actuated by alternative means, such as manual actuation via electrical button switches on the steering wheel 46. Alternatively, as noted above, left and right switches associated with the flow control device 101c in combination with relays may also be used. Otherwise, the flow control device 101c may be the same as the device 101 shown in FIGS. 2a and 3a.

Figure 24A:
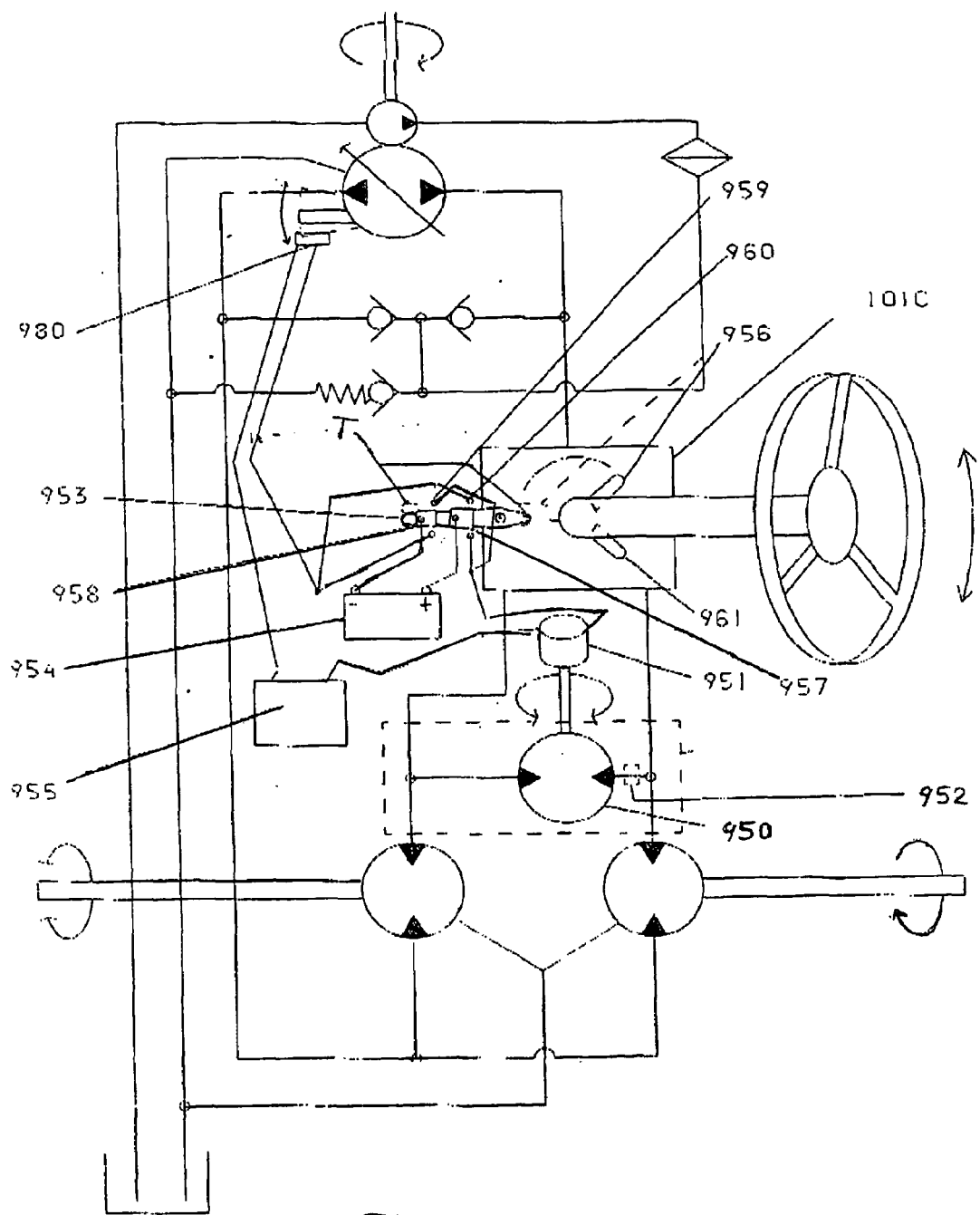
FIG. 24a is a schematic diagram of yet another alternate embodiment of a system combining a variable flow control device with an auxiliary pump for effecting zero turn radius steering.
Figure 24B:
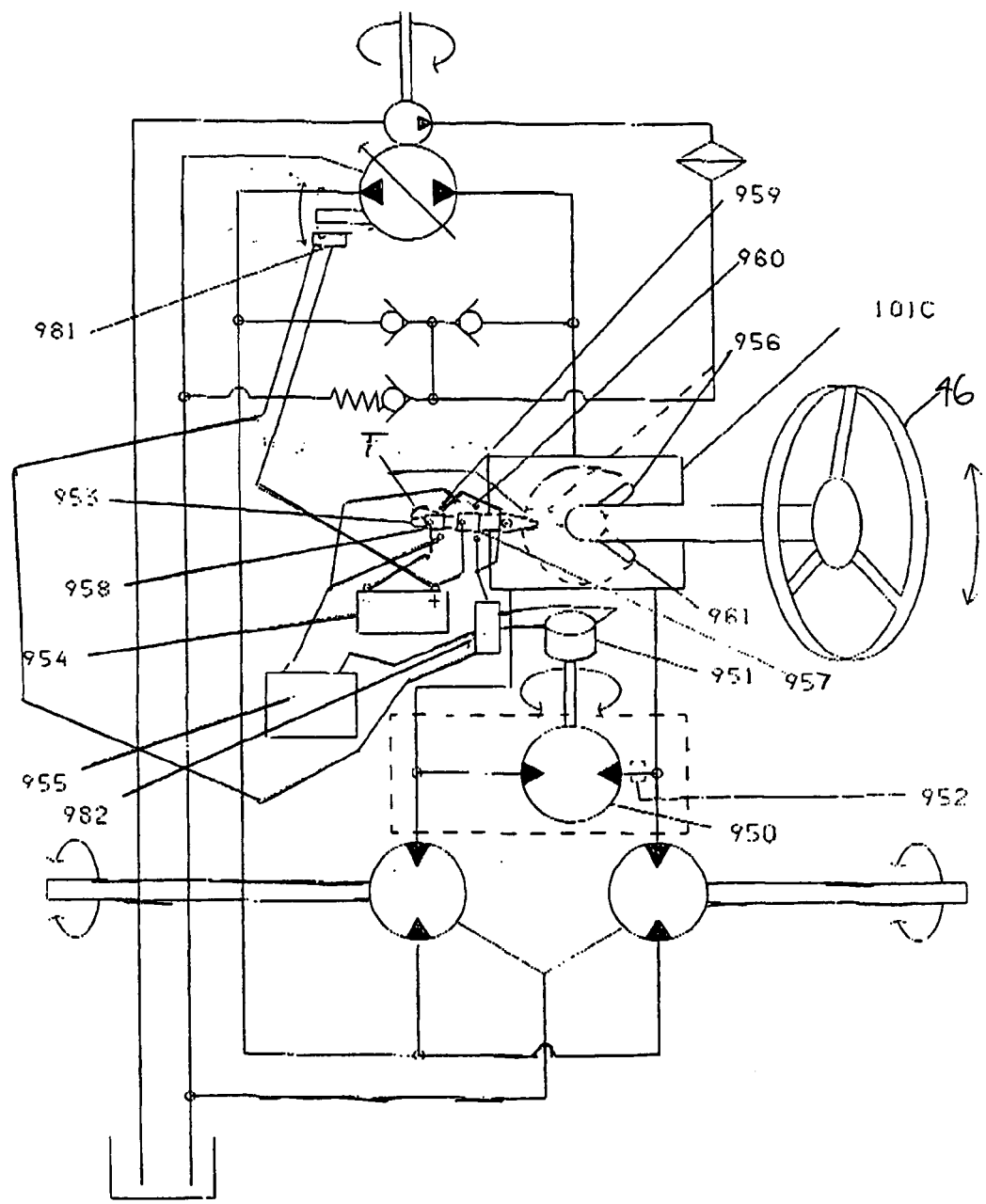
FIG. 24b is a schematic diagram of still another alternate embodiment of a system combining a variable flow control device with an auxiliary pump for effecting zero turn radius steering.

The zero turn radius (ZTR) feature described in the foregoing passage provides desirable drive wheel counter-rotation bias when a vehicle outfitted with same is traveling in the forward direction or in neutral. However, in the reverse direction, this counter-wheel rotation is the reverse of what is needed. Accordingly, in still yet another aspect of this invention, shown in FIGS. 24a and 24b, a means for compensating for undesirable drive wheel counter-rotation is provided. As shown in FIG. 24a, the means may take the form of a simple kill switch 980 for disabling the ZTR pump 950 during operation in the reverse direction. In the embodiment shown in FIG. 24b, a switch 981 and solenoids 982 are used to cause the pump 950 to run in reverse when traveling in the reverse direction. Accordingly, drive wheel counter-rotation is maintained in the desired direction, regardless of the direction of travel.

Figure 25:
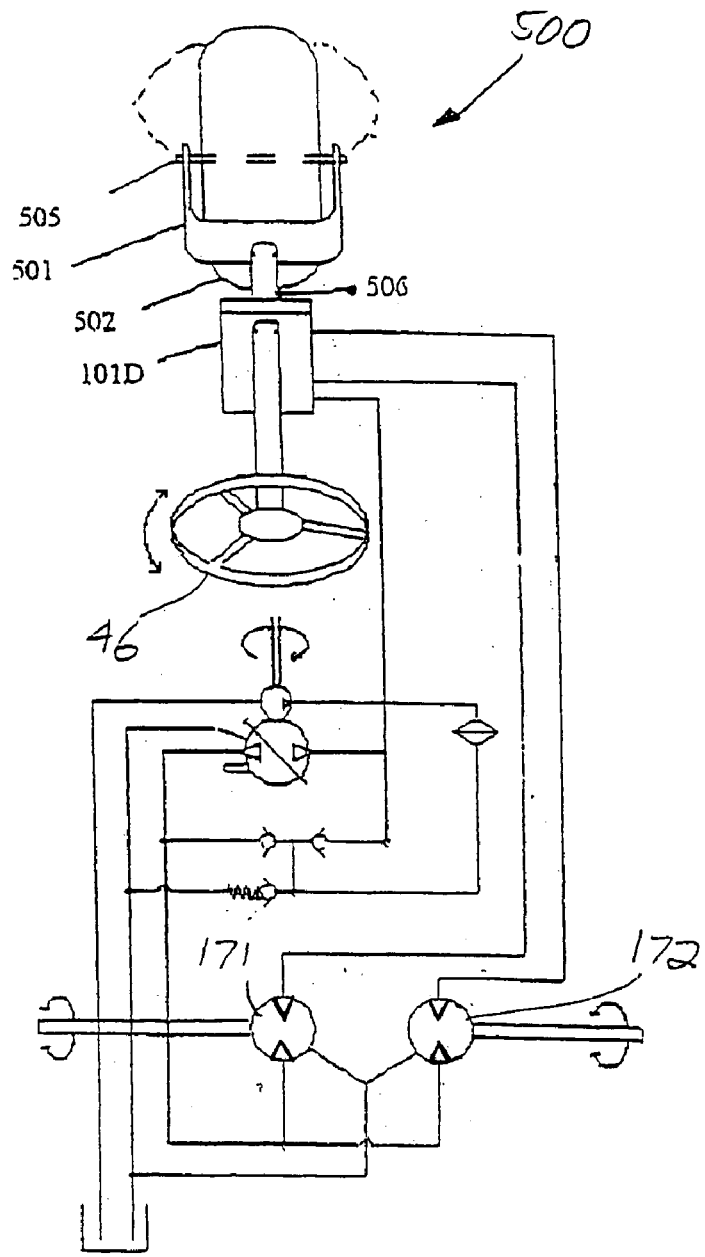
FIG. 25 is a schematic diagram showing an alternate embodiment of a steering system incorporating the variable flow control device forming one aspect of the present invention.

FIG. 25 shows an example of a possible steering system 500 for use with a three-wheeled vehicle including the hydraulic circuit of FIG. 1b or FIG. 38. A variable flow control device 101d forms part of the circuit, which may be the same as flow control device 101 of FIGS. 2a and 3a. A steering wheel 46 is secured to a shaft 506 that is in turn attached to one end of a yoke 501. The yoke 501 supports an axle 505 on which a single wheel 502 is supported. Hence, as the steering wheel 46 is turned, not only is the drive of the rear wheels proportionally controlled by the variable flow provided to motors 171, 172, the wheel 502 is also oriented or turned (note phantom depiction) in a corresponding direction. This helps the vehicle to turn in a near zero radius fashion. Adjusting or replacing the lever 34 and the gear structure 32 on the variable flow control device 101d may be desirable to ensure that it corresponds to the turn rate of the mechanical steering system 500 (see, e.g., FIG. 43).

Figure 26:
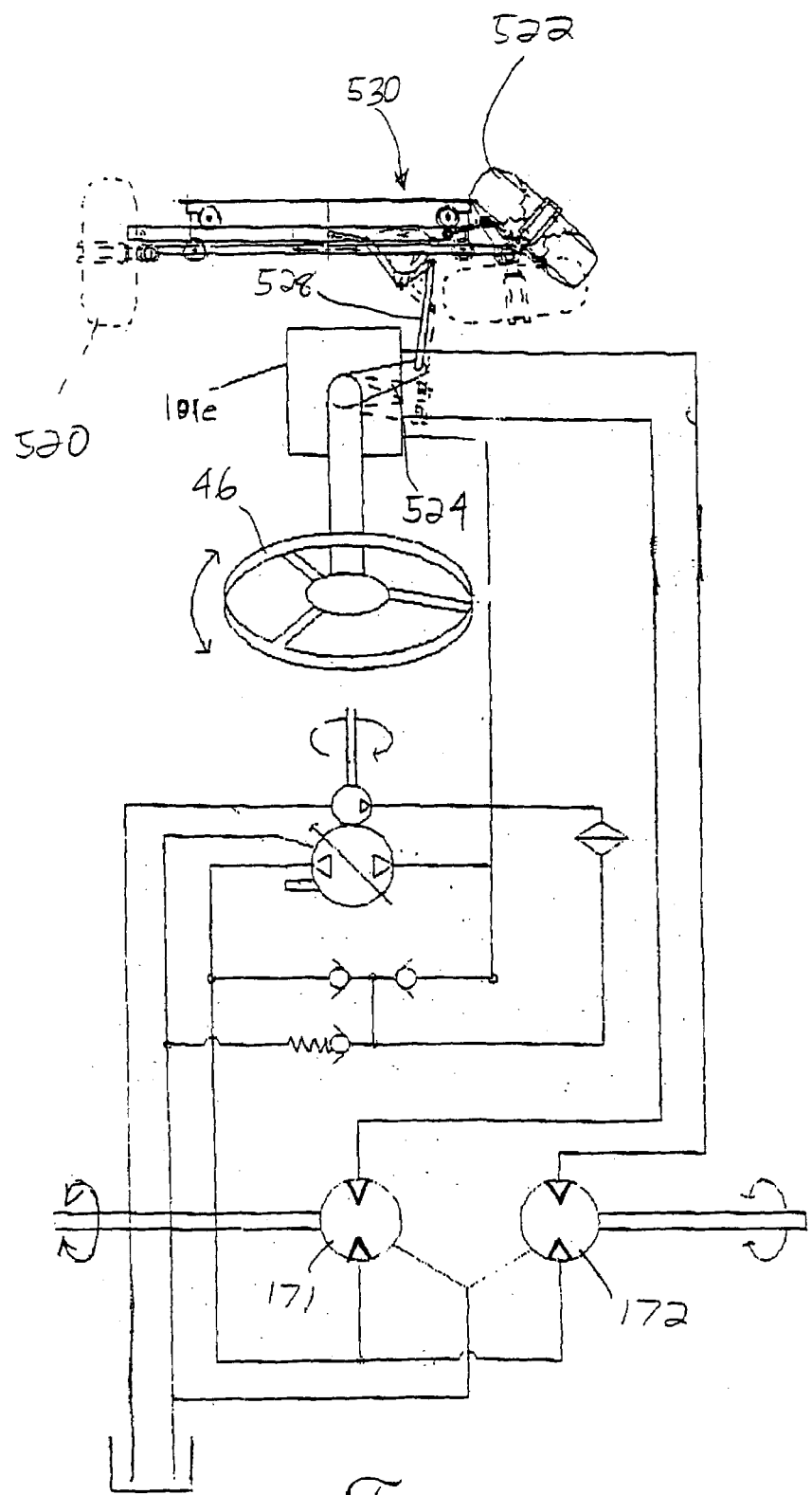
FIG. 26 is a schematic diagram showing another alternate embodiment of a steering system incorporating the variable flow control device forming one aspect of the present invention.

An embodiment of the variable flow control device 101e in use on a vehicle having four wheels is shown in FIG. 26. The two rear wheels (not shown) may be independently driven by hydraulic motors 171, 172 substantially as described above using the hydraulic circuit of FIG. 1b, FIG. 23, FIG. 24, or FIG. 38. The position of the left and right front wheels 520, 522 is controlled by a lever 524 attached to a steering shaft 525 to which a steering wheel 526 is attached. The lever 524 is in turn coupled to a linkage 528 that controls a steering system 530 for simultaneously turning or orienting the wheels 520, 522 in one direction or the other about a pivot point. The particular system 530 used may be similar to the one shown in my U.S. Pat. No. 6,185,920, the disclosure of which is incorporated herein by reference. Hence, as the lever 524 is rotated to and fro by the rotation of the steering wheel 46 (note phantom depictions of lever positions in FIG. 26), the wheels 520, 522 simultaneously turn about the corresponding pivot point. Use of this arrangement advantageously enables all four wheels on the vehicle to contribute to the control of the corresponding chassis.

Figure 27:
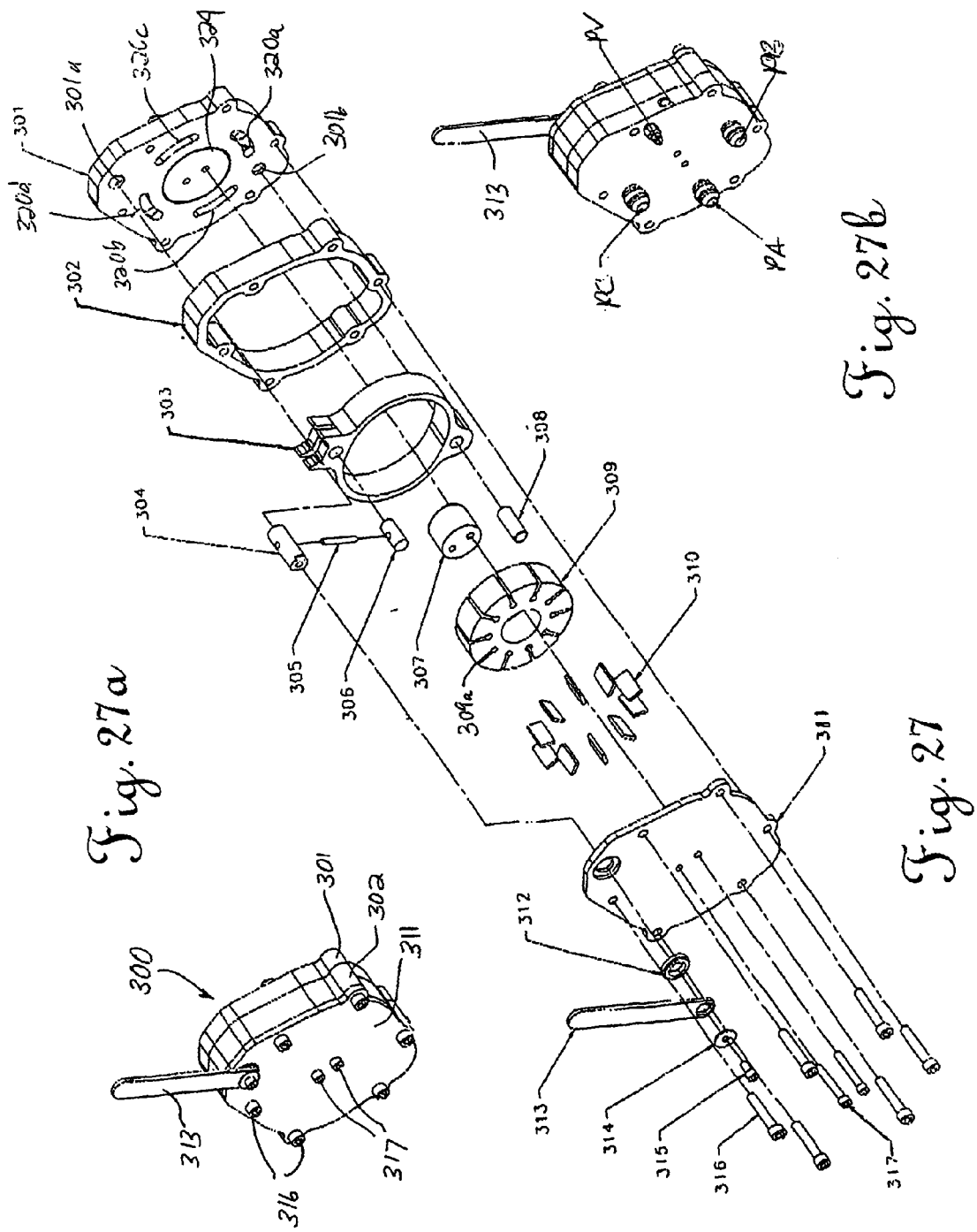
FIG. 27 is an exploded view of an alternate embodiment of the variable flow control device.

FIGS. 27, 27a, and 27b show an alternate embodiment of a variable flow control device 300. The flow control device 300 includes a first sidewall or cover 301, a housing 302, and a cradle 303 supported within the housing and capable of moving therein. Specifically, the cradle 303 engages the periphery of an actuator pin 304. The actuator pin 304 is connected to a pin 306 associated with the cradle 303 by a transverse pin 305. A rotatable vane guide body 309 also positioned in the housing 302 includes a plurality of openings 309a for slidably receiving generally flat vane plates 310. The vane guide body 309 rotates about an axis defined by a post 307 secured to the covers 301, 311 by fasteners 317. Fasteners 316 are also provided for securing the second cover 311 to the housing 302 and the first cover 301 (see FIG. 27a).

The cover 301 includes a first recess 301a for rotatably supporting the actuator pin 304 at one end. The opposite end of this pin 304 extends through the second cover 311 and is secured to a lever 313 by a fastener 315. A washer 314 may be used to distribute the load between the lever 313 and the fastener 315, and a seal 312 may be provided for sealing the interface between the pin 304 and the cover 311. The first cover 301 may also include a second recess 301b and the second cover 311 may include a corresponding recess (not shown) for supporting the pivot pin 308.

With additional reference now to the assembled views of FIGS. 27a and 27b, the first cover 301 includes passages 320a, 320b, 320c that correspond to different ports through which fluid may flow. In the embodiment shown, the first or common passage is in the form of a first arcuate slot 320a associated with a first or common port PA, the second passage is a second arcuate slot 320b associated with a second port PB, and the third passage is a third arcuate slot 320c associated with a third port PC. A fourth passage in the form of an arcuate slot 320d may also be provided that communicates with a fifth passage 322 extending to the first or common passage, which in the illustrated embodiment is slot 320a. The fourth passage, or slot 320d, may also be formed in the cover 301. A sixth passage in the form of an annular groove 324 formed in the face of the cover 301 adjacent to the rotating vane guide body 309 is also provided. An axially extending passage 322a for connecting the fifth and sixth passages 322, 324 is also provided.

Figure 28:
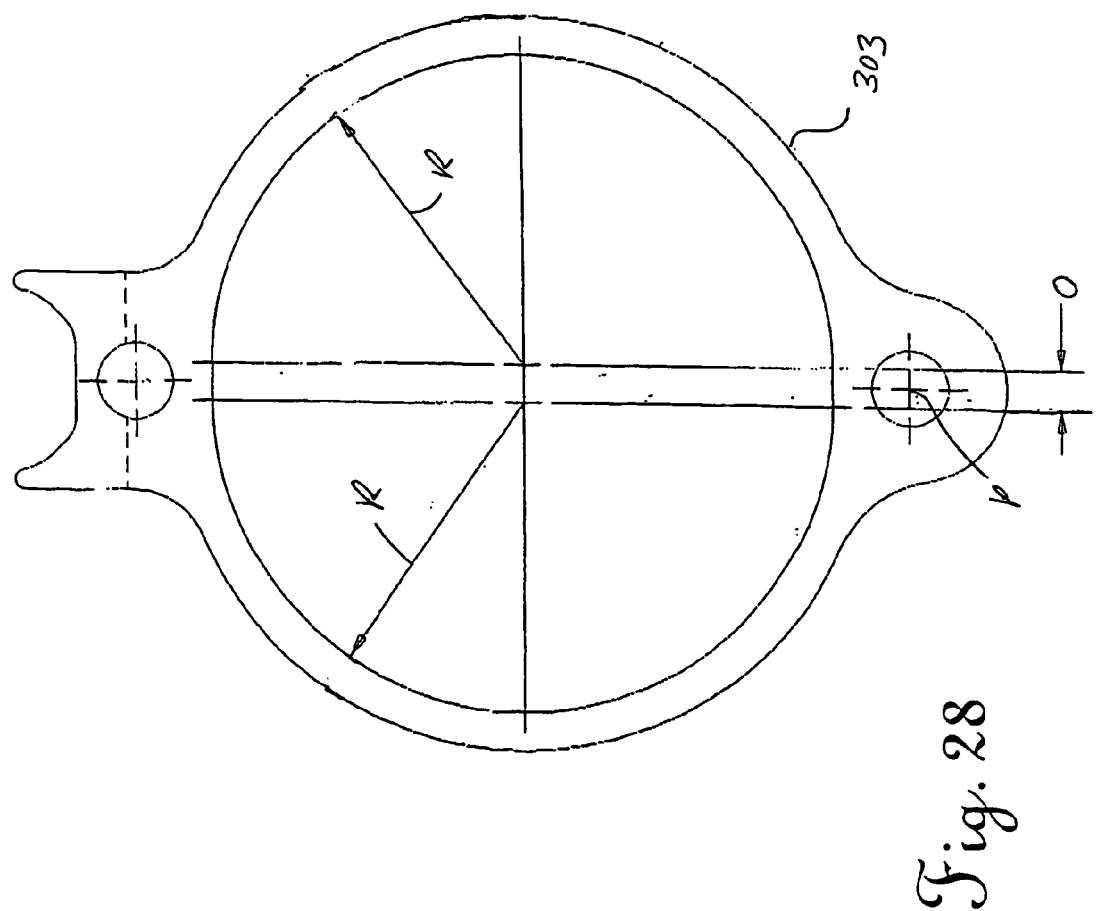
FIG. 28 is an enlarged side view of a cradle for use in the embodiment of FIG. 27.

FIG. 28 is an enlarged view showing an example of a cradle 303 for use in the vane-type variable flow control device 300 of this embodiment. The opposed inside faces of the cradle 303 are generally semi-circular and have the same radius R. However, the center point of each radius R is offset from a centerline defined by the pivot point P by one-half of an offset amount, as indicated by reference character 0. This provides the inner surface of the cradle 303 with an eccentric or oblong shape.

Figure 29:
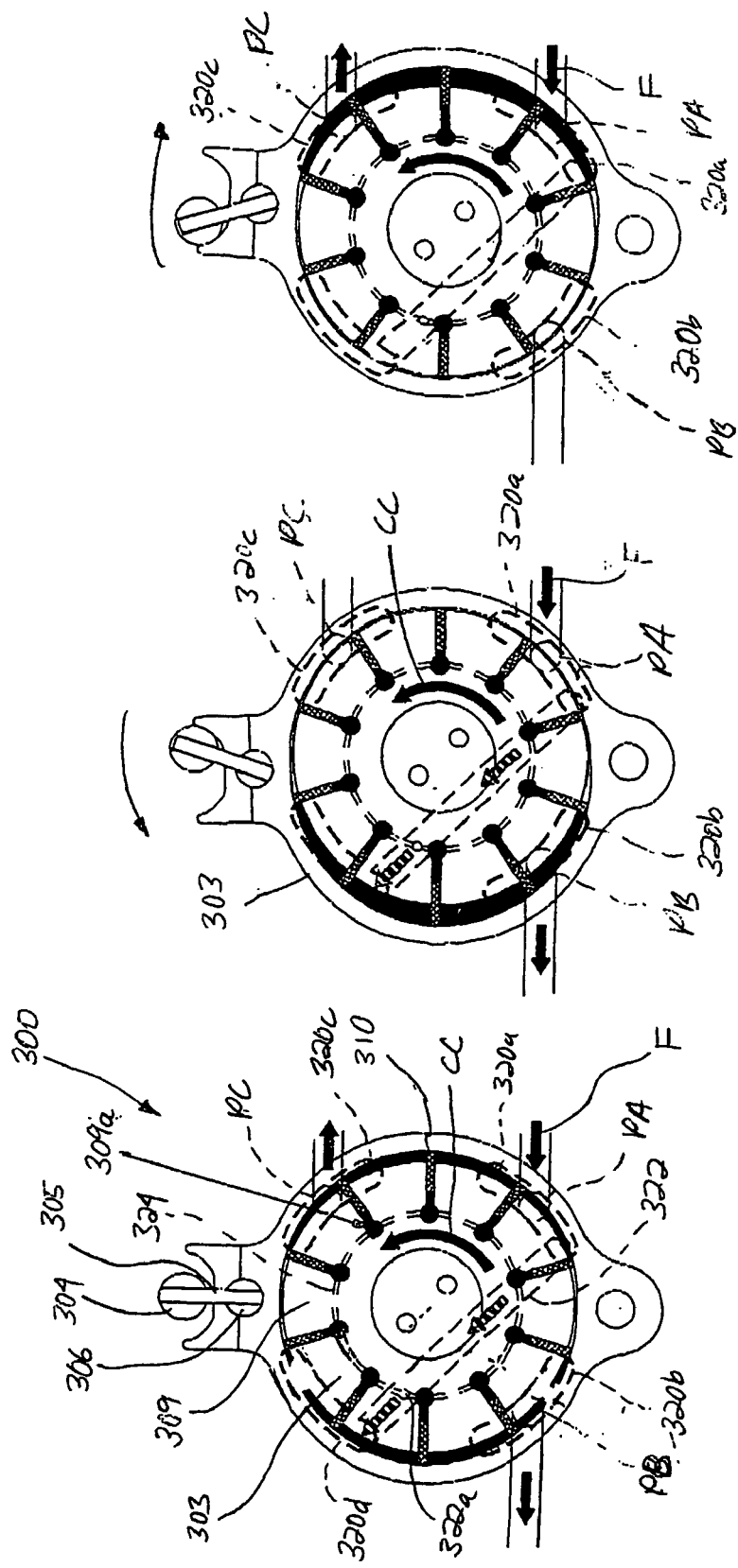
FIGS. 29a, 29b, and 29c are schematic views showing three different modes of operation of the variable flow control device of FIG. 27c.

With reference now to FIGS. 29a, 29b, 29c, the operation of the vane-style variable flow control device 300 is now described in detail. In FIG. 29a, the cradle 303 is shown in the home or centered position. In this position, fluid introduced through the common port PA travels through the first passage 320a and enters the chamber defined by the cradle 303 and the rotating vane guide body 309. Fluid is also directed via the internal passage 322 in the cover 301 to the fourth arcuate slot 320d and enters chamber on the opposite side of the vane guide body 309. This causes the vane guide body 309 to rotate in a counter-clockwise direction, as shown by arrow CC. Fluid pressure may also be communicated between passage 322 and groove 324 via axial passage 322a, which in turn communicates with the oversized ends of openings 309a formed in the body 309. This allows pressurized fluid to move between the openings 309a. As should be appreciated, the pressurized fluid in these openings 309a helps to force the vanes 310 outwardly in the radial direction (which alternatively may be accomplished using biasing means, such as springs (not shown)).

As the vane guide body 309 rotates, the vanes 310 are forced radially outwardly and engage the inner surface of the cradle 303. However, because of the eccentricity of this surface, the vanes 310 are caused to reciprocate to and fro in the openings 309a and displace fluid in the chambers between the vanes 310 as the body 309 rotates. The expansion and contraction of these chambers meters the fluid through the first passage 320a and forces it through passages 320b and 320c, respectively. As a result, fluid introduced through port PA is metered in equal proportions to ports PB and PC when the cradle 303 is in a home or centered position. It is noted that, in cases where metering fluid in equal proportions through different passages is desired, the cradle 303 may be stationary within the housing 302 (and actually may simply be integrally formed therewith).

Figure 30:
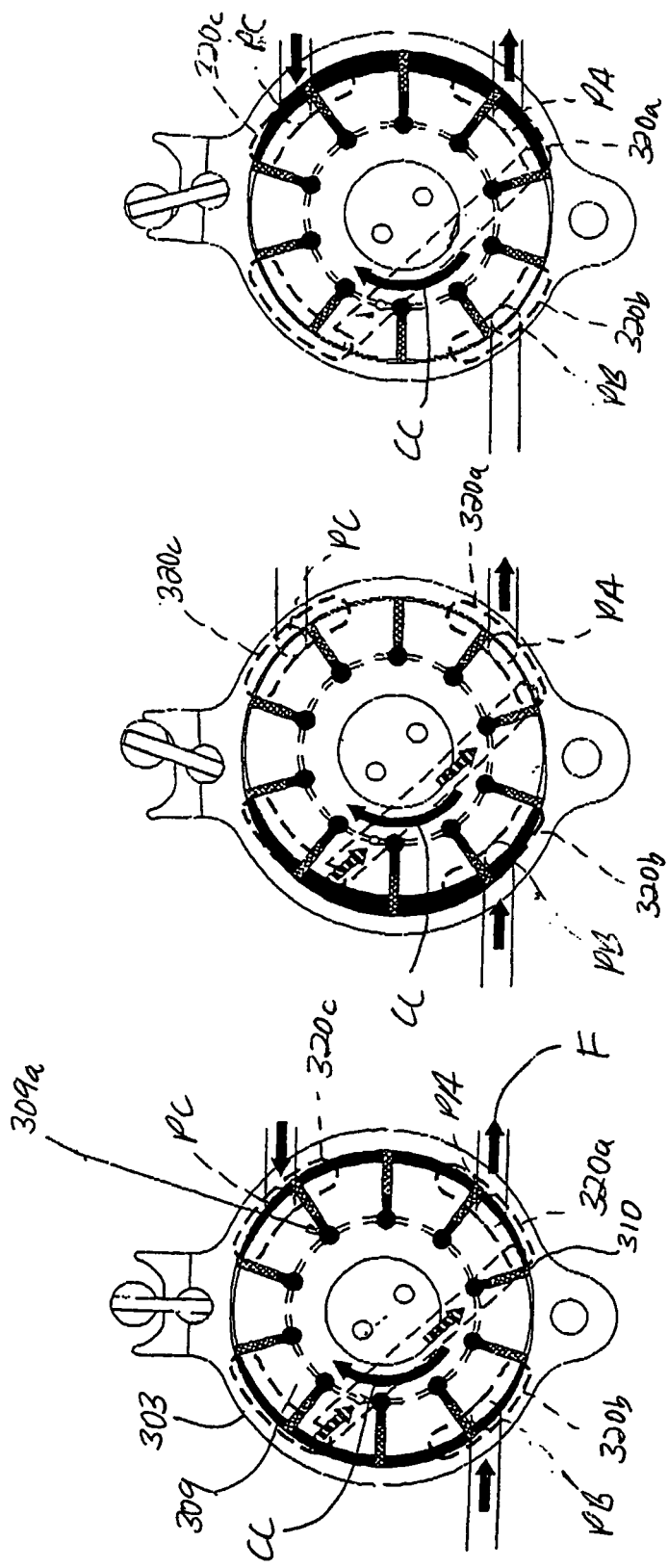
FIGS. 30a, 30b, and 30c are schematic views showing three different modes of operation of the variable flow control device of FIG. 27c when fluid flow is reversed.

When a pivoting cradle 303 is provided and pivoted in a first direction to the maximum extent using lever 313, as shown in FIG. 29b, the rotating vane guide body 309 is concentric with the sidewall of the cradle 303 adjacent to passages 320a and 320b and closes that gap that otherwise exists therebetween. This results in no flow through the third passage 320c and the corresponding port PC. Thus, all fluid introduced through the common or first port PA is directed to the second passage 320b and the corresponding port PB. Likewise, when the cradle 303 is pivoted to the maximum extent in the opposite direction (FIG. 29c), all flow entering the first passage 320a via the common port PA is directed through the third passage 320c and the corresponding port PC FIGS. 30a, 30b, and 30c are similar to FIGS. 29a–29c, but illustrate what happens when the flow direction is reversed such that the vane guide body 309 rotates in a clockwise direction (note arrow CW) and fluid entering ports PB and PC is directed to port PA. Specifically, in FIG. 30a, the cradle 303 is in the home or centered position, and fluid entering the second and third ports PB, PC via passages 320b, 320c in equal amounts is directed to the common port PA. When the cradle 303 is pivoted in a first direction to the maximum extent (that is, such that any gap between the rotating vane guide body 309 is concentric with the corresponding inside surface of the cradle 303 next to the third passage 320c), full flow is drawn through the second port PB and directed to the first passage 320a via passage 322. Conversely, when the cradle 303 is pivoted in a second direction to the maximum extent, full flow is drawn through the third port PC and directed to the first or common port PA. While the extreme cases where the fluid flow is fully controlled or metered to either port PB or port PC are described above, it should be appreciated that only an increased proportion of the fluid flow may be directed to the ports by only partially pivoting the cradle 303 in either direction.

Advantageously, this embodiment of the variable flow control device 300 may be a balanced design, as fluid pressure is applied to opposite sides of rotating vane guide body 309, rather than to a single side of a bearing as is common in conventional variable flow vane type designs. As explained above, bi-directional fluid flow may also be accommodated via reverse rotation of the rotating vane guide body 309. It should also be appreciated that the device 300 of this embodiment is self adjusting and compensates for wear due to fluid pressure supplied to the bottom of vanes 310. Specifically, as the outer ends of the vanes 310 wear, fluid pressure in opening 309a continues to bias them outwardly to contact the inside surface of the cradle 303.

An axial-piston type variable flow control device 400 is shown in FIGS. 31a, 31b, 31c, 31d and 32 (and, as outlined further below, may include an optional drive provision, as indicated by the pulley 422 shown in phantom). With specific reference to FIG. 32, the device 400 includes two rotatable bodies 412, each including a plurality of openings 412a for at least partially receiving the corresponding pistons 411. The end of each piston 411 extending outside of the opening 412a includes a first engagement structure, which may be in the form of a pivoting head 410. The head 410 may include a socket 410a at one end for mating with a corresponding ball 411a formed or provided on the end of each piston 411. The opposite end of the head 410 includes a generally flat or planar surface for engaging a second engagement structure, which in the illustrated embodiment is in the form of a generally flat, annular plate 408.

A connector, such as a shaft 407 for interconnecting the bodies 412 via splined interface, passes through the opening 408a in each plate 408. In the embodiment where the device 400 is used for dividing flow, one end of the shaft 407 is positioned in an annular bearing 404 supported by the first cover 403 (see FIGS. 35a–35c). A similar bearing 404 may also be provided for rotatably supporting the shaft 407 in the opening 413a formed in the valve block 413. The first cover 403 is secured to a second cover 414 at the opposite end of the device 400 by elongated fasteners 401. A vent port 402 maybe provided in the first cover 401, or elsewhere. Cylindrical covers 405 are also provided that extend between a valve structure or block 413 positioned between the rotatable bodies 412 and the covers 403, 414 at the opposite ends of the device 400. Retainer rings 406 are also used for fixing the position of the shaft 407 in the axial direction. Axial springs (not shown) may also be provided for urging the rotating bodies 412 toward the valve block 413. A hemispherical guide (not shown) may also be provided on plates 408 for engaging an inside surface of the corresponding cover 403, 414.

The two plates 408 (known as "swash" plates in the art) are pivotally mounted in the cylindrical covers 405 and are connected to a linkage 419. Specifically, each plate 408 includes a pin 408b at one end that is received and rotatably supported in a corresponding recess (not shown) formed in one side of each cover 405. The opposite side of each cylindrical cover 405 includes an opening 405a for receiving a pin 409 inserted in a recess 408c formed in the periphery of each annular plate 408. One pin 409 is connected to a link in the form of a lever 415, which is in turn coupled via connector pin 417 to a first end of a second, elongated link 418. The opposite end of this link 418 is connected to a third link 416 by way of connector pin 417. The third link 416 is in turn coupled to the pin 409 associated with the other plate 408, thus completing the linkage 419.

As perhaps best shown in FIGS. 33a and 33b, the valve block 413 includes an opening 413a through which the connector or shaft 407 interconnecting the two rotatable bodies 412 passes. The valve block 413 also includes a first passage 420a extending entirely through the body thereof. This passage 420a communicates with a first or common port PA. A second passage 420b formed in one side surface of the valve block 413 communicates with a second port PB, while a third passage 420c formed in the opposite side surface of the valve block 413 communicates with a third port PC. As perhaps best understood with reference to FIG. 31c, the second and third passages 420b and 420c are generally aligned in the same vertical plane, but exist in different horizontal planes when oriented as shown. All three passages 420a, 420b, 420c are shown as being generally arcuate to correspond to the arrangement of openings 412a in each rotatable body 412.

With collective reference to FIGS. 34a, 34b, 34c and 35a, 35b, 35c (which are cross-sectional views taken along line A—A in FIGS. 34a–c), operation of the axial-type variable flow control device 400 of this embodiment is now described in detail. As fluid under pressure is introduced through the common port PA, the bodies 412 rotate, with the engagement heads 410 of the pistons 411 in contact with the adjacent surface of the corresponding plate 408. As shown in FIG. 35a, when the lever 415 is positioned such that the plates 408 are tilted an equal amount (labeled 408'), the stroke of each piston 411 in each opening 412a is essentially the same as the body 412 rotates. Consequently, fluid introduced through the first or common port PA enters the openings 411a through passage 420a and is metered to passages 420b and 420c and through the associated ports PB, PC in equal proportions.

As shown in FIGS. 34b and 35b, when the lever 415 is moved in a first direction (e.g., downwardly) to the maximum extent, the position of the plates changes such that one is tilted to the maximum extent (the upper plate 408" in FIG. 35b), while the other is essentially moved to a non-tilted position 408. Consequently, the pistons 411 engaging the non-tilted plate 408 are not stroked and do not displace any fluid to the corresponding passage 420c and the corresponding port PC. However, the pistons 411 engaging the tilted plate 408 direct or meter all fluid entering the common port PA to passage 420b and the associated port PB.

Likewise, when the lever 415 is moved to the maximum extent in the opposite direction, as shown in FIGS. 34c and 35c, one plate 408 moves to a non-tilted position (the upper plate in FIG. 35c), while the other is tilted to the maximum extent (408"). Consequently, the pistons 411 engaging the non-tilted plate 408 are not stroked and do not displace any fluid to the corresponding passage 420b and the corresponding port PB. However, the pistons 411 engaging the tilted plate 408" direct or meter all fluid entering the common port PA to passage 420c and the associated port PC. While the full and no stroke positions are described above, it should be appreciated that the flow ratio through ports PB and PC is directly proportional to the position of the lever 415 between full stroke and no stroke. Also, if the direction of flow is reversed, the fluid is adjustably metered in a manner opposite to that described in the foregoing passage (i.e., flow is adjustably metered from ports PB and PC to port PA), with the bodies 412 rotating in the opposite direction.

Figure 31:
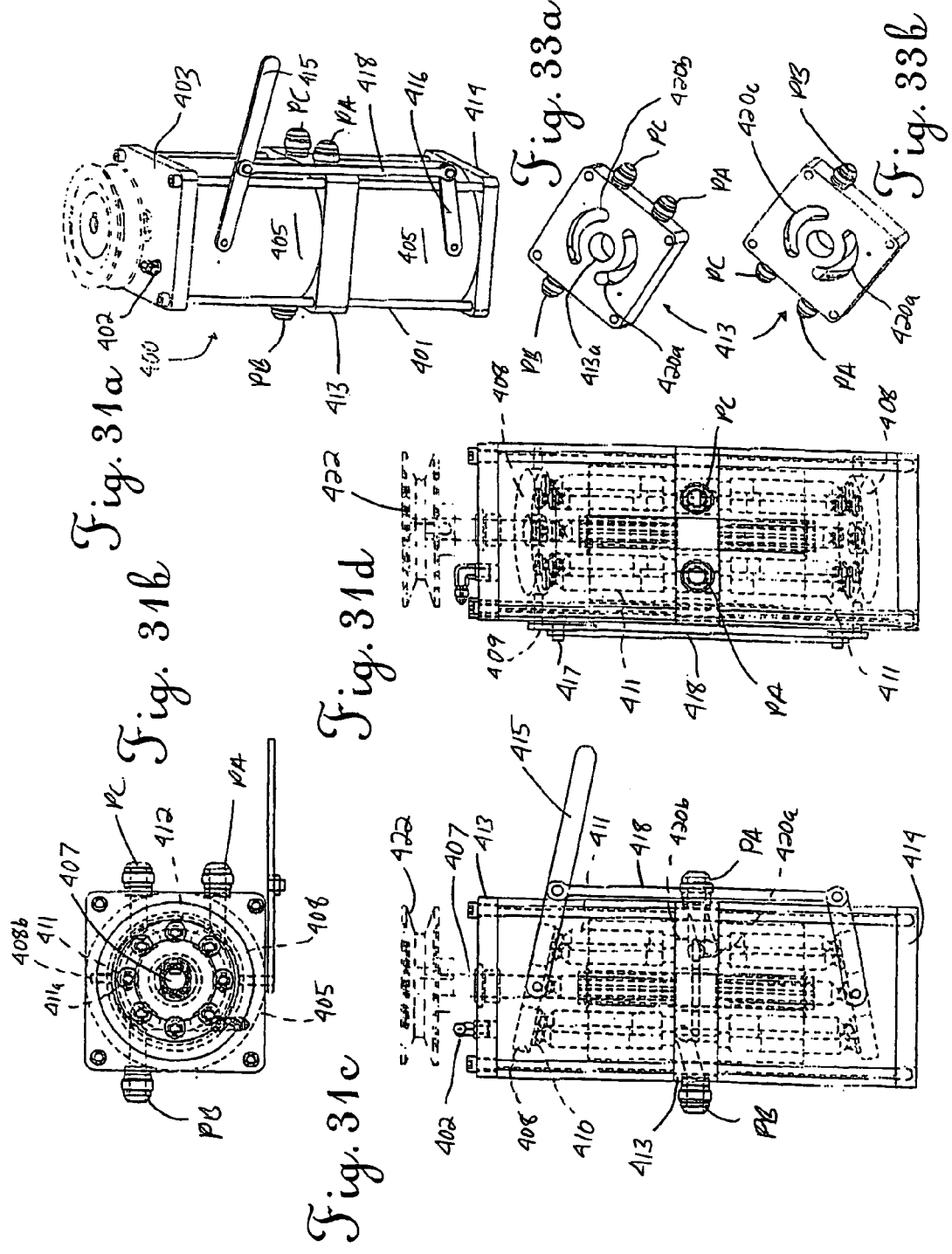
FIGS. 31a–31d show yet another embodiment of a variable flow control device.
Figure 32:
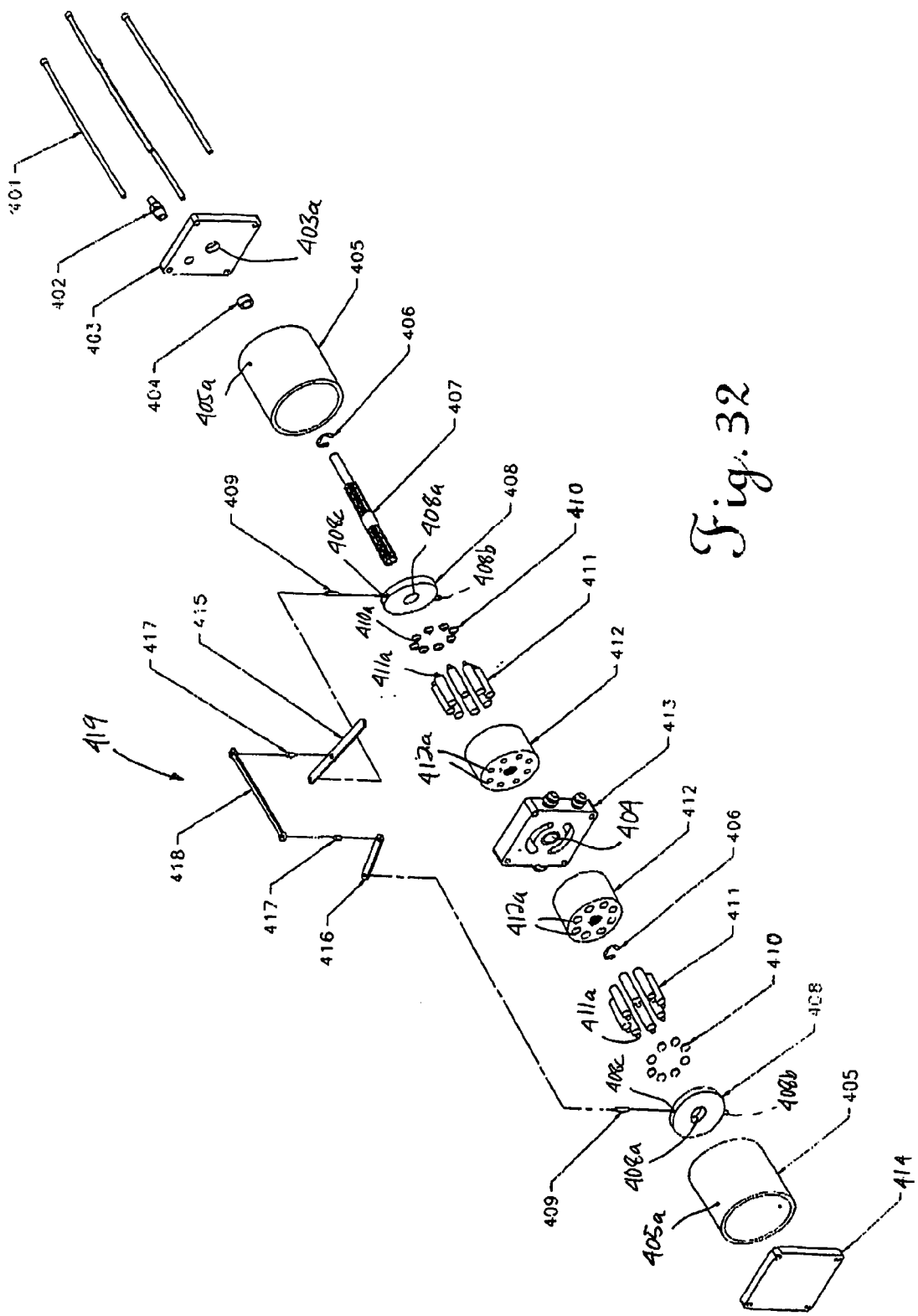
FIG. 32 is an exploded perspective view of the variable flow control device of FIGS. 35a–35d.

In an optional configuration shown in FIGS. 31c and 31d, the shaft 407 may be extended to pass through the cover 403. This exposed end of the shaft 407 may be coupled to a motive device (not shown), such as by way of pulley 422 (or other PTO provision). As the shaft 407 is rotated in a first or clockwise direction (CW), the bodies 412 are caused to rotate and thereby pump fluid through the ports PA, PB, and PC. As should be appreciated, the direction of flow is dependent on the direction in which the shaft 407 and, hence, the bodies 412, are rotated. While the overall displacement per revolution is theoretically constant, the flow ratio is varied depending on the position of the lever 415. The shaft 407 may be journaled in the bearing 404 supported by the corresponding cover 403, and a seal (not numbered) may also be provided adjacent to this interface to prevent leakage.

Yet another aspect of the disclosed invention is the provision of a double-acting pump 600, as shown in FIGS. 36a, 36b, 36c, 36d, 37a, and 37b. The arrangement is essentially the same as that shown in FIGS. 31a–31d, with two major exceptions: (1) the valve block 613 is different; and (2) each second engagement structure, or plate 608, for engaging the head ends of the pistons 611, is independently controlled by a separate lever 615a, 615b. Turning to the valve block 613, and as perhaps best shown in FIGS. 37a and 37b, the common passage is replaced with a first passage 620a corresponding to a first port PA formed in one side of the block and an adjacent second passage 620b corresponding to a second port PB is formed in the same side of the block 613. Likewise, a third passage 620c corresponding to a third port PC and a fourth passage 620d corresponding to a fourth port PD is formed in the opposite side of the block 613. Hence, when the bodies 612 supporting the pistons 611 are rotated, such as by a common shaft 607 coupled to a pulley 622 (or other PTO provision), fluid is moved through the corresponding ports PA, PB and PC, PD in an amount corresponding to the stroke of the associated lever 615a, 615b. In this application, it may also be desirable to provide each plate 608 with a hemispherical guide (not shown) for engaging the corresponding cover. The pin for supporting each plate 408 may also be replaced by a hemispherical bead (not shown) for engaging a corresponding receiver formed in the sidewall of each cover. Providing an axially aligned spring (not shown) for engaging each plate 608 at one end for urging or biasing the bodies 612 towards the valve block 613 may also be desirable.

One advantage of this arrangement is that it requires only a single drive, as opposed to dual drives as are commonly used to power conventional tandem pump configurations. This reduces the overall number of parts and space requirements as compared to arrangements using two separate pumps acting in tandem Optionally, a single charge pump 650 (as opposed to dual charge pumps as are required on conventional dual pump systems) may be included, which may require incorporating check valves (not shown) in or on the valve block 601.

FIG. 38 depicts a charge pressure circuit with check valves 181, 182 and a corresponding charge branch line 183. This reduces the chances of cavitation and/or lack of fluid control when pressure drops in this portion of the circuit, since it may be isolated from a conventional charge system during some operating conditions. Additionally, optional counterbalance valves 190, 191, 192, 193 may be provided on each side of the motive devices or motors 171, 172. This keeps a minimum positive pressure on the motive devices or motors 171, 172 during operation in either direction. This may improve control and is especially beneficial with drive-wheel-steer configurations. It also reduces the potential for machine creep after engine is turned off. An optional mechanical bypass valve (not shown) may also be positioned between the valves 190, 191 for the one drive wheel and the valves 192, 193 for the other. This allows manual movement of the vehicle when the engine is not running.

Figure 39:
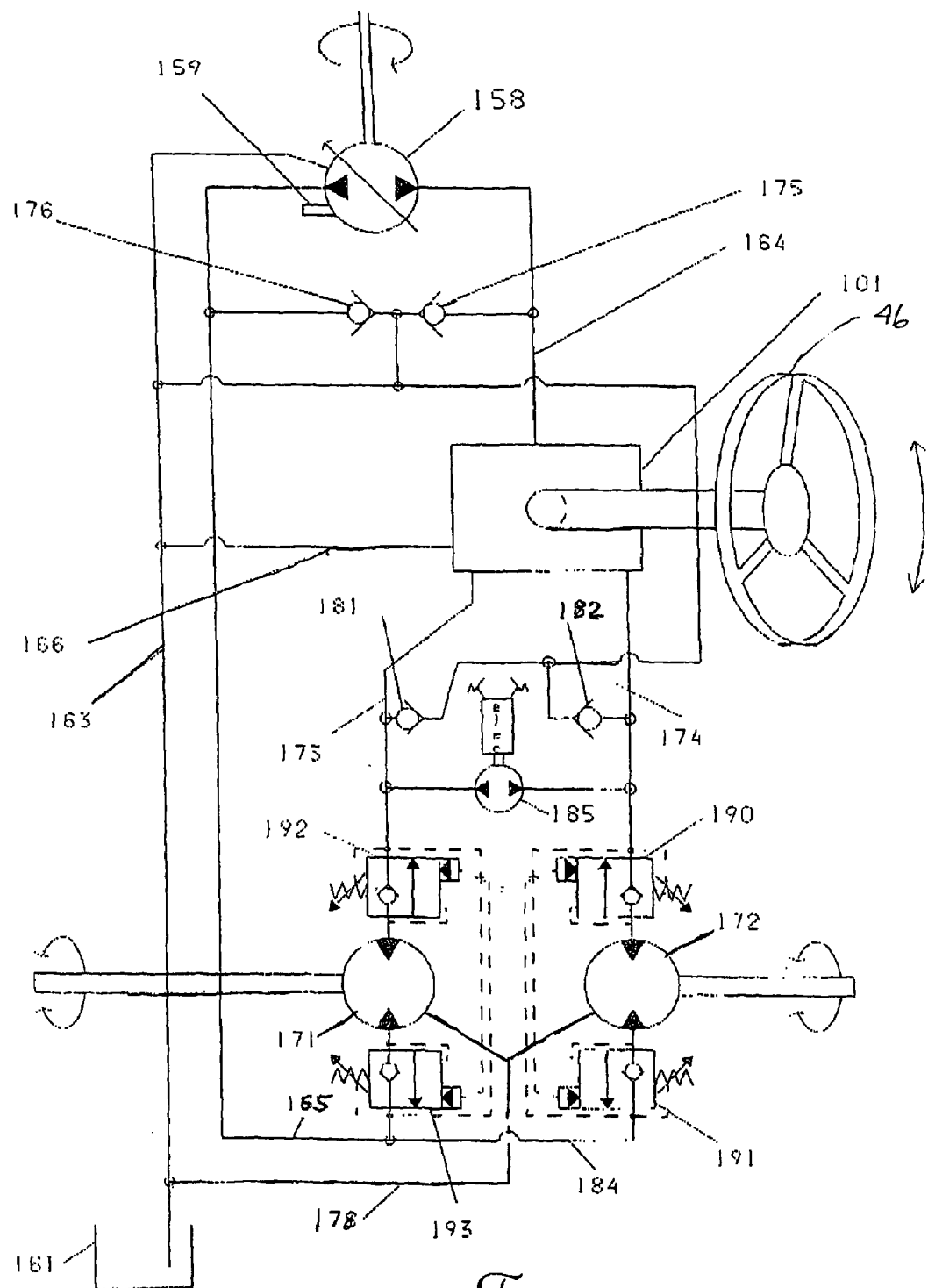
FIG. 39 is a schematic diagram of the hydraulic circuit of FIG. 38 without a charge pump.

FIG. 39 demonstrates schematically a hydraulic circuit incorporating the variable flow control device 101 without use of a pressurized charge circuit (i.e. in the absence of a charge pump 74). This configuration reduces costs by eliminating the charge pump and associated reservoir and plumbing without sacrificing performance.

Figure 40:
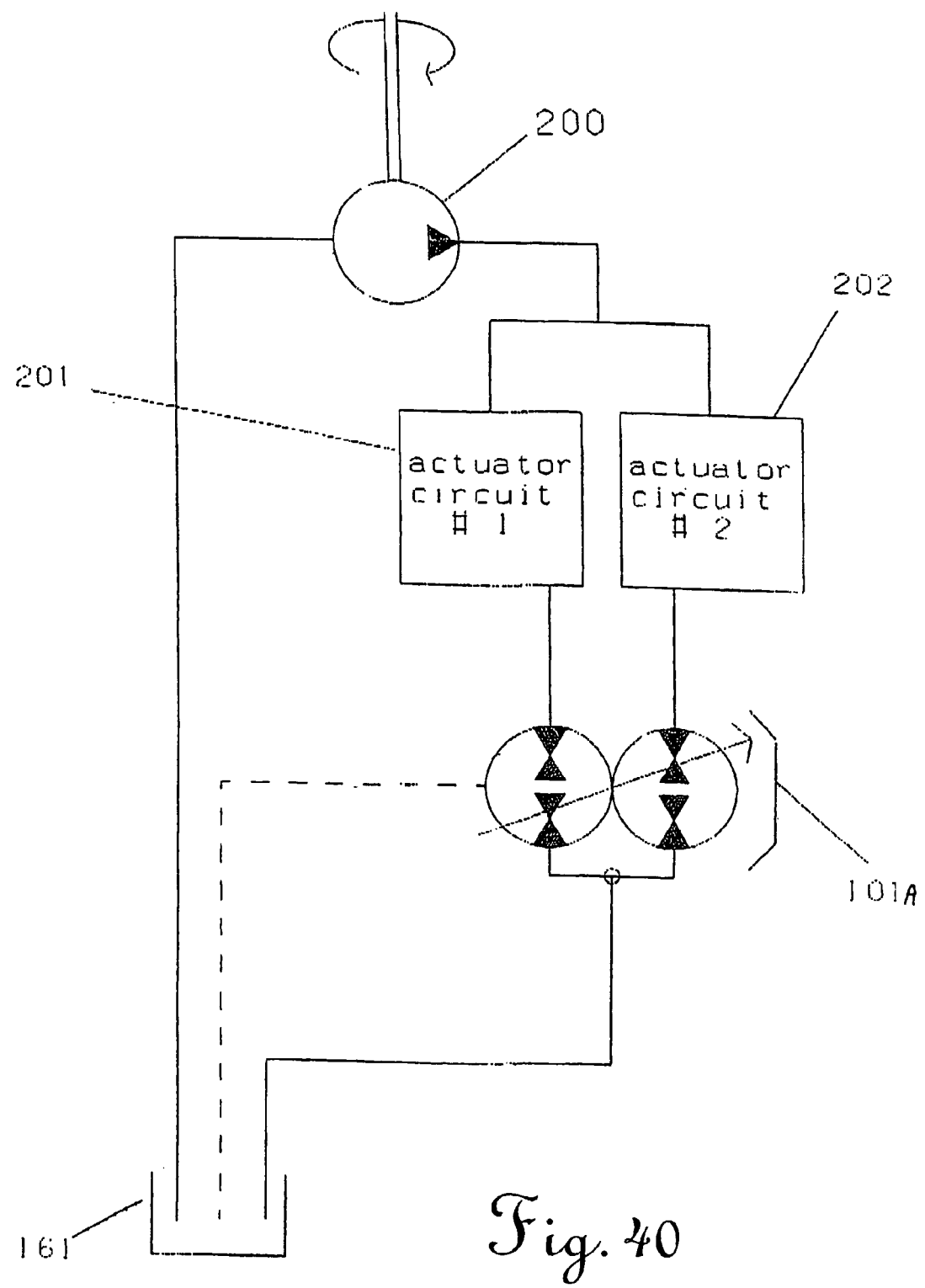
FIG. 40 is a schematic diagram of a hydraulic circuit wherein the variable flow control device is downstream of the actuator circuits.
Figure 41:
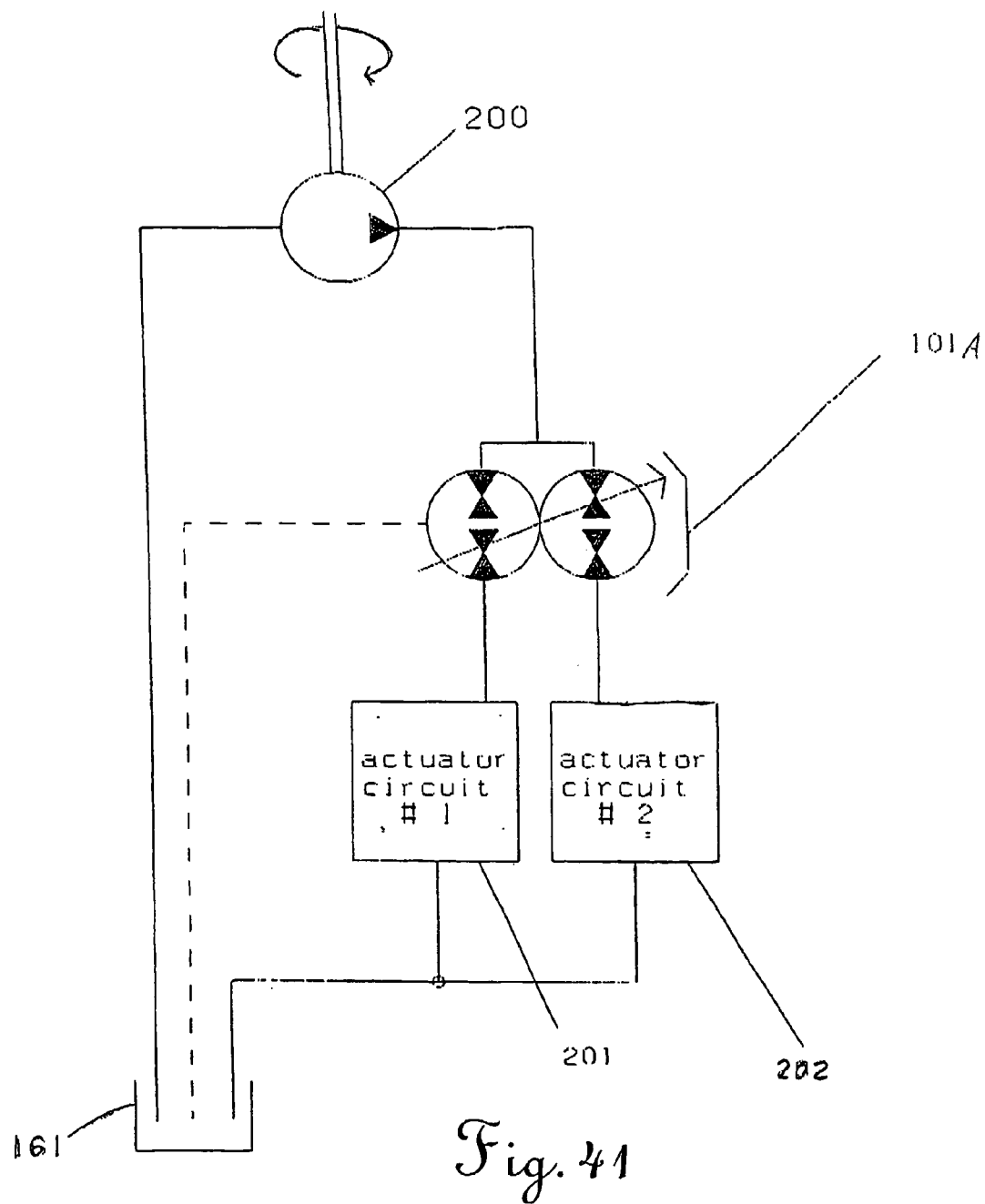
FIG. 41 is a schematic diagram of the hydraulic circuit wherein the variable flow control device is upstream of the actuator circuits.

FIG. 40 demonstrates an open-circuit system with one way fluid flow and with the variable flow control device 101a located upstream of the corresponding motive devices 171, 172, which are identified as forming part of separate actuator circuits 201, 202 that may include the optional counterbalance valves 190, 191, 192, 193 for purposes of simplifying the illustration. FIG. 41 shows a similar system, with the VFD located downstream of the actuator circuits 201, 202.

In accordance with still yet another aspect of this invention, a means for reducing or eliminating vibration and rattling of certain components associated with the variable flow control device 101 essentially constructed in the manner shown in FIGS. 2a and 3a is disclosed. Specifically, internal forces acting on the cradle 9 during operation may cause the gear structure 732 and gear engagement structure, or lever 734 (which, as should be appreciated, are oriented differently, as compared to the gear structure 32 and lever 34 of FIGS. 2a and 3a) to vibrate, resulting in undesirable noise. As shown in FIGS. 42a, 42b, and 42c, coiled tension springs 700 for biasing lever 34 and friction disks 701 for providing a holddown force thereto are provided. Jam nuts 702 are secured to the bolts 703 that pass through arcuate slots 704 supporting the friction disks 701. Tightening or loosening these nuts 702 adjusts of the force applied to the friction disks 501, thereby allowing an increase or decrease in the resistance to movement of lever 734. This not only improves operator feel, but also prevents inadvertent actuator lever movement. Coiled tension springs 700 also bias the lever 34 to return to the center position (which corresponds to the centered position of the cradle 9), further improving operator control and feedback (note expanded 700' and compressed 700" positions of springs in FIG. 42c). In the absence of operator actuation during a turn, such as by turning the steering wheel 46, the lever 734 thereby tends to return to the straight ahead (i.e., equal flow) position.

Figure 43:
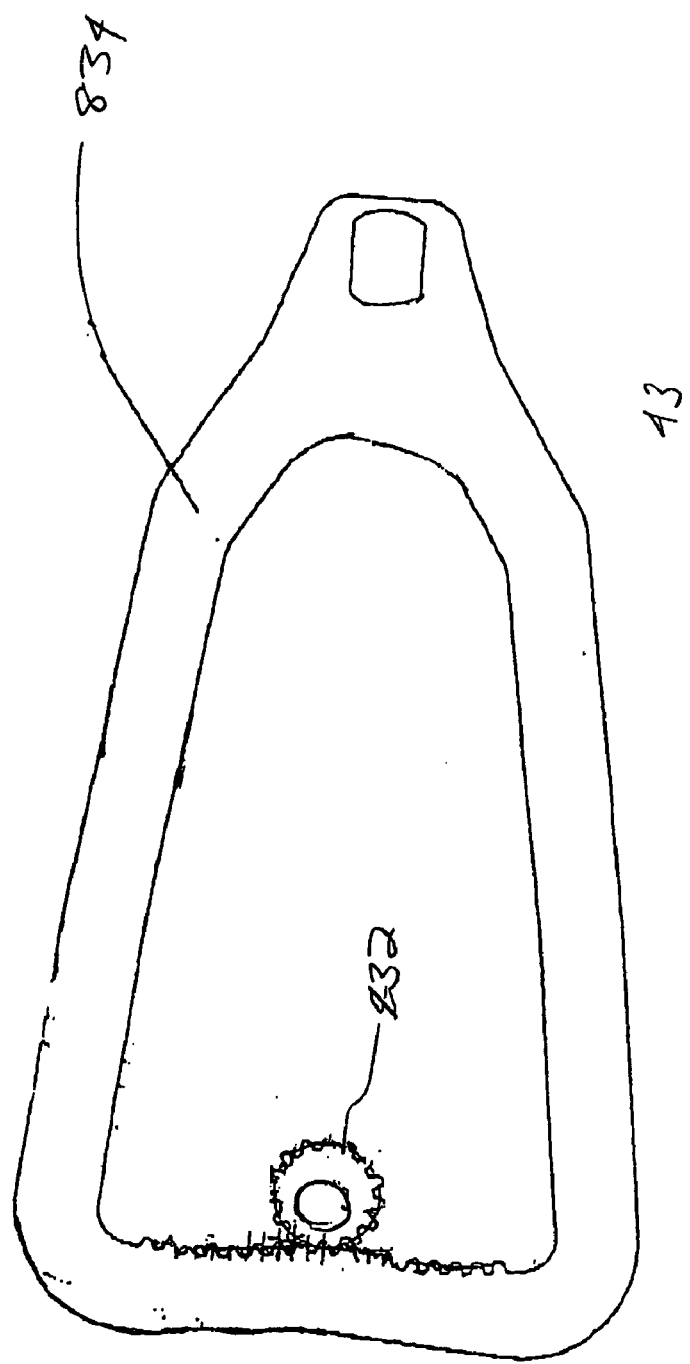

A modified version of the lever 834 is shown in FIG. 43 with an eccentric gear structure 832. This type of lever 834 may be of use in helping to coordinate the operation of the variable flow control device 101 with that of any mechanical steering system provided, such as those shown in FIGS. 25–26.

The foregoing description of various embodiments of inventions has been presented for purposes of illustration and description. It is not intended to be exhaustive or to limit the inventions to being practiced only in the precise forms disclosed. Obvious modifications or variations are possible in light of the above teachings. Despite the illustration and description of use of the variable flow control devices of the invention with lawn mowers, it should be appreciated that the application to any type of vehicle is possible, including for example cars, trucks, tanks, cranes, wheel chairs, skid steers, snowmobiles, and others, without limitation. The embodiments described provide the best illustration of the principles of the invention and its practical application to thereby enable one of ordinary skill in the art to utilize the inventions in various embodiments and with various modifications as are suited to the particular use contemplated. All such modifications and variations are within the scope of the invention as determined by the appended claims when interpreted in accordance with the breadth to which they are fairly, legally and equitably entitled.

The invention claimed is:

1. An apparatus intended for use in selectively controlling or adjustably metering a flow of fluid through a common passage and through first and second passages, comprising:
a rotatable body having first and second axially spaced openings in selective fluid communication with the common passage and the first and second passages as the body rotates;
a piston associated with each opening and capable of moving therein between a first position and a second, displaced position;
first and second non-concentric engagement structures for engaging and selectively moving the piston associated with each of the first and second openings between the first and second positions as the body rotates for directing the fluid flow through only the first passage, only the second passage, or proportionally through both the first and second passages; and
a cradle for supporting the engagement structures, wherein the cradle is pivotally mounted and movable in a first direction such that the first engagement structure moves the piston in the first opening as the body rotates and a second direction such that the second engagement structure moves the piston in the second opening as the body rotates, wherein the first direction is generally opposite the second direction.

2. The apparatus according to claim 1, wherein the non-concentric engagement structures are axially spaced, circular races.

3. The apparatus according to claim 1, wherein the rotatable body is generally cylindrical in shape and includes a center opening and first and second sets of axially spaced openings, each associated with a single piston.

4. The apparatus according to claim 3, wherein each piston is a ball capable of moving radially between the first and second positions when selectively moved by the corresponding non-concentric engagement structure.

5. The apparatus according to claim 4, wherein each piston is urged outwardly in a radial direction toward the corresponding engagement structure by fluid entering the first and second openings through the center opening.

6. The apparatus according to claim 4, further including a post about which the body rotates, the post including at least a portion of the common passage and at least a portion of the first and second passages.

7. The apparatus according to claim 6, further including a housing for supporting the post and a pin supported by the housing for pivotally supporting the cradle.

8. The apparatus according to claim 3, wherein fluid flows through the common passage and through the first and second passages in substantially equal proportions when the cradle is in a first or centered position.

9. The apparatus according to claim 8, wherein at least a portion of the fluid flow is directed through the common passage and through the first passage by positioning the cradle such that the first engagement structure selectively engages and sequentially moves or strokes each piston in the first set of openings between the first and second positions.

10. The apparatus according to claim 8, wherein at least a portion of the fluid flow is directed through the common passage and through the second passage by positioning the cradle such that the second engagement structure selectively engages and sequentially moves or strokes each piston in the second set of openings between the first and second positions.

11. The apparatus according to claim 9, wherein at least a portion of the fluid flow is directed through the common passage and through one of the first or second passages in a first flow direction by positioning the cradle such that the first or second engagement structure moves or strokes each first or second piston in the corresponding opening;
wherein a degree of eccentricity of the other engagement structure is such that the corresponding pistons are stroked and fluid is directed through the other passage in a second flow direction generally opposite the first flow direction.

12. The apparatus according to claim 8, wherein the housing supports a gear engagement structure connected to the cradle for mating with at least one gear associated with a rotatable steering device, such that the gear engagement structure and hence the cradle is selectively moved from a centered position in a first direction or in a second direction to selectively control or adjustably meter the flow through the first or second passages as the steering device is rotated.

13. The apparatus according to claim 12, further including means for dampening vibrations acting on the gear engagement structure.

14. A system for intended use in selectively controlling or adjustably metering a flow of fluid, comprising:
an elongated rotatable body defining an axis of rotation and first and second axially spaced sets of openings;
a piston associated with each opening and capable of reciprocating therein;
a movable cradle including first and second non-concentric engagement structures for selectively causing the pistons associated with the first and second sets of openings to sequentially reciprocate;
a post for receiving the body, the post including a common passage in selective fluid communication with the first and second openings in the body, a first passage in selective fluid communication with the first opening, and a second passage in selective fluid communication with the second opening;
whereby fluid flow through the common passage may be selectively controlled or adjustably metered through only the first passage, through only the second passage, or proportionally through both the first and second passages by selectively positioning the cradle such that either the first engagement structure, the second engagement structure, or both the first and second engagement structures, cause the corresponding pistons to reciprocate as the body rotates.

15. The system according to claim 14, further including first and second hydraulic motors in fluid communication with the first and second passages, respectively, whereby the selective control or adjustable metering of the fluid flow through the first and second passages controls the corresponding hydraulic motor.

16. The system according to claim 15, further including:
a chassis supporting left and right driven structures operably associated with the first and second hydraulic motors; and
a main pump capable of bi-directionally pumping fluid through the common passage to control the direction of rotation of the hydraulic motors and the corresponding driven structures.

17. The system according to claim 16, wherein the rotatable body is generally cylindrical and each piston is a ball capable of moving radially between a first and second position when engaged by the corresponding non-concentric engagement structure.

18. The system according to claim 14, wherein the first and second engagement structures are formed along an inner surface of the cradle or are races supported by the cradle.

19. The system according to claim 14, wherein the engagement structures are such that, when the cradle is at a centered position relative to the body, a stroke of the piston in each first opening as the body rotates is substantially equal to a stroke of the piston in each second opening.

20. The system according to claim 19, wherein as the cradle moves from the centered position, the stroke of the piston in each first opening as the body rotates is reduced by the same amount the stroke of the piston in each second opening is increased.

21. The system according to claim 16, further including a steering device for engaging and causing the cradle to pivot.

22. The system according to claim 21, wherein the steering device is a swing steer assembly including a rotatably mounted swing steer handle coupled to a first sprocket connected to a second sprocket by an endless chain, whereby the second sprocket is associated with a gear for mating with a gear engagement structure for causing the cradle to pivot when the swing steer handle is rotated.

23. The system according to claim 21, wherein the steering device includes a steering wheel and a steering wheel support shaft carrying a gear for mating with a gear engagement structure associated with the cradle for causing the cradle to pivot when the steering wheel is rotated.

24. The system according to claim 23, further including one or more non-driven ground-engaging wheels associated with the chassis.

25. The system according to claim 24, wherein the steering wheel support shaft is connected to and controls an orientation of at least one non-driven wheel.

26. The system according to claim 24, wherein a pair of non-driven ground-engaging wheels are coupled to a steering linkage, wherein the steering wheel support shaft is connected to the steering linkage and controls an orientation of the non-driven wheels.

27. The system according to claim 23, further including an auxiliary pump and means for actuating the auxiliary pump to direct fluid flow through the first hydraulic motor to cause the left driven structure to rotate in a direction opposite the right driven structure when the steering wheel is rotated to at or near a full left hand turn position and to direct fluid through the second hydraulic motor to cause the right driven structure to rotate in a direction opposite the left driven structure when the steering wheel is rotated to at or near a full right hand turn position.

28. The system according to claim 27, wherein the actuating means includes first and second outwardly directed levers associated with the steering wheel for engaging a linkage associated with a switch for selectively controlling operation of the auxiliary pump.

29. The system according to claim 27, wherein the actuating means includes first and second outwardly directed levers associated with the steering wheel for selectively engaging means for activating a pump motor associated with the auxiliary pump.

30. The system according to claim 29, further including means for disabling the pump motor when the direction of fluid flow from the main pump is reversed.

31. The system according to claim 29, further including means for reversing the pump motor when the direction of fluid flow from the main pump is reversed.

32. The system according to claim 27, wherein the actuating means includes first and second switches for engaging the gear engagement structure when the steering wheel is at or near the full right hand and full left hand turn positions.

33. An apparatus intended for selectively controlling or adjustably metering a flow of fluid, comprising:

a rotatable body including a plurality of openings;
a vane at least partially received in each opening;
a cradle having an eccentric inner surface for selectively engaging and causing the vanes to move to and fro in the openings as the body rotates; and
a structure including a common passage and first and second passages in fluid communication with at least the common passage;
wherein the vanes are selectively engaged and moved in the openings as the body rotates to selectively control the proportion of the fluid flowing through the first and second passages, and the cradle is mounted for pivoting movement within a housing and a lever is provided for positioning the cradle in at a first position where no fluid flows through the first passage, a second position where no fluid flows through the second passage, and to positions between the first and second positions to adjustably meter the proportion of fluid flowing to the first and second passages.

34. The apparatus according to claim 33, wherein the openings are radially extending slots, with each vane being slidably received in the corresponding slot.

35. The apparatus according to claim 33, wherein the structure including the common passage and the first and second passages is a sidewall of a housing containing the body.

36. The apparatus according to claim 35, wherein the common passage includes first and second recesses in the sidewall, the recesses being interconnected by an auxiliary passage formed in the sidewall.

37. The apparatus according to claim 35, wherein the slots include an oversized portion in fluid communication with a groove or channel formed in the sidewall, whereby the fluid flows through the groove or channel to the oversized portion of the opening to assist in forcing the corresponding vane radially outwardly and into engagement with the eccentric inner surface.

38. A system including the apparatus of claim 33, comprising a pump and first and second hydraulic motors in fluid communication with the first and second passages, respectively, whereby selectively controlling or adjustably metering the fluid flow through the passages serves to control the corresponding hydraulic motor in proportion to a movement of the cradle.

39. The system according to claim 34, further including first and second driven structures operably associated with first and second hydraulic motors.

40. An apparatus intended for use in selectively controlling or adjustably metering a flow of fluid, comprising:

first and second rotatable bodies having an axis of rotation, each including at least one axially aligned opening;
a piston positioned at least partially in each opening;
first and second engagement structures for engaging a first end of each piston as the first and second bodies rotate, the engagement structures being selectively movable for controlling a stroke of each piston in the axial direction;
a valve structure including a common passage m selective fluid communication with a first passage by way of the opening in the first body and second passage by way of the opening in the second body; and
a linkage coupling a first lever associated with the first engagement structure to a second lever associated with the second engagement structure;
whereby the fluid flow through the first and second passages is selectively controlled or adjustably metered as the bodies rotate depending on the position of the engagement structures for controlling the stroke of each piston in the axial direction.

41. The apparatus according to claim 40, wherein each rotatable body includes a plurality of axially aligned openings.

42. The apparatus according to claim 40, wherein the first and second engagement structures are mounted for pivoting movement relative to the axis.

43. The apparatus according to claim 40, wherein a nominal position of the first lever moves the first and second engagement structures such that equal flow through the first and second passages results.

44. The apparatus according to claim 43, wherein a first position of the first lever results in full fluid flow through the first passage and a second position of the first lever results in full fluid flow through the second passage.

45. The apparatus according to claim 40, further including a connector interconnecting the first and second bodies via a splined interface.

46. The apparatus according to claim 45, further including a motive device coupled to the connector for rotating the first and second bodies, whereby the apparatus forms a pump for pumping fluid from the common passage to the first and second passages, or vice-versa, depending on the stroke of the pistons associated with each rotatable body.

47. The apparatus according to claim 40, wherein the valve structure is positioned between the first and second bodies.

48. An apparatus intended for use in pumping a fluid, comprising:
first and second rotatable bodies having an axis of rotation, each including at least one axially aligned opening;
a piston positioned at least partially in each opening;
first and second engagement structures for engaging a first end of each piston as the first and second bodies rotate, the engagement structures being selectively movable for controlling a stroke of each piston in the axial direction as the corresponding body rotates;
a valve structure including a first passage in fluid communication with a second passage by way of the opening in the first body and a third passage in fluid communication with a fourth passage by way of the opening in the second body; and
a motive device for rotating the first and second bodies;
whereby the fluid is pumped from the first and third passages to the second and fourth passages, respectively, or vice-versa, depending on the position of the engagement structures for controlling the stroke of each piston in the axial direction as the bodies rotate.

49. The apparatus according to claim 48, wherein each rotatable body includes a plurality of axially aligned openings.

50. The apparatus according to claim 48, wherein first and second engagement structures are pivotally mounted in a housing and are each coupled to an external lever used to selectively move the corresponding engagement structure for controlling the stroke of each piston.

51. The apparatus according to claim 48, further including a single charge pump in fluid communication with a housing for assisting in urging each piston axially outwardly.

52. A system for intended use in steering a vehicle having left and right driven structures for moving the vehicle to and fro, comprising:
a steering device including a single rotatable steering structure having a full right hand turn and a full left hand turn position;
first and second fluid-actuated motive devices for moving the left and right driven structures;
a main pump for supplying a flow of fluid under pressure to the first and second motive devices;
an auxiliary pump and means for actuating the auxiliary pump to direct fluid flow through the first fluid-actuated motive device to cause the left driven structure to rotate in a direction opposite the right driven structure when the steering structure is rotated to at or near a full left hand turn position and to direct fluid through the second fluid-actuated motive device to cause the right driven structure to rotate in a direction opposite the left driven structure when the steering structure is rotated to at or near a full right hand turn position; and
a variable flow control device for directing substantially all of the fluid flow through the first motive device associated with the left driven structure when the steering structure is at the full right hand turn position, directing substantially all of the fluid flow through the second motive device associated with the right driven structure when the steering structure is at the full left hand turn position, and proportionally dividing fluid flow between the first and second motive devices when the steering structure is between the full right hand and full left hand turn positions,
wherein the variable flow control device includes:
a housing;
an elongated, generally cylindrical rotatable body having a center opening defining an axis and first and second sets of axially spaced openings defining piston chambers;
a piston positioned in each piston chamber and capable of moving therein between a first position and a second position;
a pivotally mounted cradle associated with the steering device, the cradle including first and second non-concentric engagement structures, the first engagement structure sequentially stroking the pistons associated with the first set of openings as the body rotates and the second engagement structure sequentially stroking the pistons associated with the second set of openings as the body rotates; and
a generally cylindrical post supported by the housing and received in the center opening of the body, the post including a common passage in fluid communication with the main pump and in selective fluid communication with both the first and second sets of piston chambers as the body rotates, a first passage in fluid communication with the first motive device and in selective fluid communication with each of the first set of openings as the body rotates; and a second passage in fluid communication with the second motive device and in selective fluid communication with each of the second set of openings as the body rotates;
whereby substantially all of the flow of fluid through the common passage is directed through the first passage by positioning the cradle at a first position for displacing only the pistons in the first openings when the steering structure is at the full right hand turn position and is directed through the second passage by positioning the cradle at a second position for displacing only the pistons in the second openings when the steering structure is at the full left hand turn position.

53. The system according to claim 52, wherein the steering structure is a steering wheel and the steering device includes a steering wheel support shaft carrying a gear for mating with a gear engagement structure coupled to the cradle.

54. The system according to claim 52, wherein the steering device is a swing steer assembly and the steering structure is a rotatably mounted swing steer handle coupled to a first sprocket connected to a second sprocket by an endless chain, whereby the second sprocket is associated with a gear for mating with a gear engagement structure for causing the cradle to pivot in a first direction or a second direction when the swing steer handle is rotated in a corresponding direction.

55. The system according to claim 52, wherein the actuating means includes first and second outwardly directed levers associated with the steering structure for engaging a linkage associated with a switch for selectively controlling operation of the auxiliary pump.

56. The system according to claim 52, wherein the actuating means includes first and second outwardly directed levers associated with the steering structure for selectively engaging means for activating a pump motor associated with the auxiliary pump.

57. The system according to claim 56, further including means for disabling the pump motor when the direction of fluid flow from the main pump is reversed.

58. The system according to claim 56, further including means for reversing the pump motor when the direction of fluid flow from the main pump is reversed.

59. A system for intended use in steering a vehicle having left and right driven structures for moving the vehicle to and fro, comprising:
  a steering device including a single rotatable steering structure having a full right hand turn and a full left hand turn position;
  first and second fluid-actuated motive devices for moving the left and right driven structures;
  a main pump for supplying a flow of fluid through first and second motive devices;
  a variable flow control device for directing substantially all of the fluid flow through the first motive device associated with the left driven structure when the steering structure is at the full right hand turn position and directing substantially all of the fluid flow through the second motive device associated with the right driven structure when the steering structure is at the full left hand turn position; and
  a bi-directional auxiliary pump for directing fluid flow through the second motive device for moving the left driven structure in a reverse direction only when the steering structure is at or near the full left hand turn position and for directing fluid flow through the first motive device for moving the right driven structure in a reverse direction only when the steering structure is at or near the full right hand turn position.

60. The system according to claim 59, further including means for actuating the auxiliary pump.

61. The system according to claim 60, wherein the actuating means includes first and second outwardly directed levers associated with the steering structure for engaging a linkage associated with a switch for selectively controlling operation of the auxiliary pump.

62. The system according to claim 60, wherein the actuating means includes first and second outwardly directed levers associated with the steering structure for selectively engaging means for activating a pump motor associated with the auxiliary pump.

63. The system according to claim 60, wherein the actuating means includes first and second switches for engaging the gear engagement structure when the steering structure is at or near the full right hand and full left hand turn positions.

64. A method of adjustably metering a flow of fluid though a common passage and though first and second passages, comprising:
  rotating a body carrying a piston in each of first and second sets of axially spaced openings in selective fluid communication with the common passage and the first and second passages as the body rotates; and
  positioning first and second non-concentric engagement structures adjacent to the body for sequentially displacing the pistons as the body rotates for selectively directing fluid though the common passage and though the first and second passages, wherein the first and second non-concentric engagement structures are associated with a pivoting cradle and the method further includes the step of pivoting the cradle in a first direction such that only the pistons in the first set of openings are sequentially displaced for directing fluid though only the first passage.

65. The method according to claim 64, wherein the rotating step further comprises rotating the body in a first direction to direct fluid from the common passage to one or both of the first and second passages.

66. The method according to claim 65, wherein the rotating step further comprises rotating the body in a second direction opposite the first direction to direct fluid from the first and second passages to the common passage.

67. The method according to claim 64, wherein the pivoting step further comprises pivoting the cradle in a second direction such that only the pistons in the second set of openings are sequentially displaced for directing fluid through only the second passage.

68. A method of adjustably metering a flow of fluid through a common passage and through first and second passages, comprising:
  rotating a body carrying a piston in each of first and second sets of axially spaced openings in selective fluid communication with the common passage and the first and second passages as the body rotates;
  engaging and sequentially displacing the pistons in the first set of openings for directing fluid from the common passage to the first passage, or vice-versa; and
  engaging and sequentially displacing the pistons in the second set of openings for directing fluid from the common passage to the second passage, or vice-versa.

69. The method according to claim 68, further including the step of engaging and sequentially displacing only the pistons in the first set of openings for directing fluid from the common passage to only the first passage, or vice-versa.

70. The method according to claim 68, further including the step of engaging and sequentially displacing only the pistons in the second set of openings for directing fluid from the common passage to only the second passage, or vice-versa.

71. An apparatus intended for use in selectively controlling or adjustably metering a flow of fluid through a common passage and through first and second passages, comprising:
  a rotatable body having first and second axially spaced openings in selective fluid communication with the common passage and the first and second passages as the body rotates;

a piston associated with each opening and capable of moving therein between a first position and a second, displaced position; and first and second non-concentric engagement structures for engaging and selectively moving the piston associated with each of the first and second openings between the first and second positions as the body rotates for directing the fluid flow through only the first passage, only the second passage, or proportionally through both the first and second passages, wherein each piston comprises a shoe for engaging the corresponding engagement structure, a cylindrical body positioned in the corresponding opening, and a connector connecting the shoe to the body.

72. An apparatus intended for use in selectively controlling or adjustably metering a flow of fluid through a common passage and through first and second passages, comprising:

a rotatable body having first and second axially spaced openings in selective fluid communication with the common passage and the first and second passages as the body rotates;

a piston associated with each opening and capable of moving therein between a first position and a second, displaced position; and first and second non-concentric engagement structures for engaging and selectively moving the piston associated with each of the first and second openings between the first and second positions as the body rotates for directing the fluid flow through only the first passage, only the second passage, or proportionally through both the first and second passages, wherein each opening includes an oversized portion defining a gap for allowing fluid to pass the corresponding piston when in the first position in the opening.

73. A method of adjustably metering a flow of fluid through a common passage and through first and second passages, comprising:

rotating a body including a plurality of openings in which vanes are slidably received;

providing a cradle including an eccentric inner surface for engaging and sequentially displacing the vanes for directing fluid through the common passage and the first and second passages in substantially equal proportions; and positioning the cradle at a first position for sequentially displacing the vanes in a first set of openings for directing more fluid through the first passage.

74. A method of adjustably metering a flow of fluid through a common passage and through first and second passages, comprising:

rotating a body including a plurality of openings in which vanes are slidably received;

providing a cradle including an eccentric inner surface for engaging and sequentially displacing the vanes for directing fluid through the common passage and the first and second passages in substantially equal proportions; and positioning the cradle at a second position for sequentially displacing the vanes in a second set of openings for directing more fluid through the second passage.

* * * * *

UNITED STATES PATENT AND TRADEMARK OFFICE
CERTIFICATE OF CORRECTION

| | | |
|---|---|---|
| PATENT NO. | : 7,216,579 B2 | Page 1 of 1 |
| APPLICATION NO. | : 10/493114 | |
| DATED | : May 15, 2007 | |
| INVENTOR(S) | : Oxley | |

It is certified that error appears in the above-identified patent and that said Letters Patent is hereby corrected as shown below:

Claim 40, line 59, please replace "m" with --in--.

Signed and Sealed this

Seventh Day of August, 2007

JON W. DUDAS
*Director of the United States Patent and Trademark Office*